US012174154B2

(12) United States Patent
Wang et al.

(10) Patent No.: US 12,174,154 B2
(45) Date of Patent: Dec. 24, 2024

(54) INTELLIGENT TEST SYSTEM AND METHOD FOR TRAFFIC LOAD ENGINEERING DETECTION OF ROAD CONSTRUCTION

(71) Applicant: WUHAN CONSTRUCTION ENGINEERING GROUP CO., LTD., Hubei (CN)

(72) Inventors: Shuai Wang, Hubei (CN); Tong Lu, Hubei (CN); Aixun Wang, Hubei (CN); Wenxiang Li, Hubei (CN); Yunjie Dong, Hubei (CN); Mingzhao Wang, Hubei (CN); Te Liu, Hubei (CN); Xianyong Kong, Hubei (CN); Jing Zhu, Hubei (CN)

(73) Assignee: WUHAN CONSTRUCTION ENGINEERING GROUP CO., LTD., Wuhan (CN)

( * ) Notice: Subject to any disclaimer, the term of this patent is extended or adjusted under 35 U.S.C. 154(b) by 257 days.

(21) Appl. No.: 17/985,142

(22) Filed: Nov. 10, 2022

(65) Prior Publication Data
US 2023/0073710 A1 Mar. 9, 2023

Related U.S. Application Data

(63) Continuation of application No. PCT/CN2022/082497, filed on Mar. 23, 2022.

(30) Foreign Application Priority Data

Mar. 26, 2021 (CN) .......................... 202110327375.9

(51) Int. Cl.
*G01N 3/10* (2006.01)
*G01N 3/24* (2006.01)

(52) U.S. Cl.
CPC ............... *G01N 3/10* (2013.01); *G01N 3/24* (2013.01); *G01N 2203/0025* (2013.01); *G01N 2203/0075* (2013.01); *G01N 2203/0676* (2013.01)

(58) Field of Classification Search
CPC ........................................... G01N 3/10
(Continued)

(56) References Cited

FOREIGN PATENT DOCUMENTS

| CN | 202292965 U | 7/2012 | |
|---|---|---|---|
| CN | 102272572 B | * 11/2013 | ............... G01N 3/08 |

(Continued)

OTHER PUBLICATIONS

Malassenet et al. Machine translation of CN-102272572-B. Published Nov. 2013. Translated Sep. 2024. (Year: 2013).*

(Continued)

*Primary Examiner* — Walter L Lindsay, Jr.
*Assistant Examiner* — Philip T Fadul
(74) *Attorney, Agent, or Firm* — Mei & Mark LLP; Manni Li

(57) ABSTRACT

An intelligent test system for traffic load engineering detection of road construction comprises a support part; a sample box part used for containing samples and carrying out a load test in a vertical direction and a direct-shear test in a horizontal direction; a simulated road load applying part used for applying multiple simulated road loads to the samples; a vertical load applying part used for providing multiple loads in the vertical direction for the samples; a horizontal load applying part used for providing loads in the horizontal direction for the sample box part; an automatic sand-compaction part used for quantitatively compacting the samples layer by layer; a water-level fluctuation part used for simulating rising and falling of a tide level; a dry-wet cycle part used for simulating a rain and a sunlight; and an (Continued)

acquisition part used for acquiring data generated during the test.

10 Claims, 35 Drawing Sheets

(58) Field of Classification Search
USPC .......................................................... 73/783
See application file for complete search history.

(56) References Cited

FOREIGN PATENT DOCUMENTS

| | | | | |
|---|---|---|---|---|
| CN | 104215498 A | | 12/2014 | |
| CN | 106644743 A | | 5/2017 | |
| CN | 106644768 A | | 5/2017 | |
| CN | 106706454 A | * | 5/2017 | ............. G01D 21/02 |
| CN | 110196189 A | * | 9/2019 | ............. G01N 17/00 |
| CN | 110940598 A | * | 3/2020 | |
| JP | H10260114 A | | 9/1998 | |

OTHER PUBLICATIONS

Meng et al. Machine translation of CN-106706454-A. Published May 2017. Translated Sep. 2024. (Year: 2017).*
Gao et al. Machine translation of CN-110196189-A. Published Sep. 2019. Translated Sep. 2024. (Year: 2019).*
Lu et al. Machine translation of CN-110940598-A. Published Nov. 2013. Translated Sep. 2024. (Year: 2013).*

* cited by examiner

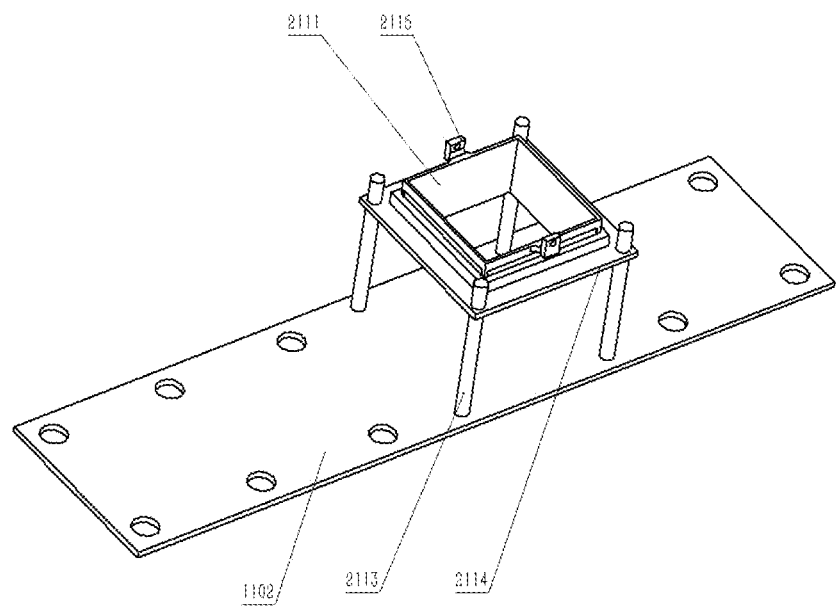
FIG. 2H
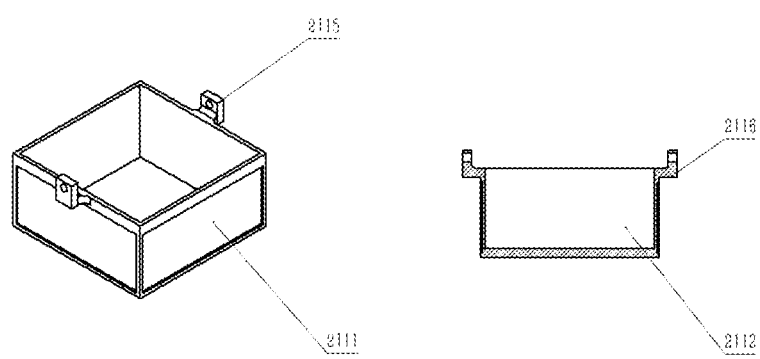
FIG. 2I     FIG. 2J

INTELLIGENT TEST SYSTEM AND METHOD FOR TRAFFIC LOAD ENGINEERING DETECTION OF ROAD CONSTRUCTION

CROSS-REFERENCE TO RELATED APPLICATIONS

The subject application is a continuation of PCT/CN2022/082497 filed on Mar. 23, 2022, which claims priority on Chinese Application No. 202110327375.9 filed on Mar. 26, 2021 in China. The contents and subject matter of the PCT international application and the Chinese priority application are incorporated herein by reference.

BACKGROUND OF THE INVENTION

Technical Field

The invention relates to the technical field of traffic load test equipment, in particular to an intelligent test system for traffic load engineering detection of road construction based on a liquid-gas linkage system, and an intelligent test method for traffic load engineering detection of road construction based on a liquid-gas linkage system.

Description of Related Art

The development of construction in China leads to a rapid advancement of construction work such as highways, bridges and railways and continuous development of transportations, and the transportations such as heavy vehicles and airplanes put forward higher requirements for the bearing property of highways. The loads of the transportations represented by vehicles and airplanes have characteristics of their own. Long-term and periodical application of traffic loads, including the self-weight of transportations, static loads such as vibrations of vehicles caused by the unevenness of roads and tires during the traveling process, and an obvious shear effect generated by the airplanes to the roadbed during the taking-off/landing process, will lead to the deformation and settlement of the roadbed, and may even cause damage to roads, and these complex and variable traffic loads are problems that should be taken into account during engineering design, and may exert an influence on the roadbed and affect the driving safety of the transportations.

So, it is needed to explore the stress condition and changes of the internal structure of the roadbed in presence of a static load, an impact load and the like, and then, this circumstance will be simulated according to measurement results to obtain corresponding results, so as to analyze the relationship between the internal structure and components of the roadbed with the magnitude of force applied to the roadbed, such that the durability of roads can be improved by properly transforming the roadbed. However, it is impossible to simulate this circumstance through existing techniques. Moreover, it consumes a large quantity of manpower and material resources and time to load samples onto existing large experimental equipment, and the working efficiency is low. Thus, it is necessary to develop a test device that can simulate complex and variable natural environments and traffic loads and can realize engineering test simulation of the road construction process and traffic loads by mechanical and automatic control, so as to provide corresponding reference for road construction and use.

BRIEF SUMMARY OF THE INVENTION

In view of the defects of the prior art, the technical issue to be settled by the invention is to provide an intelligent test system and method for traffic load engineering detection of road construction, which can simulate natural environments and apply multiple traffic roads, and can predict road deformation, roadbed settlement and internal stress of roads in advance, so that relevant measures can be taken in advance to reduce damage to the roads.

To settle the above technical issue, the invention adopts the following technical solution:

The invention provides an intelligent test system for traffic load engineering detection of road construction, which is composed of a support part, a sample box part, a simulated road load applying part, a vertical load applying part, a horizontal load applying part, a lifting part, an automatic sand-compaction part, a water-level fluctuation part, a dry-wet cycle part and an acquisition part. Wherein, the support part is used for supporting a whole test device and providing a counter-force for the simulated road load applying part and the vertical load applying part. The sample box part is a container for containing samples, is located inside the support part, and is used for carrying out a load test in a vertical direction and a direct-shear test in a horizontal direction. The simulated road load applying part is located at an upper end of the sample box part and is used for simulating multiple loads applied to roads by vehicles, such as an impact load, a vibration load and a static load. The vertical load applying part is located at the upper end of the sample box part and is used for carrying out the load test in the vertical direction, such as a vertical impact load test or a vertical static load test. The horizontal load applying part is located on a lateral side of the sample box part and is used for providing loads in the horizontal direction during the direct-shear test. The lifting part is used for lifting and transferring large parts of the test device to reduce the physical labor of test personnel. The automatic sand-compaction part is located at the upper end of the sample box part and is used for quantitatively compacting the soil samples layer by layer. The water-level fluctuation part is located at a bottom end of the sample box part, and is used for controlling the water level in a sample case to rise or fall, so as to simulate the influence of a tide on the samples. The dry-wet cycle part is located at the upper end of the sample box part, and is used for simulating a rain and a sunlight to test the influence of the dry-wet cycle on the samples. The acquisition part is located inside or on surfaces of the sample box part, the simulated road load applying part, the vertical load applying part and the horizontal load applying part, and is used for acquiring data generated during the test, including mechanics data, movement data and image data.

Preferably, the support part is composed of a support system and a support slide system, and provides the counter-force for the simulated road load applying part and the vertical load applying part; the support system is composed of vertical support pillars, a base plate, first horizontal support rods and second horizontal support rods, and is used for supporting the test device vertically; and the support slide system comprises upper support slides and lower support slides, and is used for providing slides required for horizontal movements of the simulated road load applying part, the vertical load applying part, the lifting part and the automatic sand-compaction part.

Further, the sample box part is composed of a sample box system and a sample box slide system, is a container for containing the samples, and is able to carry out the load test in the vertical direction and the direct-shear test in the horizontal direction; the sample box system is composed of a direct-shear sample box module and a sample case module, and is a container for containing the samples for the load test in the vertical direction and the direct-shear test in the horizontal direction; the direct-shear sample box module comprises an upper direct-shear box, a lower direct-shear box, upper direct-shear box fixing rods and an upper direct-shear box fixing plate, and is a container for containing the samples for the direct-shear test in the horizontal direction; the sample case module comprises a sample case and a road model, and is used for carrying out a road load simulation test; and the sample box slide system comprises sample box slides and sample box pulleys, and is used for reducing horizontal moving resistance of the sample box part and providing a condition for movements of the lower direct-shear box during the direct-shear test.

Optionally, the simulated road load applying part is composed of a simulated road load mechanical system and a simulated road load power system; the simulated road load mechanical system is composed of a simulated road load beam, simulated road load pulleys, a first cylinder fixing rod, a first hydraulic piston rod fixing rod, a first hydraulic piston rod fixing plate, a wheel and a wheel connecting rod, and is used for providing mechanical support and mechanical linkage for the application of a simulated road load; and the simulated road load power system is composed of a simulated road load pneumatic module and a simulated road load hydraulic module, and is used for providing pneumatic power and hydraulic power during road load simulation Further, the vertical load applying part is composed of a vertical load mechanical system and a vertical load power system; the vertical load mechanical system comprises a vertical load beam, vertical load pulleys, a vertical load bearing plate, a second cylinder fixing rod and a second pneumatic cylinder fixing rod, and is used for providing mechanical support and mechanical linkage for the application of a vertical load; and the vertical load power system is composed of a vertical load pneumatic module and a vertical load hydraulic module, and is used for providing pneumatic power and hydraulic power for the load test in the vertical direction.

Optionally, the horizontal load applying part is composed of a horizontal load mechanical system and a horizontal load power system; the horizontal load mechanical system is composed of a third hydraulic cylinder fixing plate and a horizontal load bearing plate, and is used for providing mechanical support and mechanical linkage for the application of a horizontal load;

Further, the lifting part is composed of a lifting mechanical system and a lifting power system; the lifting mechanical system comprises a lifting beam, lifting pillars, fixed pulleys, movable pulleys, a bearing bar, a steel wire, lifting pulleys and a fourth hydraulic piston rod fixing plate, and is used for supporting, fixing and transmission during a lifting process; and the lifting power system is composed of a lifting electrical module and a lifting hydraulic module, and is used for providing an electrical pulling force and a horizontal hydraulic thrust for lifting.

Optionally, the automatic sand-compaction part is composed of an automatic sand-compaction mechanical system, an automatic sand-compaction power system and an automatic sand-compaction slide system; the automatic sand-compaction mechanical system is composed of a sand-compaction plate, sand-compaction plate fixing rods, a third cylinder mounting plate and a stepping motor connecting rod; the automatic sand-compaction power system is composed of an automatic sand-compaction pneumatic module and an automatic sand-compaction electrical module, and is used for providing power for a soil compaction test; and the automatic sand-compaction slide system is composed of an automatic sand-compaction beam, automatic sand-compaction pulleys, automatic sand-compaction pulley locating holes and automatic sand-compaction stop bolts, and is used for horizontal movements of the automatic sand-compaction part.

Optionally, the water-level fluctuation part is composed of a water-level fluctuation mechanical system and a water-level fluctuation power system; the water-level fluctuation mechanical system comprises multiple first water tanks provided with water outlets, and is used for providing water required by a water-level fluctuation test; the water-level fluctuation power system comprises multiple hydraulic lifting platforms and a hydraulic lifting platform controller, and is used for controlling a water level in the sample box part to rise or fall; the dry-wet cycle part is composed of a dry-wet cycle water-supply system and a dry-wet cycle drying system; the dry-wet cycle water-supply system comprises multiple second water tanks, a water pump, a water pump controller, sprayers, a five-way joint and sprayer holders, and is used for simulating a rain; and the dry-wet cycle drying system is composed of a heating plate, heating plate supports and a heating plate controller, and is used for simulating a sunlight to dry the samples.

Correspondingly, the invention further provides an intelligent test method for traffic load engineering detection of road construction, comprising the following steps:
S1: compacting samples in a sample box part by means of an automatic sand-compaction part:
S2: carrying out a vertical load test by means of a vertical load applying part:
S3: carrying out a direct-shear part by means of a horizontal load applying part:
S4: carrying out a road load simulation test by means of a simulated road load applying part:
S5: carrying out a water-level fluctuation test by means of a water-level fluctuation part:
S6: carrying out a dry-wet cycle test by means of a dry-wet cycle part:
S7: carrying out lifting by means of a lifting part.

By adoption of the test system of the invention, roads can be transformed according to responses of the road under different loads, so as to improve the durability of the roads; moreover, upon data acquisition and analysis, the test system can predict road deformation, roadbed settlement and internal stress of roads in advance, such that relevant measures can be taken in advance to reduce damage to the roads; and finally, the invention provides ideas and technical reference for road design under the new situation, and lays a foundation for the development of fully-automatic test devices.

BRIEF DESCRIPTION OF THE SEVERAL VIEWS OF THE DRAWINGS

FIG. 2H is an installation diagram of upper direct-shear box fixing rods and an upper direct-shear box fixing plate; FIG. 2I is a three-dimensional view of the upper direct-shear box; and FIG. 2J is a sectional view of the lower direct-shear box.

Figure 1A:
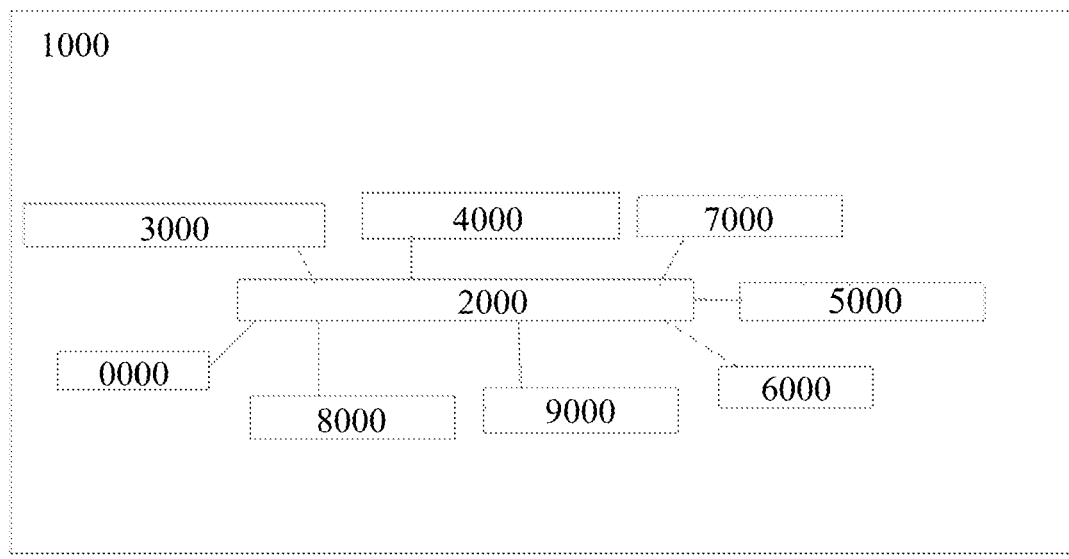
FIG. 1A is an overall framework diagram of the present invention.
Figure 1B:
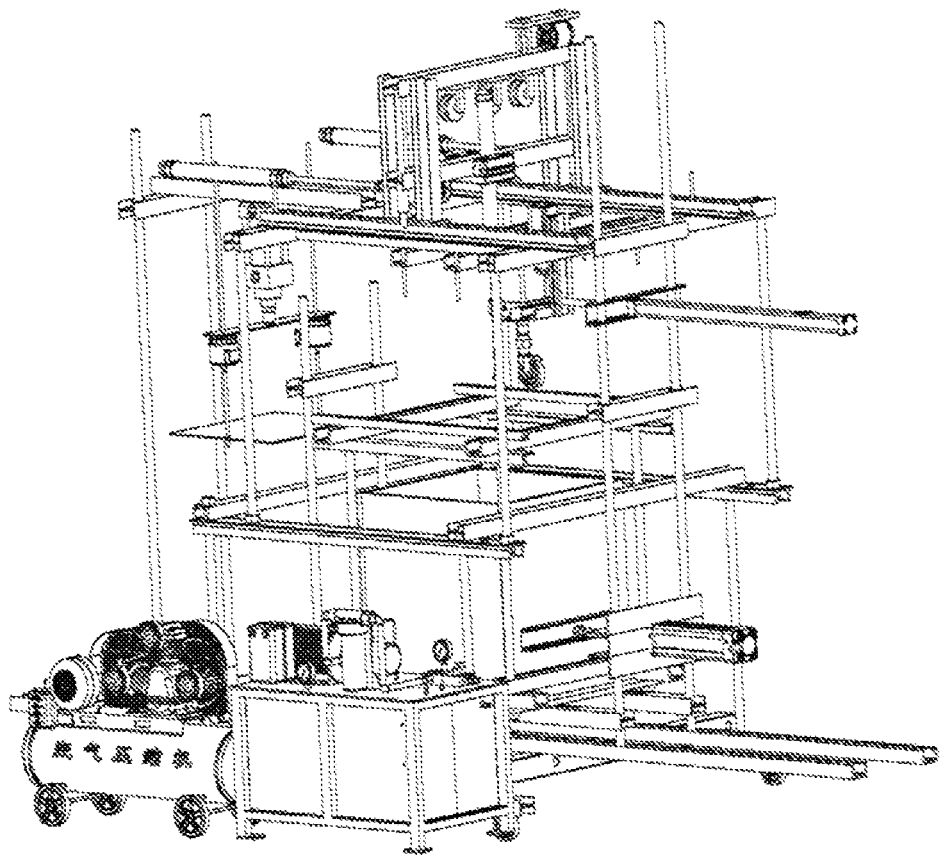
FIG. 1B is an overall structural diagram.
Figure 1C:
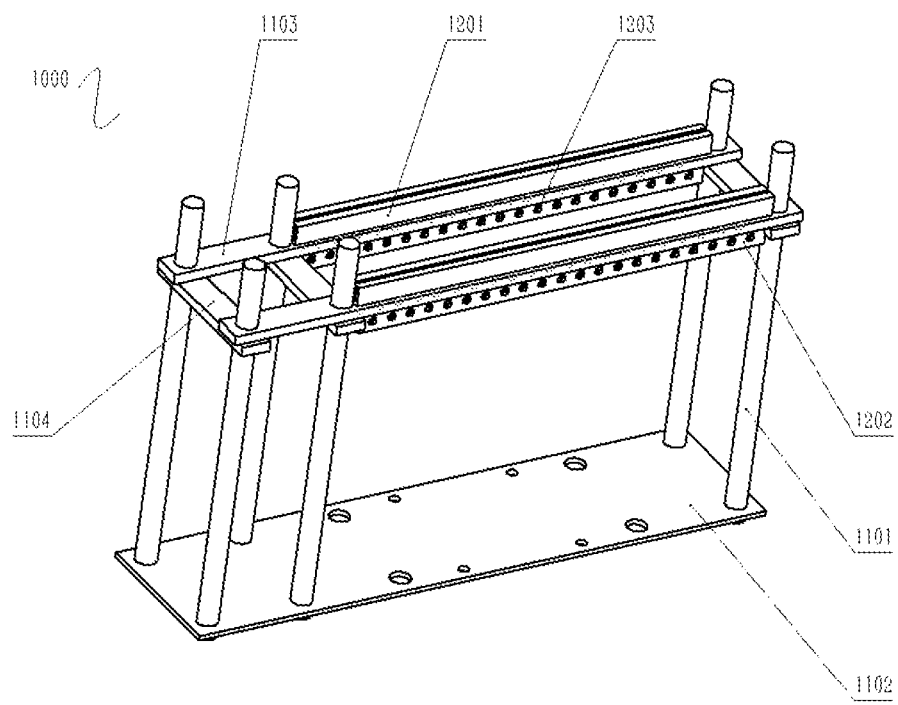
FIG. 1C is a structural diagram of a support part.

Reference numbers in the figures are used to depict the following structures:

1000—support part; 1100—support system; 1101—vertical support pillar, 1102—base plate, 1103—first horizontal support rod, 1104—second horizontal support rod; 1200—support slide system; 1201—upper support slide, 1202—lower support slide, 1203—support slide locating hole;

2000—sample box part; 2100—sample box system; 2110—direct-shear sample box module; 2111—upper direct-shear box, 2112—lower direct-shear box, 2113—upper direct-shear box fixing rod, 2114—upper direct-shear box fixing plate, 2115—upper direct-shear box lifting hole, 2116—lower direct-shear box lifting hole; 2120—sample case module; 2121—sample case, 2122—sample case lifting hole, 2123—road model, 2124a—water inlet a, 2124b—water inlet b, 2124c—water inlet c, 2124d—water inlet d; 2200—sample box slide system; 2201—sample box slide, 2202—sample box pulley, 2203—sample box slide locating hole, 2204—sample box pulley locating hole, 2205—sample box stop bolt;

3000—simulated road load applying part; 3100—simulated road load mechanical system; 3101—simulated road load beam, 3102—simulated road load pulley, 3103—first cylinder fixing rod, 3104—first hydraulic piston rod fixing rod, 3105—first hydraulic piston rod fixing plate, 3106—wheel, 3107—wheel connecting rod; 3200—simulated road load power system; 3210—simulated road load pneumatic module; 3211—first air compressor, 3212—first cylinder, 3213a—first pneumatic pressure-regulating valve a, 3213b—first pneumatic pressure-regulating valve b, 3214—first electromagnetic valve, 3215—first electrical proportional valve, 3216—first PLC, 3217a—first pneumatic T-joint a, 3217b—first pneumatic T-joint b; 3220—simulated road load hydraulic module; 3221—first hydraulic station, 3222—first hydraulic piston rod, 3223—first hydraulic electromagnetic directional valve, 3224—first electro-hydraulic proportional speed control valve, 3225—first hydraulic cylinder stroke sensor;

4000—vertical load applying part; 4100—vertical load mechanical system; 4101—vertical load beam, 4102—vertical load pulley, 4103—vertical load pulley locating hole, 4104—vertical load stop bolt, 4105—vertical load bearing plate, 4106—second cylinder fixing rod, 4107—second hydraulic cylinder fixing rod; 4200— vertical load power system; 4210—vertical load pneumatic module; 4211—second air compressor, 4212—second cylinder, 4213a—second pneumatic pressure-regulating valve a, 4213b—second pneumatic pressure-regulating valve b, 4214—second electromagnetic valve, 4215—second electrical proportional valve, 4216—second PLC, 4217a—second pneumatic T-joint a, 4217b—second pneumatic T-joint b; 4220—vertical load hydraulic module; 4221—second hydraulic station, 4222—second hydraulic cylinder, 4223—second hydraulic electromagnetic directional valve, 4224—second electro-hydraulic proportional speed control valve, 4225—second hydraulic cylinder stroke sensor;

5000—horizontal load applying part; 5100—horizontal load mechanical system; 5101—third hydraulic cylinder fixing plate, 5102—horizontal load bearing plate; 5200—horizontal load power system; 5201—third hydraulic station, 5202—third hydraulic cylinder, 5203—third hydraulic electromagnetic directional valve, 5204—third electro-hydraulic proportional speed control valve, 5205—third hydraulic cylinder stroke sensor, 5206—third PLC;

6000—lifting part; 6100—lifting mechanical system; 6101—lifting beam, 6102—lifting pillar, 6103a—fixed pulley a, 6103b—fixed pulley b, 6103c—fixed pulley c, 6104a—movable pulley a, 6104b—mvoable pulley b, 6014c—movable pulley c, 6104d—movable pulley d, 6105—bearing bar, 6106—steel wire, 6107—steel wire fixing hole, 6108—electrical hoist mounting hole, 6109—lifting pulley, 6110—fourth hydraulic piston rod fixing plate; 6200—lifting power system; 6210—lifting electrical module; 6211—electrical hoist, 6212—electrical hoist controller, 6213—digital-display tension meter; 6220—lifting hydraulic module; 6221—fourth hydraulic station, 6222a—fourth hydraulic piston rod a, 6222b—fourth hydraulic piston rod b, 6223—fourth hydraulic electromagnetic directional valve, 6224—fourth electro-hydraulic proportional speed control valve, 6225a—fourth hydraulic cylinder stroke sensor a, 6225b—fourth hydraulic cylinder stroke sensor b, 6226—fourth PLC, 6227a—hydraulic T-joint a, 6227b—hydraulic T-joint b;

7000—automatic sand-compaction part; 7100—automatic sand-compaction mechanical system; 7101—sand-compaction plate, 7102—sand-compaction plate fixing rod, 7103—third cylinder mounting plate, 7104—stepping motor connecting rod; 7200—automtic sand-compaction power system; 7210—automatic sand-compaction pneumatic module; 7211—third air compressor, 7212a—third cylinder a, 7212b—third cylinder b, 7212c—third cylinder c, 7212d—third cylinder d, 7213—third pneumatic pressure-regulating valve, 7214—third electromagnetic valve, 7215—fifth PLC, 7216a—pneumatic five-way joint a, 7216b—pneumatic five-way joint b; 7220—automatic sand-compaction electrical module; 7221—stepping motor, 7222—stepping motor driver, 7223—stepping motor controller; 7300—automatic sand-compaction slide system; 7301—automatic sand-compaction beam, 7302—automatic sand-compaction pulley, 7303—automatic sand-compaction pulley locating hole, 7304—automatic sand-compaction stop bolt;

8000—water-level fluctuation part; 8100—water-level fluctuation mechanical system; 8101a—first water tank a, 8101b—first water tank b, 8101c—first water tank c, 8101d—first water tank d, 8102a—water outlet a, 8102b—water outlet b, 8102c—water outlet c, 8102d—water outlet d; 8200—water-level fluctuation power system; 8201a—hydraulic lifting platform a, 8201b—hydraulic lifting platform b, 8201c—hydraulic lifting platform c, 8201d—hydraulic lifting platform d, and 8202—hydraulic lifting platform controller;

9000—dry-wet cycle part; 9100—dry-wet cycle water-supply system; 9101—second water tank, 9102—water pump, 9103—water pump controller, 9104a—sprayer a, 9104b—sprayer b, 9104c—sprayer c, 9104d—sprayer d, 9105—five-way joint, 9106—sprayer holder; 9200—dry-wet cycle drying system; 9201—heating plate, 9202—heating plate support, 9203—heating plate controller;

0000—acqusition part; 0100—sensor acquisition system; 0101—soil pressure sensor, 0102—first pull pressure sensor, 0103—second pull pressure sensor, 0104—third pull pressure sensor, 0105—fourth pull pressure sensor, 0106—acqustion plate; 0200—image acquisition system; 0201a—DIC camera a, 0201b—DIC camera b, 0201c—DIC camera c, 0201d—DIC camera d, 0202—camera holder.

DETAILED DESCRIPTION OF THE INVENTION

Referring FIG. 1A to FIG. 10D, an intelligent test system for traffic load engineering detection of road construction provided by the invention will be introduced below:

1. Whole Device:

As shown in FIG. 1A-FIG. 10G, the intelligent test system for traffic load engineering detection of road construction is composed of a support part 1000, a sample box part 2000, a simulated road load applying part 3000, a vertical load applying part 4000, a horizontal load applying part 5000, a lifting part 6000, an automatic sand-compaction part 7000, a water-level fluctuation part 8000, a dry-wet cycle part 9000, and an acquisition part 0000.

Positional relationship: the support part 1000 is located on the outermost portion of the whole device, the sample box part 2000 is located inside the support part 1000, the simulated road load applying part 3000, the vertical load applying part 4000 and the automatic sand-compaction part 7000 are located at an upper end of the sample box part 2000 and are able to slide horizontally along the support part 1000, the horizontal load applying part 5000 is located on a lateral side of the sample box part 2000, the lifting part 6000 is located at an upper end of the support part 1000 and is able to slide horizontally along the support part 1000, the water-level fluctuation part 8000 is connected to a bottom end of the sample box part 2000, the dry-wet cycle part 9000 is located at the upper end of the sample box part 2000, and the acquisition part 0000 is located inside or on surfaces of the sample box part 2000, the simulated road load applying part 3000, the vertical load applying part 4000 and the horizontal load applying part 5000.

Working principle: the support part 1000 supports the whole test device and provides a counter-force for the simulated road load applying part 3000 and the vertical load applying part 4000; the sample box part 2000 is a container for containing samples and is able to carry out a load test in the vertical direction and a direct-shear test in the horizontal direction; the simulated road load applying part 3000 is used for applying multiple simulated road loads, including wheel rolling and vibrations, to the samples; the vertical load applying part 4000 is used for providing multiple loads in the vertical direction, including an impact load, a variable static load and a vibration load, for the samples; the horizontal load applying part 5000 is used for providing loads in the horizontal direction for the sample box part 2000 to carry out a large direct-shear test; the lifting part 6000 is used for lifting large parts of the test device to reduce physical labor during a test; the automatic sand-compaction part 7000 is used for compacting the samples and may quantitatively compact the samples layer by layer according to test requirements; the water-level fluctuation part 8000 is used for simulating rising and falling of a tide level; the dry-wet cycle part 9000 is used for simulating a rain and a sunlight; and the acquisition part 0000 is used for testing and acquiring data during the test.

2. Support Part

As shown in FIG. 1A to 2J, the support part 1000 is composed of a support system 1100 and a support slide system 1200, and is used for supporting the whole test device and providing a counter-force for the simulated road load applying part and the vertical load applying part 4000.

2.1. Support System

Figure 1D:
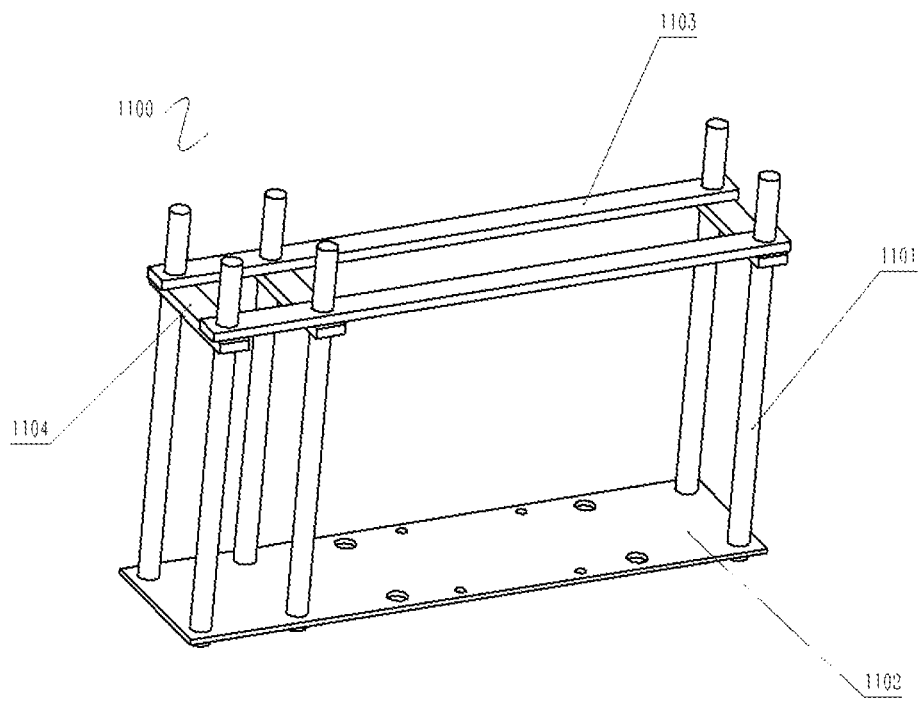
FIG. 1D is a structural diagram of a support system.

As shown in FIG. 1D, the support system 1100 is composed of vertical support pillars 1101, a base plate 1102, first horizontal support rods 1103 and second horizontal support rods 1104, and is used for supporting the test device in the vertical direction. The vertical support pillars 1101 are four thick steel screw rods, located on the periphery of the test device, and used for supporting the test device in the vertical direction.

The base plate 1102 is a thick rectangular steel plate, with four sides being formed with circular holes allowing the vertical support pillars to penetrate through, is fixed on the vertical support pillars through nuts, and is located at lower ends of the vertical support pillars, and the base plate 1102 is used for supporting and fixing the sample box part 2000 and the horizontal load applying part 5000.

The first horizontal support rods 1103 and the second horizontal support rods 1104 are two pairs of rigid steel rods, with surfaces being formed with circular holes allowing the vertical support pillars 1101 to penetrate through, and are fixed on the vertical support pillars 1101 through nuts; the first horizontal support rods 1103 are located on front and back sides, and the second horizontal support rods 1104 are located on left and right sides; the first horizontal support rods 1103 are used for installing the support slide system 1200, supporting the test device, and providing a counter-force for the test device; and the second horizontal support rods 1104 are used for improving the stability of the support system 1100.

2.2. Support Slide System

Figure 1E:
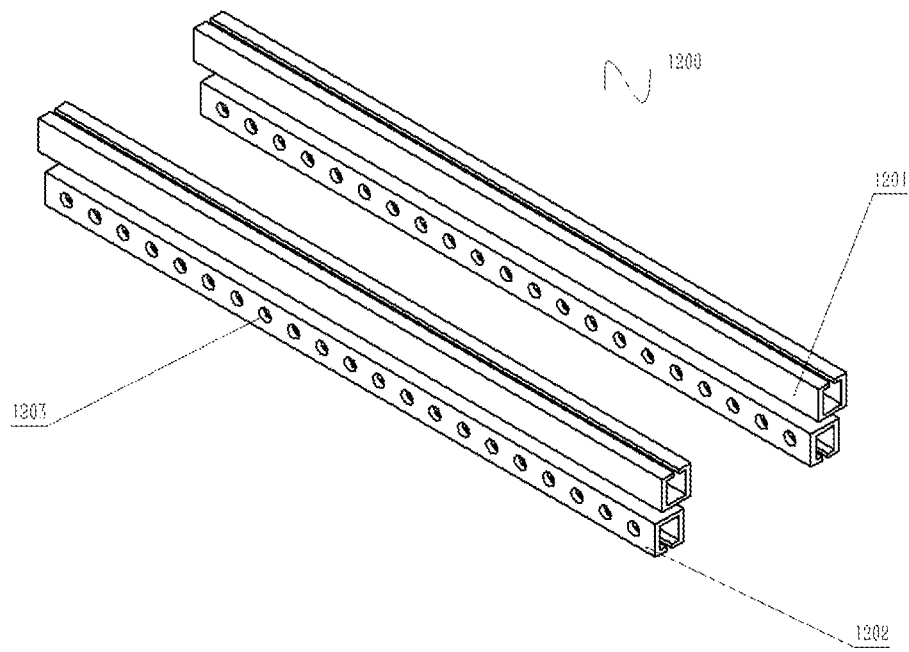
FIG. 1E is a structural diagram of a support slide system.
Figure 1F:
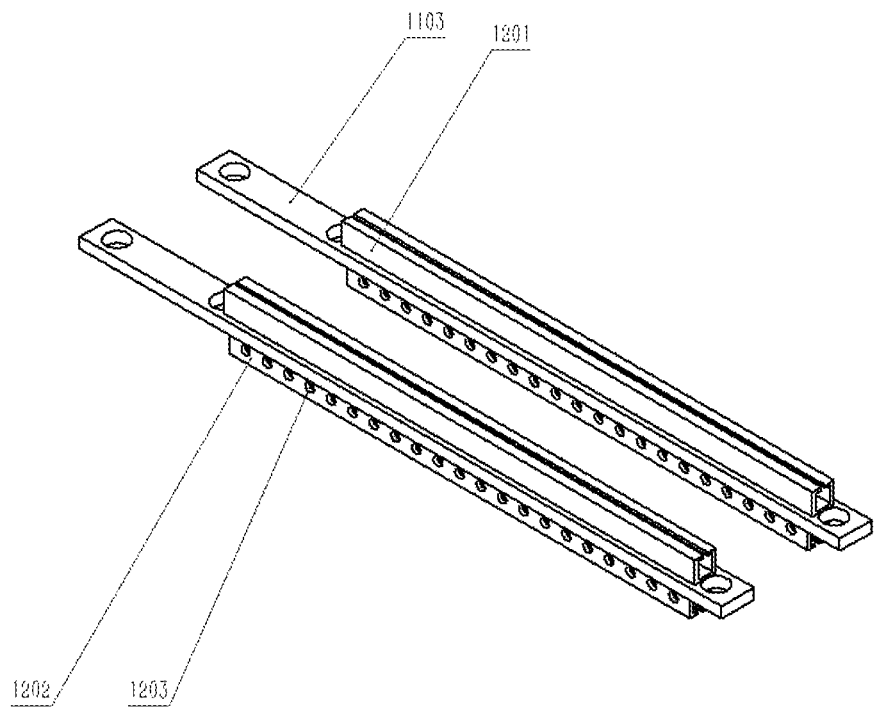
FIG. 1F is an installation diagram of the support slide system.
Figure 1G:
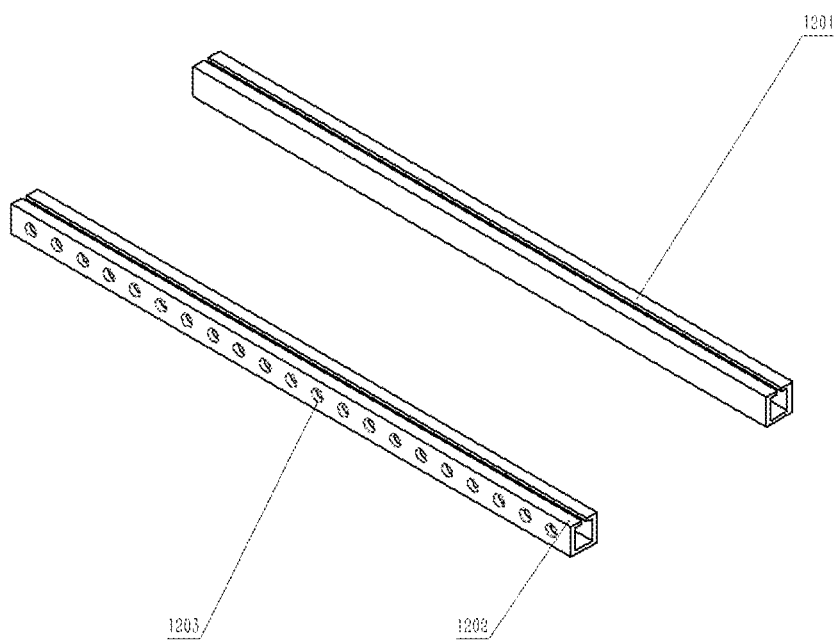
FIG. 1G is a structural diagram of an upper support slide and a lower support slide.

As shown in FIGS. 1E to 1G, the support slide system 1200 is composed of upper support slides 1201, lower support slides 1202 and support slide locating holes 1203, and is used for providing slides required for horizontal movements of the simulated road load applying part 3000, the vertical load applying part 4000, the lifting part 6000 and the automatic sand-compaction part 7000.

The upper support slides 1201 are two square steel tubes, with upper surfaces being formed with grooves, and are installed on upper surfaces of the first horizontal support rods 1103, lifting pulleys 6109 are disposed in the grooves, and the upper support slides 1201 allow the lifting part 6000 to move reversely in the horizontal direction. The lower support slides 1202 are two square steel tubes, with lower surfaces being formed with grooves, and are installed on lower surfaces of the first horizontal support rods 1103, simulated road load pulleys 3102, vertical load pulleys 4102 and automatic sand-compaction pulleys 7302 are disposed in the grooves, and the lower support slides 1202 allow the simulated road load applying part 3000, the vertical load applying part 4000 and the automatic sand-compaction part 7000 to move reversely in the horizontal direction.

The support slide locating holes 1203 are a row of circular through holes and are located in lateral sides of the lower support slides 1202, and the pulleys in the lower support slides 1202 can be fixed with stop bolts to prevent the vertical load applying part 4000 and the automatic sand-compaction part 7000 from moving horizontally.

Working principle: the support part 1000 is used for supporting the whole test device, the upper support slides 1201 are used for horizontal sliding of the lifting part 6000, and the lower support slides 1202 are used for horizontal sliding of the simulated road load applying part 3000, the vertical load applying part 4000 and the automatic sand-compaction part 7000.

3. Sample Box Part

Figure 2A:
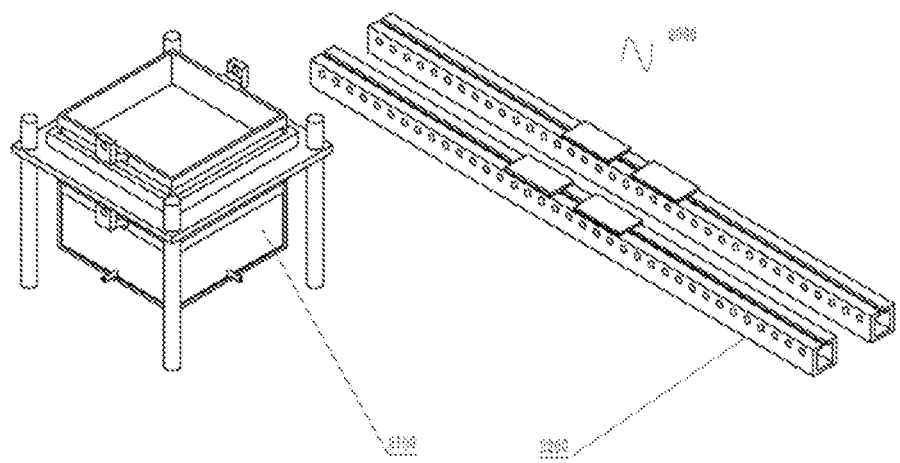
FIG. 2A is a structural diagram of a sample box part in the present invention.

As shown in FIG. 2A, the sample box part 2000 is composed of a sample box system 2100 and a sample box slide system 2200, is a container for containing samples, and is used for carrying out a load test in the vertical direction and a direct-shear test in the horizontal direction.

3.1. Sample Box System

Figure 2B:
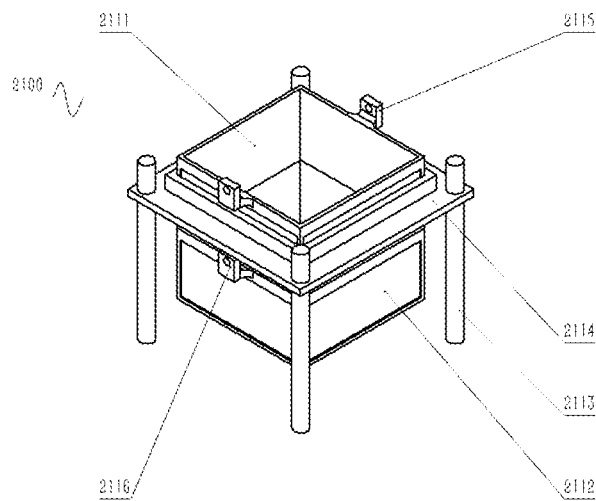
FIG. 2B is a structural diagram of a direct-shear sample box module.

As shown in FIG. 2B, the sample box system 2100 is composed of a direct-shear sample box module 2110 and a sample case module 2120, and is a container for containing samples for the load test in the vertical direction and the direct-shear test in the horizontal direction.

3.1.1 Direct-Shear Sample Box Module

As shown in FIGS. 2E, 2H, 2I and 2J, the direct-shear sample box module 2110 is composed of an upper direct-shear box 2111, a lower direct-shear box 2112, upper direct-shear box fixing rods 2113, an upper direct-shear box fixing plate 2114, upper direct-shear box lifting holes 2115, and lower direct-shear box lifting holes 2116, and is a container for containing samples for the direct-shear test in the horizontal direction.

The upper-direct shear box 2111 is a square rigid container without a bottom surface, and has four sides formed by high-strength transparent plastic plates; angle steel is welded at joints of the plastic plates as well as four sides of upper and lower surfaces of the plastic plates to reinforce the upper direct-shear box 2111, the joints of the plastic plates are coated with sealing rubber, and the upper direct-shear box lifting holes 2115 are installed on the angle steel at front and back sides; and the upper direct-shear box 2111 is disposed on an upper surface of the lower direct-shear box 2112.

The lower direct-shear box 2112 is a square rigid container, and has four sides formed by high-strength transparent plastic plates and a bottom surface formed by a steel plate; angle steel is welded at joints of the plastic plates as well as four sides of upper and lower surfaces of the plastic plates to reinforce the lower direct-shear box 2112, the joints of the plastic plates are coated with sealing rubber, and the lower direct-shear box lifting holes 2116 are installed on the angle steel at front and back sides; and sample box pulleys 2202 are installed on a lower surface of the lower direct-shear box 2112, and the upper direct-shear box 2111 and the lower directs-shear box 2112 implement the direct-shear test jointly.

The upper direct-shear fixing rods 2113 are four steel screw rods, and are installed on four sides of the upper direct-shear box 2111 and the lower direct-shear box 2112; bottom ends of the upper direct-shear fixing rods 2113 penetrate through the base plate 1102 and are fixed on the base plate 1102 through nuts, and top ends of the upper direct-shear fixing rods 2113 penetrate through the upper direct-shear box fixing plate 2114 to be fixed with nuts; and upper direct-shear box fixing rods 2113 and the upper direct-shear box fixing plate 2114 are used for retraining the upper direct-shear box 2111 from moving in the horizontal direction during the direct-shear test.

The upper direct-shear box fixing plate 2114 is a square steel plate with a square hole in the center, is slightly greater than the upper direct-shear box 2111, and is installed at upper ends of the upper direct-shear box fixing rods 2113 through nuts; the square hole in the center penetrates through the upper direct-shear box 2111; and the upper direct-shear box fixing rods 2113 and the upper direct-shear box fixing plate 2114 are used for restraining the upper direct-shear box 2111 from moving in the horizontal direction during the direct-shear test.

The upper direct-shear box lifting holes 2115 and the lower direct-shear box lifting holes 2116 are each a pair of steel lifting rings, and are welded on the angle steel at front and back sides of the upper direct-shear box 211 and on the angle steel at front and back sides of the lower direct-shear box 2112 respectively; and the upper direct-shear box lifting holes 2115 and the lower direct-shear box lifting holes 2116 can be used for lifting and transferring the upper direct-shear box 211 and the lower direct-shear box 2112 through the lifting part 6000, such that the physical labor of test personnel is reduced.

3.1.2. Sample Case Module

Figure 2C:
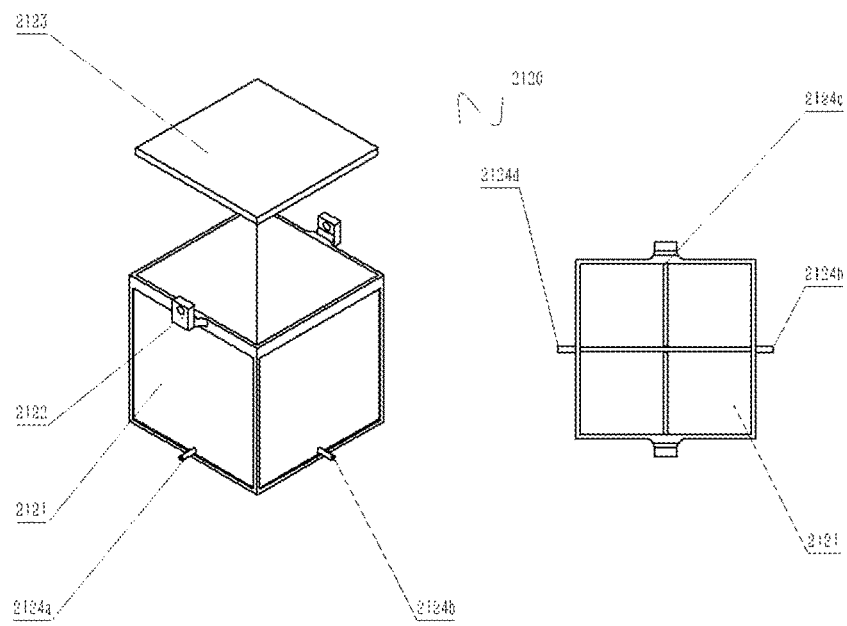
FIG. 2C is a structural diagram of a sample case module.

As shown in FIG. 2C, the sample case module 2120 is composed of a sample case 2121, sample case lifting holes 2122, a road model 2123, a water inlet a 2124a, a water inlet b 2124b, a water inlet c 2124c, and a water inlet d 2124d, and is used for carrying out relevant tests for road load simulation.

The sample case 2121 is a square rigid container, and has four sides formed by high-strength transparent plastic plates and a bottom surface formed by a steel plate; angle steel is welded at joints of the plastic plates as well was four sides of upper and lower surfaces of the plastic plates to reinforce the sample case 2121, the joints of the plastic plates are coated with sealing rubber, and the sample box lifting holes 2122 are installed on the angle steel at front and back sides; sample box pulleys 2202 are installed on a lower surface of the sample case 2121; and the sample case 2121 is a container for containing samples for road load simulation tests.

The sample case lifting holes 2122 are a pair of steel lifting rings, and are welded on the angle steel at the front and back sides of the sample case 2121. The sample box lifting holes 2122 are used for lifting and transferring the sample case 2121 through the lifting part 6000, such that the physical labor of test personnel is reduced.

The road model 2123 is a road model block made according to test requirements, is placed on the surface of the samples in the sample case 2121, and is used for simulating a road to carry out various load tests. The water inlet a 2124a, the water inlet b 2124b, the water inlet c 2124c and the water inlet d 2124d are four small circular tubes, and are installed at bottoms of front, back, left and right sides of the sample case 2121; openings of the water inlet a 2124a, the water inlet b 2124b, the water inlet c 2124c and the water inlet d 2124d are connected to the interior of the sample case 2121, and the other ends of the water inlet a 2124a, the water inlet b 2124b, the water inlet c 2124c and the water inlet d 2124d are connected to a water outlet a 8102a, a water outlet b 8102b, a water outlet c 8102c and a water outlet d 8102d through water pipes respectively; and the water inlet a 2124a, the water inlet b 2124b, the water inlet c 2124c and the water inlet d 2124d are used for adding water into the sample case 2121 or discharging water from the sample case 2121 during a water-level fluctuation test.

3.2. Sample Box Slide System

Figure 2D:
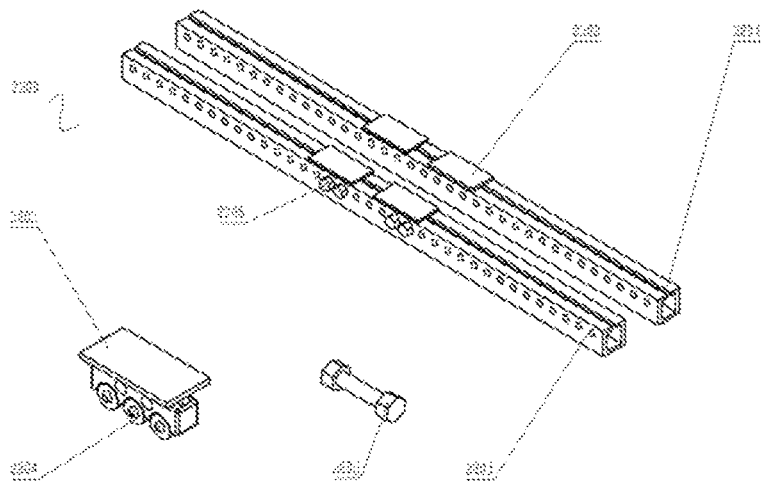
FIG. 2D is a structural diagram of a sample box slide system.
Figure 2E:
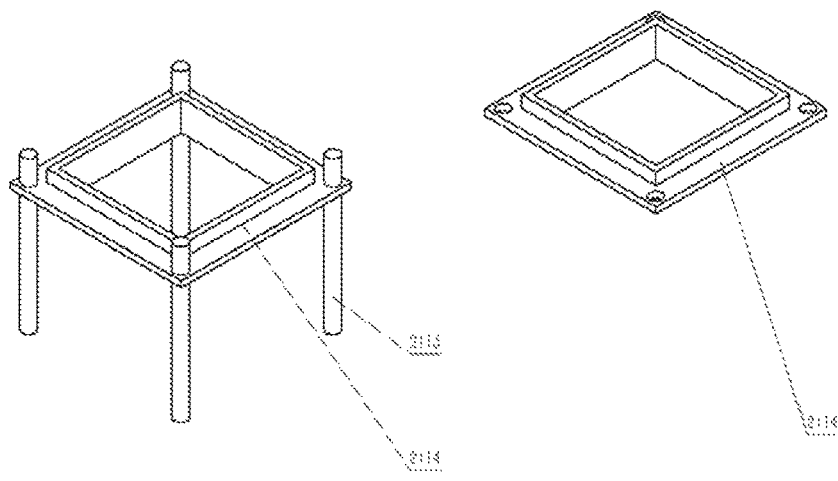
FIG. 2E is a structural diagram of upper direct-shear box fixing rods and an upper direct-shear box fixing plate.
Figure 2F:
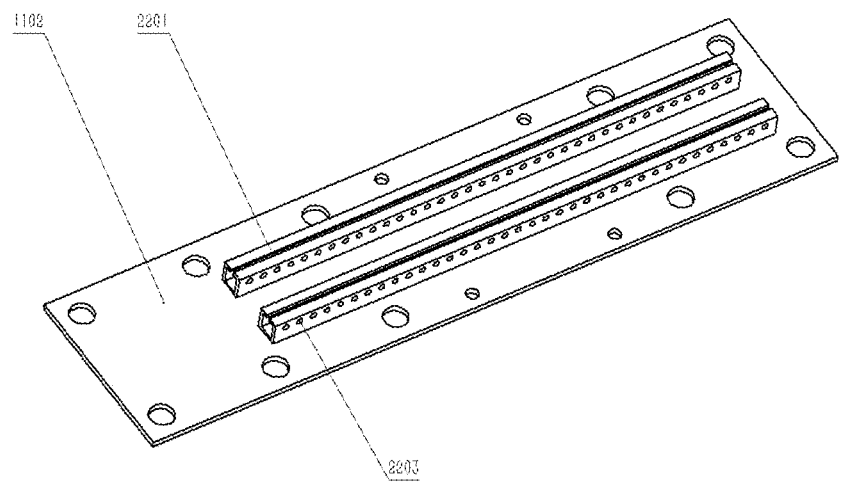
FIG. 2F is an installation diagram of sample box slides.
Figure 2G:
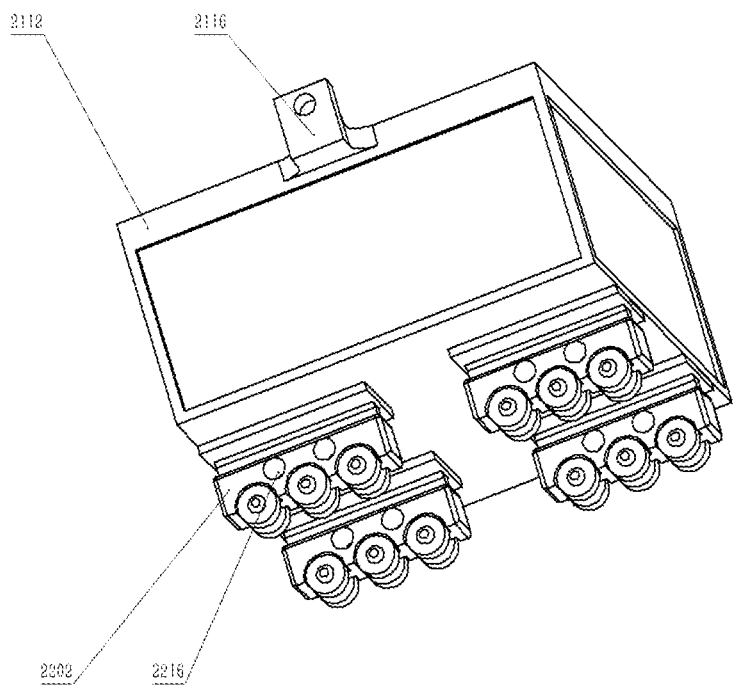
FIG. 2G is a connection diagram of a lower direct-shear box and sample box pulleys.

As shown in FIGS. 2D, 2F, and 2G, the sample box slide system 2200 is composed of sample box slides 2201, sample box pulleys 2202, sample box slide locating holes 2203, sample box pulley locating holes 2204 and sample box stop bolts 2205, and is used for reducing the horizontal moving resistance of the sample box and providing a condition for the movement of the lower direct-shear box 2112 during the direct-shear test.

The sample box slides 2201 are two square steel tubes, with lower surfaces being formed with grooves, and are installed on the upper surface of the base plate 1102, the sample box pulleys 2202 are disposed in the grooves, and the sample box slides 2201 are used for limiting the direct-shear sample box module 2110 and the sample case module 2120, such that the direct-shear sample box module 2110 and the sample case module 2120 can move only in the horizontal direction.

The sample box pulleys 2202 are four steel trolleys, three pairs of wheels 3106 are installed at the bottom of each trolley, and the trolleys are able to slide in the grooves of the sample box slides 2201; a rectangular steel plate is welded at upper ends of the sample box pulleys 2202 and is connected to a bottom surface of the lower direct-shear box 2112 and a bottom surface of the sample case 2121 through nuts; and the sample box pulleys 2202 reduce the horizontal moving resistance of the lower direct-shear box 2112 and the sample case 2121.

The sample box slide locating holes 2203 are a row of circular through holes, are located in lateral sides of the sample box slides 2201, and can fix the sample box pulleys 2202 in the sample box slides 2201 through the sample box stop bolts 2205 to prevent the lower direct-shear box 2112 and the sample case 2121 from moving horizontally.

The sample box pulley locating holes 2204 are two circular through holes, are located in lateral sides of the sample box pulleys 2202, and can fix the sample box pulleys 2202 on the sample box slides 2201 through the sample box stop bolts 2205 to prevent the lower direct-shear box 2112 and the sample case 2121 from moving horizontally. The sample box stop bolts 2205 are standard steel bolts, can penetrate through the sample box slide locating holes 2203 and the sample box pulley locating holes 2204 to fix the sample box slides 2201 and the sample box pulleys 2202 together, so as to prevent the lower direct-shear box 2112 and the sample case 2121 from moving horizontally.

Working principle: the sample box part 2000 is used for containing samples, the direct-shear sample box module 2110 is used for carrying out a direct-shear test, the sample case module 2120 is used for carrying out a vertical load test, a road load simulation test, a fluctuation test, and a dry-wet cycle test, and the sample box slide system 2200 is used for sliding or fixing the sample box system 2100.

4. Simulated Road Load Applying Part

Figure 3A:
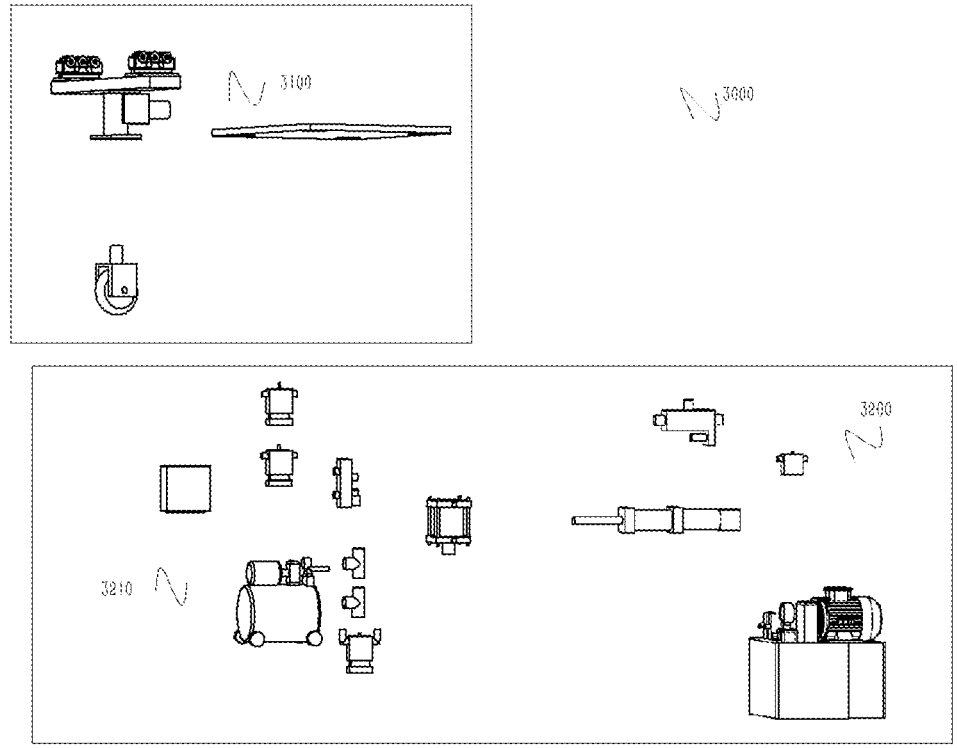
FIG. 3A is a structural diagram of a simulated road load applying part in the present invention.
Figure 3B:
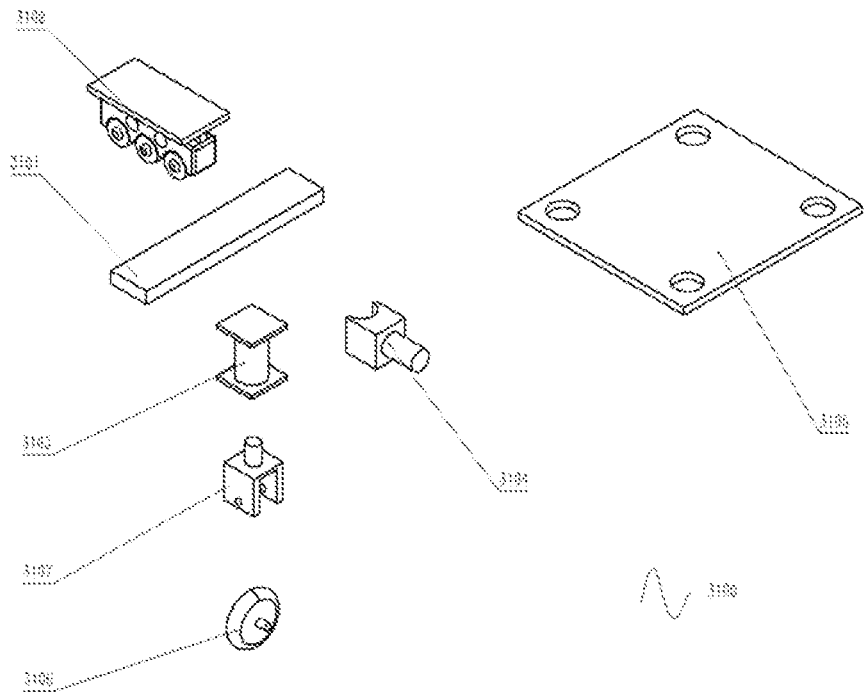
FIG. 3B is a structural diagram of a simulated road load mechanical system.

As shown in FIG. 3A, the simulated road load applying part 3000 is composed of a simulated road load mechanical system 3100 and a simulated road load power system 3200, and is used for simulating various loads applied to roads by vehicles such as an impact load, a vibration load and a static load.

4.1. Simulated Road Load Mechanical System

As shown in FIGS. 3B, 3E, 3F, and 3H, the simulated road load mechanical system 3100 is composed of a simulated road load beam 3101, simulated road load pulleys 3102, a first cylinder fixing rod 3103, a first hydraulic piston rod fixing rod 4104, a first hydraulic piston rod fixing plate 3105, a wheel 3106 and a wheel connecting rod 3107, and is used for providing mechanical support and mechanical linkage for the application of simulated road loads.

The simulated road load beam 3101 is a square steel pole, with two ends being connected to a steel plate on the simulated road load pulleys 3102; the center of a lower surface of the simulated road load beam 3101 is connected to the first cylinder fixing rod 3103; and the simulated road load beam 3101 is installed between the two lower support slides 1202 through the simulated road load pulleys 3102, and is able to slide horizontally along the lower support slides 1202 and provide a vertical counter-force for the simulated road loads.

Identical with the sample box pulleys 2202 in structure, the simulated road load pulleys 3102 are four steel trolleys, three pairs of wheels 3106 are installed at the bottom of each simulated road load pulley 3102, the trolleys are able to slide in the grooves in the lower support slides 1202, a rectangular steel plate is welded at upper ends of the simulated road load pulleys 3102, and is connected to the two ends of the simulated road load beam 3101 through nuts, and the simulated road load pulleys 3102 reduce the horizontal moving resistance of the simulated road load applying part 3000.

The first cylinder fixing rod 3103 is a square steel rod, rectangular steel plates are welded to two ends of the first cylinder fixing rod 3103, the rectangular steel plate at an upper end of the first cylinder fixing rod 3103 is connected to the simulated road load beam 3101, the rectangular steel plate at a lower end of the first cylinder fixing rod 3103 is connected to a first cylinder 3212, the first hydraulic piston rod fixing rod 3104 is installed on a lateral side of the square pole, and the first cylinder fixing rod 3103 is used for connecting the simulated road load beam 3101 and the first cylinder 3212 and transferring a thrust from a first hydraulic piston rod 3222.

The first hydraulic piston rod fixing rod 3104 is a square steel rod, has an end connected to a rectangular steel plate which is connected to a lateral side of the first cylinder fixing rod 3103, as well as an end connected to one end of a second pull pressure sensor 0103, and is used for transferring the thrust from the first hydraulic piston rod 3222. The first hydraulic piston rod fixing plate 3105 is a rectangular steel plate with front and back ends each being formed with a circular hole allowing one vertical support pillar 1101 to penetrate through, is fixed on the vertical support pillars 1101 through nuts, and is located on a right side of the sample box part 2000; the first hydraulic piston rod 3222 is installed on an upper surface of the first hydraulic piston rod fixing plate 3105; and the first hydraulic piston rod fixing plate 3105 is used for fixing the first hydraulic piston rod 3222 and providing a counter-force.

The wheel 3106 is a small tire model made according to test requirements, and a shaft of the wheel 3106 is connected to one end of the wheel connecting rod 3107. The wheel 3106 is able to roll on an upper surface of the road model 2123 to apply a load to the road model 2123. The wheel connecting rod 3107 is a steel round bar, has a lower end connected to the shaft of the wheel 3106 and an upper end connected to one end of a first pull pressure sensor 0102, and is used for fixing the wheel 3106 and transferring a pressure from the first cylinder 3212.

4.2. Simulated Road Load Power System

As shown in FIGS. 3A to 3K, the simulated road load power system 3200 is composed of a simulated road load pneumatic module 3210 and a simulated road load hydraulic module 3220, and is used for providing pneumatic power and hydraulic power during road load simulation.

4.2.1. Simulated Road Load Pneumatic Module

Figure 3C:
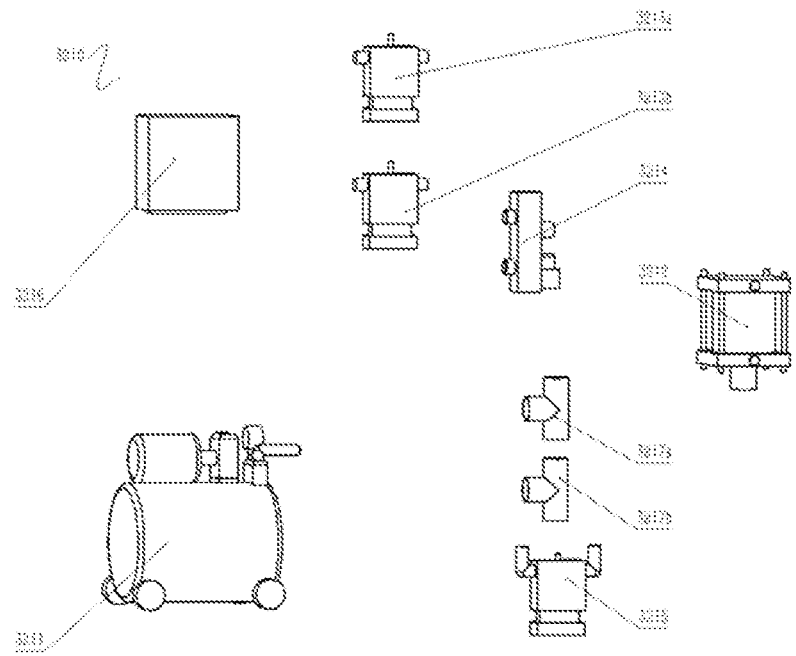
FIG. 3C is a structural diagram of a simulated road load pneumatic module.

As shown in FIG. 3C, the simulated road load pneumatic module 3210 is composed of a first air compressor 3211, the first cylinder 3212, a first pneumatic pressure-regulating valve a 3213a, a first pneumatic pressure-regulating valve b 3213b, a first electromagnetic valve 3214, a first electrical proportional valve 3215, a first PLC 3216, a first pneumatic T-joint a 3217a and a first pneumatic T-joint b 3217b, and is used for providing pneumatic power during a road load simulation test and controlling the load applying manner.

The first air compressor 3211 is a standard air compressor, has an output end connected to an input end of the first pneumatic T-joint a 3217a, and is used for providing an air pressure required by the first cylinder 3212. The first cylinder 3212 is a standard cylinder and has a bottom end fixed on the steel plate at the lower end of the first cylinder fixing rod 3103, a piston rod of the first cylinder 3212 is connected to one end of the first pull pressure sensor 0102, and the first cylinder 3212 is used for driving the wheel 3106 to apply a load to the road model 2123.

The first pneumatic pressure-regulating valve a 3213a and the first pneumatic pressure-regulating valve b 3213b are two standard pneumatic proportional valves, with input ends being connected to output ends of the first pneumatic T-joint a 3217a respectively; an output end of the first pneumatic pressure-regulating valve a 3213a is connected to an input end of the first electrical electromagnetic valve 3214, and an output end of the first pneumatic pressure-regulating valve b 3213b is connected to an input end of the first electrical proportional valve 3215; circuit parts of the first pneumatic pressure-regulating valve a 3213a and the first pneumatic pressure-regulating valve b 3213b are connected to the first PLC 3216; the first pneumatic pressure-regulating valve a 3213a controls the magnitude of an impact load and a vibration load of the first cylinder 3212 through the first PLC 3216; and the first pneumatic pressure-regulating valve b 3213b controls the magnitude of a static load of the first cylinder 3212 through the first PLC 3216.

The first electromagnetic valve 3214 is a standard pneumatic electromagnetic valve, with a gas input end being connected to the output end of the first pneumatic pressure-regulating valve a 3213a, one output end being connected to a front port of the first cylinder 3212, the other output end being connected to one port of the first pneumatic T-joint b 3217b, and a circuit part being connected to the first PLC 3216; and the first electromagnetic valve 3214 controls a piston rod of the first cylinder 3212 to stretch or retreat through the first PLC 3216 to realize an impact load and a vibration load.

The first electrical proportional valve 3215 is a standard electrical proportional valve, with a gas input end being connected to the output end of the first pneumatic pressure-regulating valve b 3213b, an output end being connected to one port of the first pneumatic T-joint b 3217b and a circuit part being connected to the first PLC 3216; and the first electrical proportional valve 3215 controls the magnitude of a thrust from the first cylinder 3212 through the first PLC 3216 to realize a variable static load.

The first PLC 3216 is a standard PLC and has the functions of analog input, relay output and transistor output, wherein a relay output part of the first PLC 3216 is connected to the first electromagnetic valve 3214, a first hydraulic station 3221 and a first hydraulic electromagnetic directional valve 3223, a transistor output part of the first PLC 3216 is connected to circuit parts of the first electrical proportional valve 3215, the first pneumatic pressure-regulating valve a 3213a, the first pneumatic pressure-regulating valve b 3213b and a first electro-hydraulic proportional speed control valve 3224, and an analog input part of the first PLC 3216 is connected to a circuit part of a first hydraulic cylinder stroke sensor 3225; and the first PLC 3216 is used for controlling the manner and magnitude of loads applied by the first cylinder 3212, and the stretching/retreating speed and stroke of the first hydraulic piston rod 3222.

The first pneumatic T-joint a 3217a and the first pneumatic T-joint b 3217b are standard pneumatic joints, three ports of the first pneumatic T-joint a 3217a are connected to the output end of the first air compressor 3211, the input end of the first pneumatic pressure-regulating valve a 3213a and the input end of the first pneumatic pressure-regulating valve b 3213b respectively; three ports of the first pneumatic T-joint b 3217b are connected to one output end of the first electromagnetic valve 3214, one output end of the first electrical proportional valve 3215 and a bottom port of the first cylinder 3212 respectively; and the first pneumatic T-joint a 3217a and the first pneumatic T-joint b 3217b are used for connecting the first electromagnetic valve 3214 and the first electrical proportional valve 3215 in parallel to control the first cylinder 3212 jointly.

4.2.2. Simulated Road Load Hydraulic Module

Figure 3D:
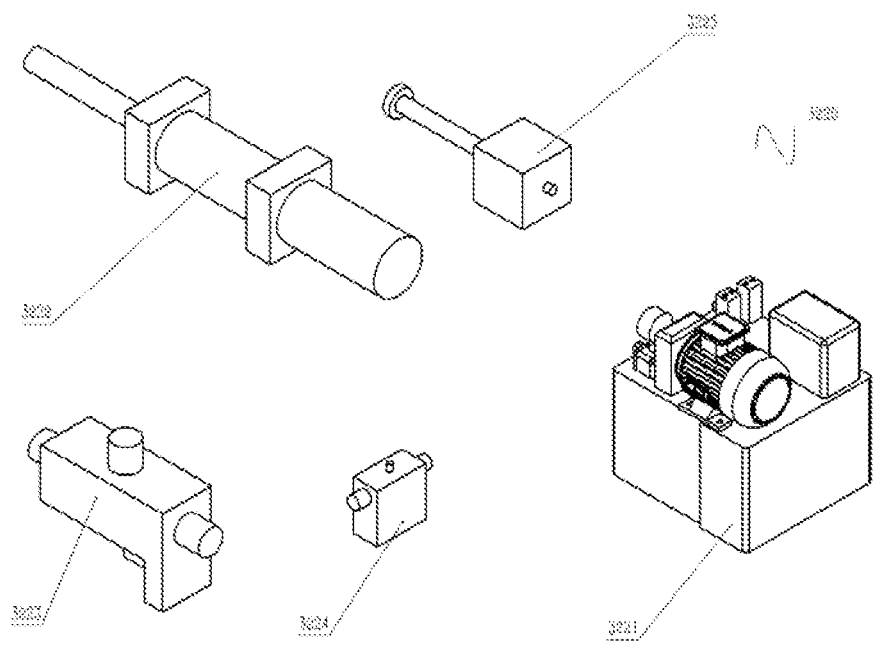
FIG. 3D is a structural diagram of a simulated road load hydraulic module.
Figure 3E:
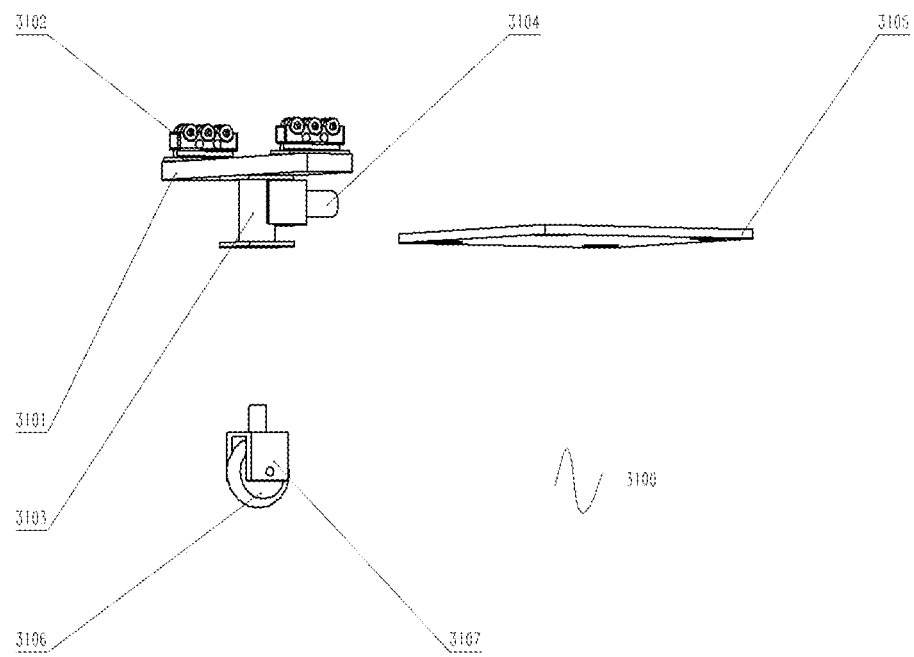
FIG. 3E is a connection diagram of the simulated road load mechanical system.
Figure 3F:
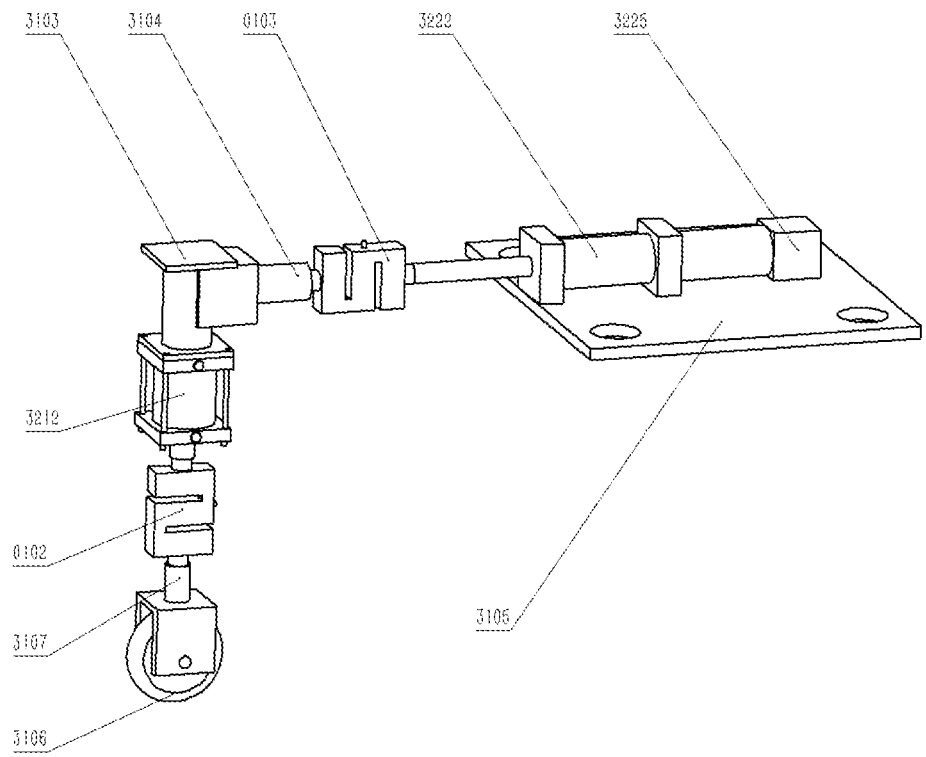
FIG. 3F is an installation diagram of the simulated road load applying part.
Figure 3G:
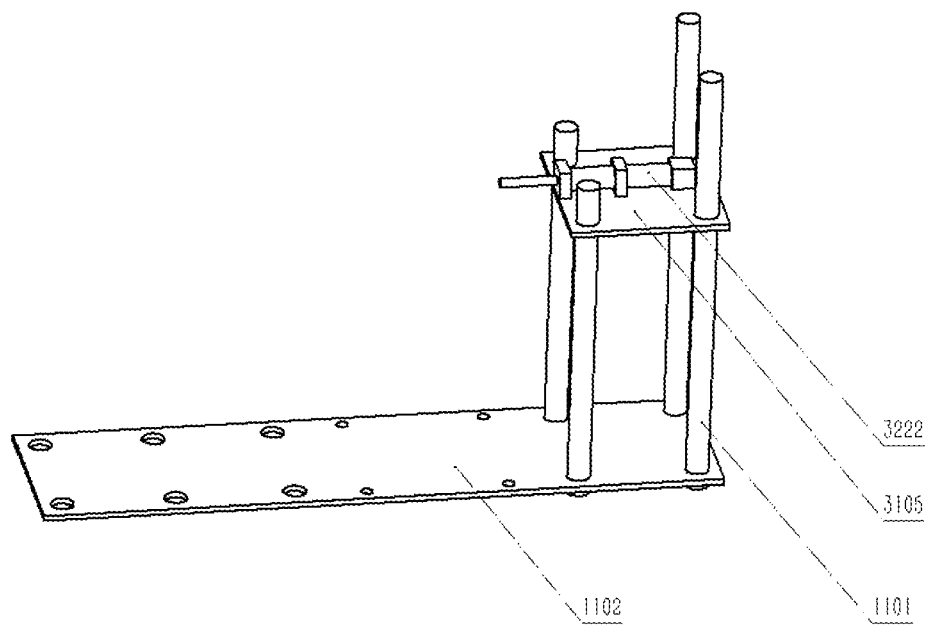
FIG. 3G is an installation diagram of the simulated road load hydraulic module.
Figure 3H:
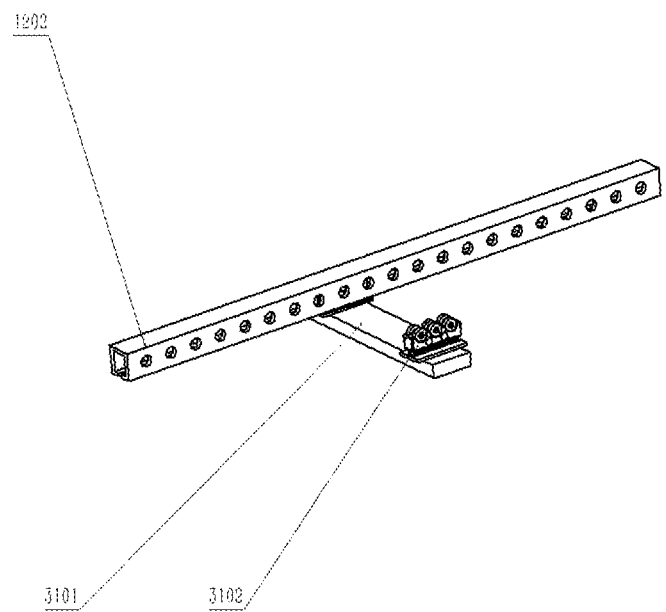
FIG. 3H is an installation diagram of simulated road load pulleys.
Figure 3I:
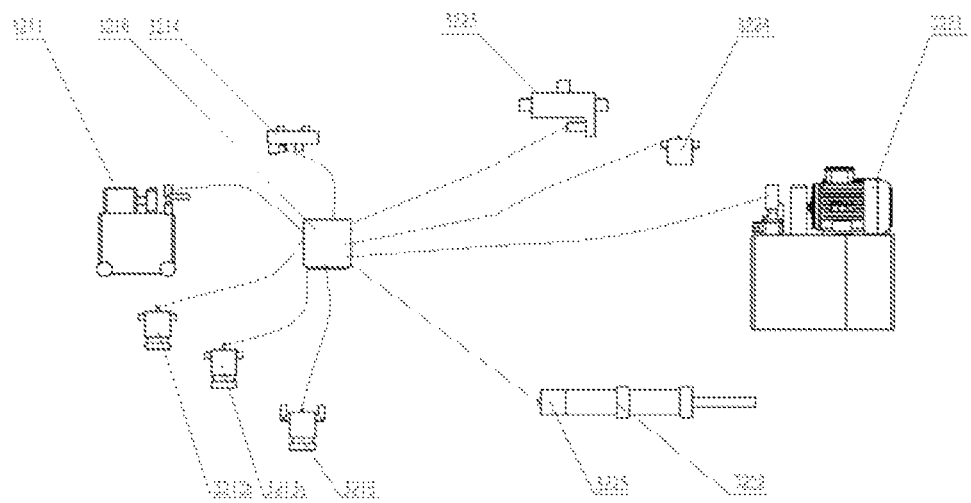
FIG. 3I is a connection diagram of an electrical circuit of the simulated road load applying part.
Figure 3J:
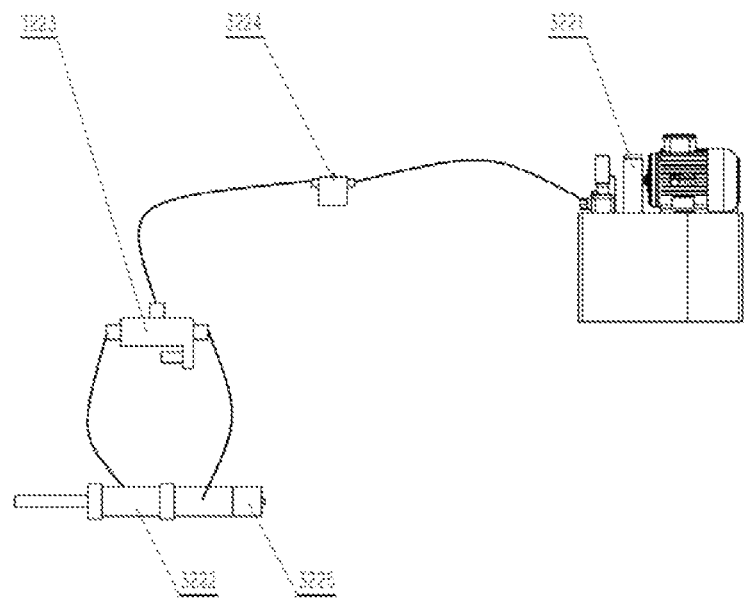
FIG. 3J is a connection diagram of an oil circuit of the simulated road load applying part.
Figure 3K:
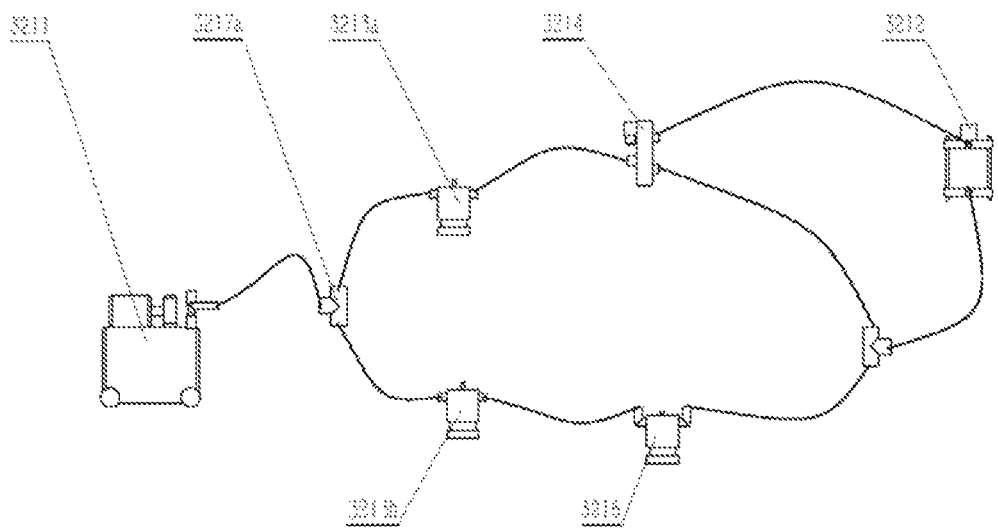
FIG. 3K is a connection diagram of a gas circuit of the simulated road load applying part.

As shown in FIG. 3D, the simulated road load hydraulic module 3220 is composed of the first hydraulic station 3221, the first hydraulic piston rod 3222, the first hydraulic electromagnetic directional valve 3223, the first electro-hydraulic proportional speed control valve 3224 and the first hydraulic cylinder stroke sensor 3225, and is used for pushing the first cylinder fixing rod 3103 to move in the horizontal direction, so as to drive the wheel 3106 to move to simulate rolling of vehicle wheels.

The first hydraulic station 3221 is a standard hydraulic station, with an output end being connected to an input end of the first electro-hydraulic proportional speed control valve 3224 and an electromagnetic switch being connected to the first PLC 3216, is controlled by the first PLC 3216 to start or stop, and is used for providing hydraulic power for the first hydraulic piston rod 3222.

The first hydraulic piston rod 3222 is a standard long-stroke hydraulic piston rod, with a tail end being installed on a first hydraulic piston rod fixing plate 3105 and a top end being connected to one end of a second pull pressure sensor 0103; the first hydraulic cylinder stroke sensor 3225 matched with the first hydraulic piston rod 3222 is installed in the first hydraulic piston rod 3222, a magnet ring part of the first hydraulic cylinder stroke sensor 3225 is installed inside the first hydraulic piston rod 3222, and two oil ports of the first hydraulic piston rod 3222 are connected to two output ends of the first hydraulic electromagnetic directional valve 3223; and the first hydraulic piston rod 3222 is used for pushing the first cylinder fixing rod 3103 to move reversely in the horizontal direction, so as to drive the wheel 3106 to move.

The first hydraulic electromagnetic directional valve 3223 is a standard electromagnetic directional valve, with an input end being connected to an output end of the first electro-hydraulic proportional speed control valve 3224, an output end having two ports being connected to two ports of the first hydraulic piston rod 3222, and a circuit part being connected to the first PLC 3216; and the first hydraulic electromagnetic directional valve 3223 is used for switching between stretching and retreating of the first hydraulic piston rod 3222.

The first electro-hydraulic proportional speed control valve 3224 is a standard electro-hydraulic proportional speed control valve, with an input end being connected to the output end of the first hydraulic station 3221, an output end being connected to the input end of the first hydraulic electromagnetic directional valve 3223, and a circuit part being connected to the first PLC 3216; and the first electro-hydraulic proportional speed control valve 3224 is used for controlling the stretching/retreating speed of the first hydraulic piston rod 3222.

The first hydraulic cylinder stroke sensor 3225 is a standard stroke sensor disposed in hydraulic cylinders, is matched with the first hydraulic piston rod 3222, has a magnetic ring part installed in the first hydraulic piston rod 3222, and moves along with the first hydraulic piston rod 3222 to record the moving distance of the piston rod, and sends out a position signal through a wire; a signal output end of the first hydraulic cylinder stroke sensor 3225 is connected to the analog input part of the first PLC 3216; and the first hydraulic cylinder stroke sensor 3225 is used for acquiring the moving distance of the first hydraulic piston rod 3222 and sending the moving distance back to the first PLC 3216.

Working principle: the simulated road load applying part 3000 is used for applying simulated road loads, the output air pressure of the first pneumatic pressure-regulating valve a 3213a and the first pneumatic pressure-regulating valve b 3213b can be set through the first PLC 3216 to control the magnitude of a vertical load, the first electromagnetic valve 3214 is set to realize an impact load and a vibration load, and the first electrical proportional valve 3215 is set to realize a variable static load, such that loads of different forms and magnitudes can be set according to test requirements; and the output hydraulic pressure of the first hydraulic electromagnetic directional valve 3223 and the first electro-hydraulic proportional speed control valve 3224 can be set through the first PLC 3216 to realize movements of the first hydraulic piston rod 3222 in the horizontal direction. The simulated road load pneumatic module 3210 realizes loads in the vertical direction, the simulated road load hydraulic module 3220 realizes movements in the horizontal direction, and the two modules cooperate to apply various loads on a road.

5. Vertical Load Applying Part

Figure 4A:
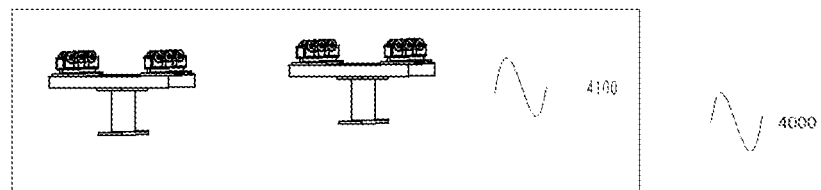
FIG. 4A is a structural diagram of a vertical load applying part in the present invention.
Figure 4A:
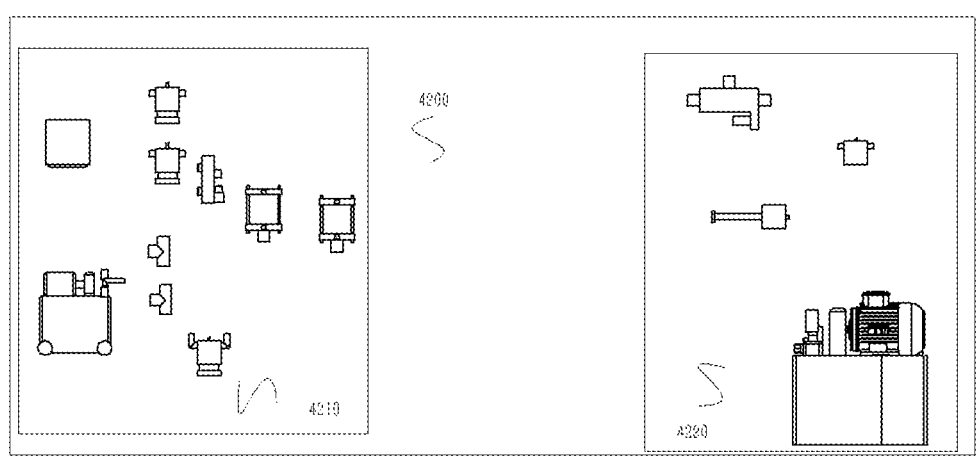

As shown in FIG. 4A, the vertical load applying part 4000 is composed of a vertical load mechanical system 4100 and a vertical load power system 4200, and is used for carrying out a vertical load test such as a vertical impact load test or a vertical static load test.

5.1. Vertical Load Mechanical System

Figure 4B:
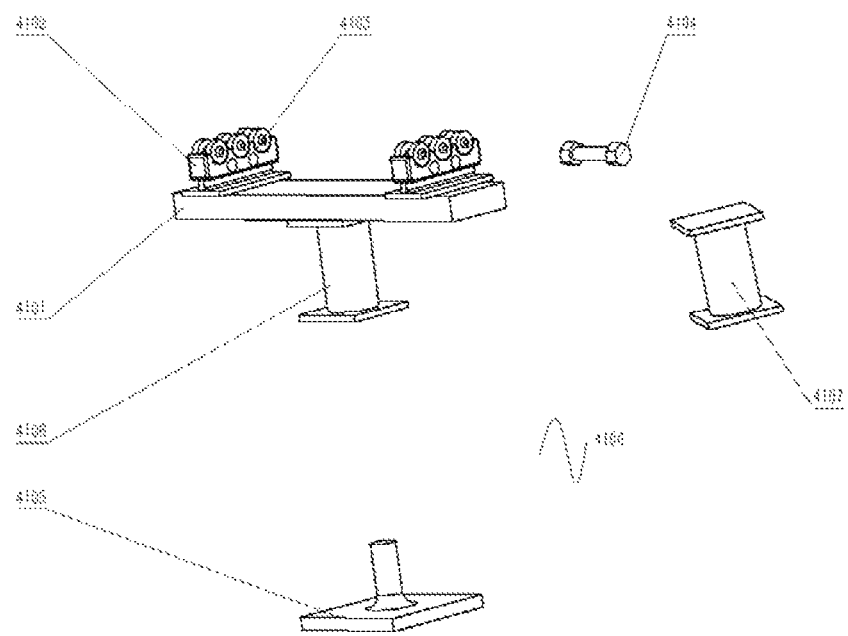
FIG. 4B is a structural diagram of a vertical load mechanical system.
Figure 4C:
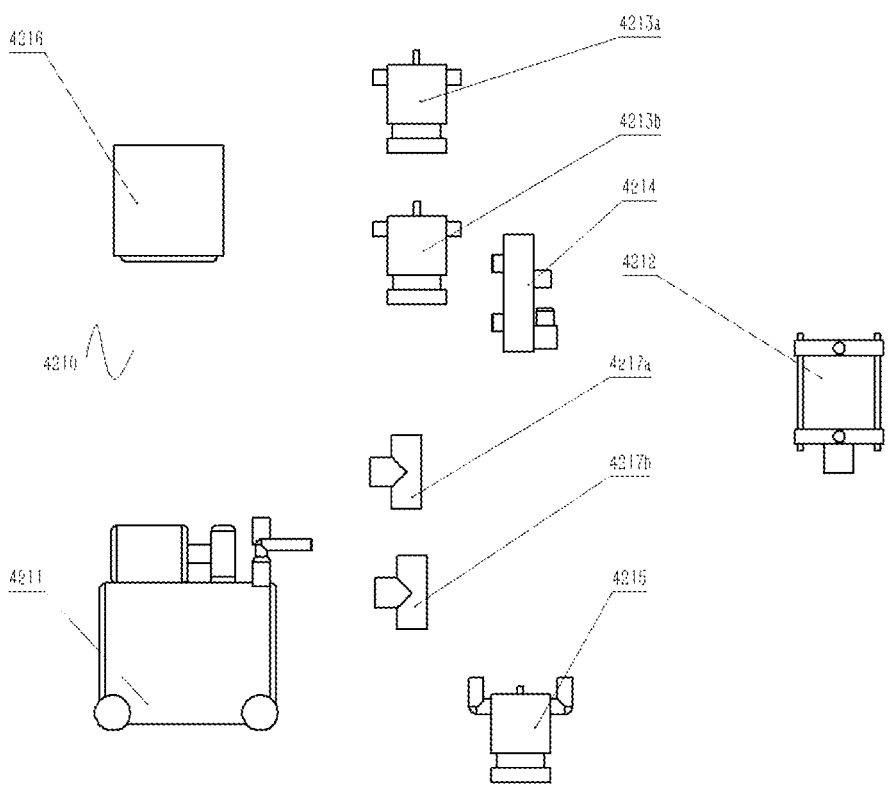
FIG. 4C is a structural diagram of a vertical load pneumatic module.
Figure 4D:
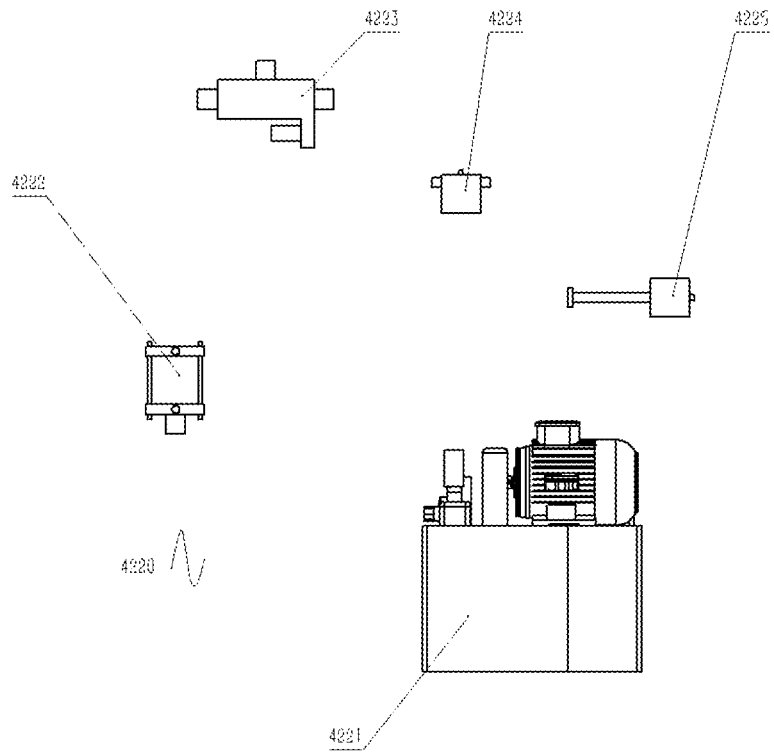
FIG. 4D is a structural diagram of a vertical load hydraulic module.
Figure 4E:
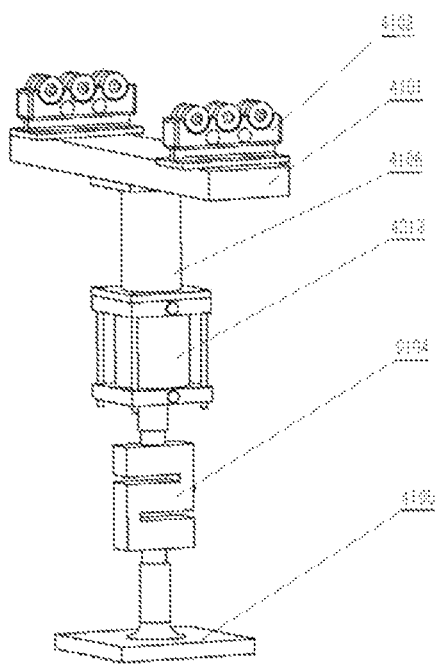
FIG. 4E is an installation diagram of the vertical load mechanical system.
Figure 4F:
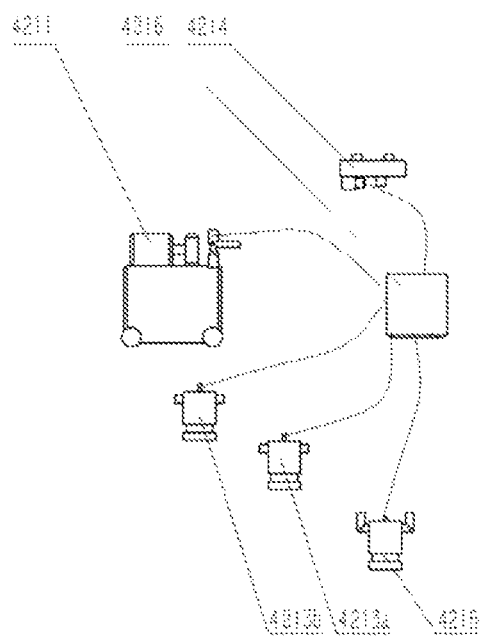
FIG. 4F is a connection diagram of an electrical circuit of the vertical load pneumatic module.
Figure 4G:
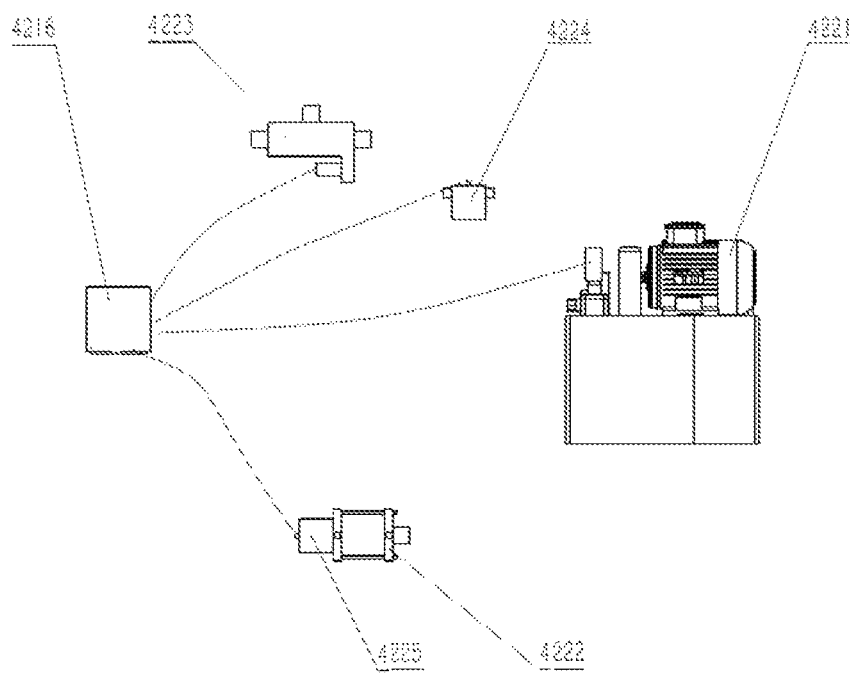
FIG. 4G is a connection diagram of an electrical circuit of the vertical load hydraulic module.
Figure 4H:
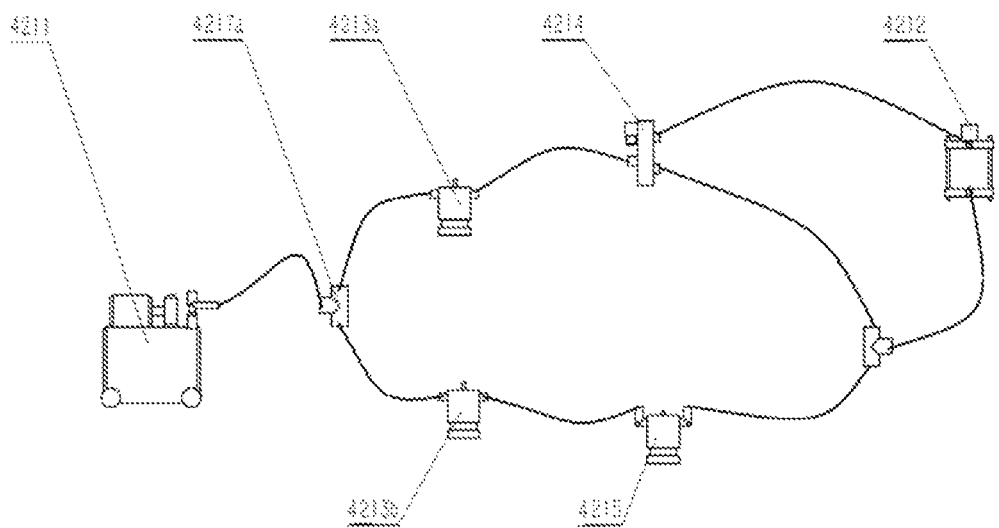
FIG. 4H is a connection diagram of a gas circuit of the vertical load pneumatic module.
Figure 4I:
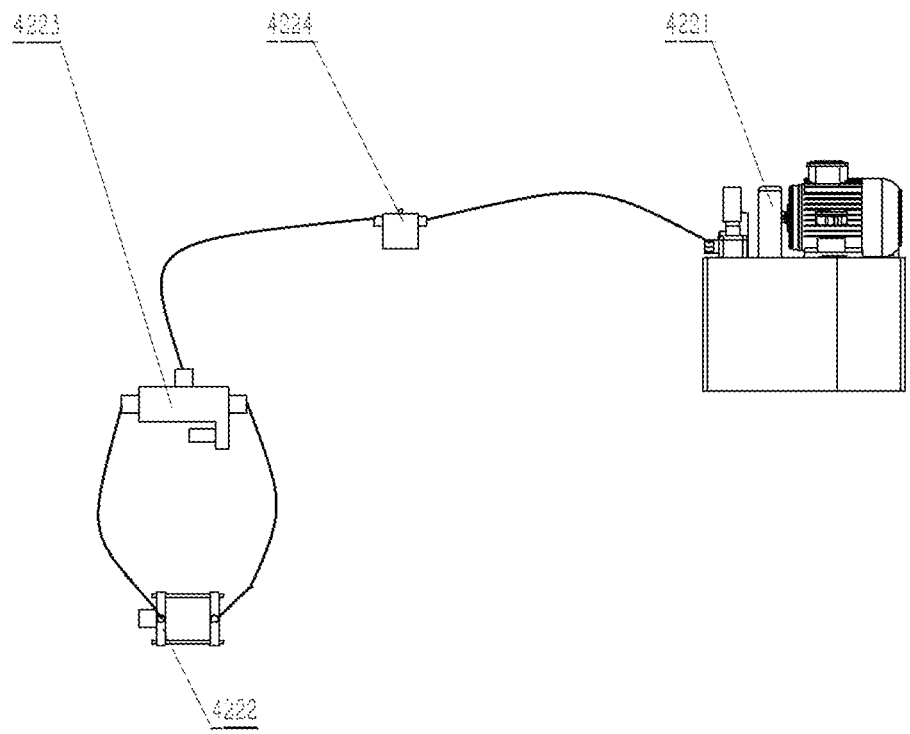
FIG. 4I is a connection diagram of an oil circuit of the vertical load hydraulic module.

As shown in FIGS. 4B and 4E, the vertical load mechanical system 4100 is composed of a vertical load beam 4101, vertical load pulleys 4102, vertical load pulley locating holes 4103, vertical load stop bolts 4104, a vertical load bearing plate 4105, a second cylinder fixing rod 4106 and a second hydraulic cylinder fixing rod 4107, and is used for providing mechanical support and mechanical linkage for the application of a vertical load.

The vertical load beam 4101 is a square steel pole, with two ends being connected to a steel plate on the vertical load pulleys 4102; the center of a lower surface of the vertical load beam 4101 is connected to the second cylinder fixing rod 4106 or the second hydraulic cylinder fixing rod 4107 according to test requirements; the vertical load beam 4101 is installed between the two lower support slides 1202 through the vertical load pulleys 4102, and is able to move horizontally along the lower support slides 1202 and provide a vertical counter-force for the vertical load.

Identical with the sample box pulleys 2202 in structure, the vertical load pulleys 4102 are four steel trolleys, three pairs of wheels 3106 are installed at the bottom of each trolley, the trolleys are able to slide in the grooves in the lower support slides 1202, a rectangular steel plate is welded to upper ends of the vertical load pulleys 4102 and is connected to the two ends of the vertical load beam 4101 through nuts, and the vertical load pulleys 4102 are used for horizontal movements of the vertical load applying part 4000.

Identical with the sample box pulley locating holes 2204 in structure, the vertical load pulley locating holes 4103 are two circular through holes, are located in lateral sides of the vertical load pulleys 4102, and can fix the vertical load pulleys 4102 on the lower support slides 1202 through the vertical load stop bolts 4104 to prevent the vertical load applying part 4000 from moving horizontally.

Identical with the sample box stop bolts 2205 in structure, the vertical load stop bolts 4104 are standard steel bolts, and can penetrate through the vertical load pulley locating holes 4103 and the support slide locating holes 1203 to fix the vertical load pulleys 4102 and the lower support slides 1202 together to prevent the vertical load applying part 4000 from moving horizontally. The vertical load bearing plate 4105 is a rigid steel plate, and has a size slightly smaller than the internal size of the upper direct-shear box 2111 and the sample case 2121; a steel round bar is welded to the center of an upper surface of the vertical load bearing plate 4105, an upper end of the round bar is connected to one end of a third pull pressure sensor 0104, and the round bar is used for transferring a load from the second cylinder 4212 or the second hydraulic cylinder 4222; and the vertical load bearing plate 4105 is used for transferring the load from the second cylinder 4212 or the second hydraulic cylinder 4222 to the sample box part 2000.

The second cylinder fixing rod 4106 is a rigid steel rod, rectangular steel plates are welded to two ends of the second cylinder fixing rod 4106, the rectangular steel plate at an upper end is connected to the vertical load beam 4101, the rectangular steel plate at a lower end is connected to the second cylinder 4212, and the second cylinder fixing rod 4106 is used for connecting the vertical load beam 4101 and the second cylinder 4212. The second hydraulic cylinder fixing rod 4107 is a rigid steel rod, rectangular steel plates are welded to two ends of the second hydraulic cylinder fixing rod 4107, the rectangular steel plate at an upper end is connected to the vertical load beam 4101, the rectangular steel plate at a lower end is connected to the second hydraulic cylinder 4222, and the second hydraulic cylinder fixing rod 4107 is used for connecting the vertical load beam 4101 and the second hydraulic cylinder 4222.

5.2. Vertical Load Power System

The vertical load power system 4200 is composed of a vertical load pneumatic module 4210 and a vertical load hydraulic module 4220, and is used for providing pneumatic power and hydraulic power during a vertical load test.

5.2.1. Vertical Load Pneumatic Module

As shown in FIG. 4C, the vertical load pneumatic module 4210 is composed of a second air compressor 4211, the second cylinder 4212, a second pneumatic pressure-regulating valve a 4213a, a second pneumatic pressure-regulating valve b 4213b, a second electromagnetic valve 4212, a second electrical proportional valve 4215, a second PLC 4216, a second pneumatic T-joint a 4217a and a second pneumatic T-joint b 4217b, and is used for providing pneumatic power for a low load during the vertical load test and controlling the load applying manner.

The second air compressor 4211 is a standard air compressor, has an output end connected to an input end of the second pneumatic T-joint a 4217a, and is used for providing an air pressure required by the second cylinder 4212.

The second cylinder 4212 is a standard cylinder, with a bottom end being fixed on a steel plate at a lower end of the second cylinder fixing rod 4106 and a piston rod being connected to one end of the third pull pressure sensor 0104; and the second cylinder 4212 is used for applying an impact load, a static load and a vibration load in the vertical direction to the sample case 2121 part.

The second pneumatic pressure-regulating valve a 4213a and the second pneumatic pressure-regulating valve b 4213b are two standard pneumatic proportional valves, with input ends being connected to output ends of the second pneumatic T-joint a 4217a; an output end of the second pneumatic pressure-regulating valve a 4213a is connected to an input end of the second electromagnetic valve 4212, an output end of the second pneumatic pressure-regulating valve b 4213b is connected to an input end of the second electrical proportional valve 4215, and circuit parts of the second pneumatic pressure-regulating valve a 4213a and the second pneumatic pressure-regulating valve b 4213b are connected to the second PLC 4216; the second pneumatic pressure-regulating valve a 4213a controls the magnitude of the impact load and the vibration load from the second cylinder 4213 through the second PLC 4216; and the second pneumatic pressure-regulating valve b 4213b controls the magnitude of the static load from the second cylinder 4212 through the second PLC 4216.

The second electromagnetic valve 4214 is a standard pneumatic electromagnetic valve, with a gas input end being connected to the output end of the second pneumatic pressure-regulating valve a 4213a, one output end being connected to a front port of the second cylinder 4212, the other output end being connected to one port of the second pneumatic T-joint b 4217b, and a circuit part being connected to the second PLC 4216; and the second electromagnetic valve 4214 controls a piston rod of the second cylinder 4212 to stretch or retreat through the second PLC 4216 to realize the impact load and the vibration load.

The second electrical proportional valve 4215 is a standard electrical proportional valve, with a gas input end being connected to the output end of the second electromagnetic valve 4214, an output end being connected to one port of the second pneumatic T-joint b 4217b, and a circuit part being connected to the second PLC 4216; and the second electrical proportional valve 4215 controls the magnitude of a thrust from the second cylinder 4212 through the second PLC 4216 to realize a variable static load.

The second PLC 4216 is a standard PLC, and has the functions of analog input, relay output and transistor output, wherein a relay output part of the second PLC 4216 is connected to the second electromagnetic valve 4214, a second hydraulic station 4221 and a second hydraulic electromagnetic directional valve 4223, a transistor output part of the second PLC 4216 is connected to circuit parts of the second electrical proportional valve 4215, the second pneumatic pressure-regulating valve a 4213a, the second pneumatic pressure-regulating valve b 4213b and a second electro-hydraulic proportional speed control valve 4224, and an analog input part of the second PLC 4216 is connected to a circuit part of a second hydraulic cylinder stroke sensor 4225; and the second PLC 4216 is used for controlling the manner and magnitude of loads applied by the second cylinder 4212, and the stretching/retreating speed and stroke of a piston rod of the second hydraulic cylinder 4222.

The second pneumatic T-joint a 4217*a* and the second pneumatic T-joint b 4217*b* are standard pneumatic joints; three ports of the second pneumatic T-joint a 4217*a* are connected to the output end of the second air compressor 4221, the input end of the second pneumatic pressure-regulating valve a 4213*a* and the input end of the second pneumatic pressure-regulating valve b 4213*b* respectively; three ports of the second pneumatic T-joint b 4217*b* are connected to one output end of the second electromagnetic valve 4214, one output end of the second electrical proportional valve 4215 and a bottom port of the second cylinder 4212 respectively; and the second pneumatic T-joint a 4217*a* and the second pneumatic T-joint b 4217*b* are used for connecting the second electromagnetic valve 4214 and the second electrical proportional valve 4215 in parallel to control the second cylinder 4212 jointly.

5.2.2. Vertical Load Hydraulic Module

As shown in FIG. 4D, the vertical load hydraulic module 4220 is composed of the second hydraulic station 4221, the second hydraulic cylinder 4222, the second hydraulic electromagnetic directional valve 4223, the second electro-hydraulic proportional speed control valve 4224, the second hydraulic cylinder stroke sensor 4225 and the third PLC 5206, and is used for providing a large vertical impact load, a large vertical vibration load and a large vertical static load.

The second hydraulic station 4221 is a standard hydraulic station, with an output end being connected to an input end of the second electro-hydraulic proportional speed control valve 4224 and an electromagnetic switch being connected to the second PLC 4216; the second PLC 4216 controls the second hydraulic station 4221 to start or stop; and the second hydraulic station 4221 is used for providing hydraulic power for the second hydraulic cylinder 4222.

The second hydraulic cylinder 4222 is a standard hydraulic cylinder, with a tail end being installed on a steel plate at a bottom end of the second hydraulic cylinder fixing rod 4107; a top end of a piston rod of the second hydraulic cylinder 4222 is connected to one end of the third pull pressure sensor 0104; the second hydraulic cylinder stroke sensor 4225 matched with the second hydraulic cylinder 4222 is installed in the second hydraulic cylinder 4222; a magnetic ring part of the second hydraulic cylinder stroke sensor 4225 is installed on the piston rod in the second hydraulic cylinder 4222; two oil ports of the second hydraulic cylinder 4222 are connected to two output ends of the second hydraulic electromagnetic directional valve 4223; and the second hydraulic cylinder 4222 is used for applying a large vertical impact load, a large vertical static load and a large vertical vibration load to the sample case 2121 part.

The second hydraulic electromagnetic directional valve 4223 is a standard hydraulic electromagnetic directional valve, with input end being connected to an output end of the second electro-hydraulic proportional speed control valve 4224, an output end having two ports being connected to two ports of the second hydraulic cylinder 4222, and a circuit part being connected to the second PLC 4216; and the second hydraulic electromagnetic directional valve 4223 is used for switching between stretching and retreating of the second hydraulic cylinder 4222.

The second electro-hydraulic proportional speed control valve 4224 is a standard electro-hydraulic proportional speed control valve, with an input end being connected to the output end of the second hydraulic station 4221, an output end being connected to the input end of the second hydraulic electromagnetic directional valve 4223, and a circuit part being connected to the second PLC 4216; and the second electro-hydraulic proportional speed control valve 4224 is used for controlling the stretching/retreating speed of the second hydraulic cylinder 4222.

The second hydraulic cylinder stroke sensor 4225 is a standard stroke sensor disposed in hydraulic cylinders, is matched with the second hydraulic cylinder 4222, has a magnetic ring part being installed in the hydraulic piston rod 2, moves along with the piston rod of the second hydraulic cylinder 4222 to record the moving distance of the piston rod, and sends out a positional signal through a wire; a signal output end of the second hydraulic cylinder stroke sensor 4225 is connected to the analog input part of the second PLC 4216; the second hydraulic cylinder stroke sensor 4225 is used for acquiring the moving distance of the hydraulic piston rod 2, and sending the moving distance back to the second PLC 4216.

Working principle: the vertical load applying part 4000 is used for applying vertical loads, the vertical load pneumatic module 4210 is used for applying vertical loads with small pneumatic power, the output air pressure of the second pneumatic pressure-regulating valve a 4213*a* and the second pneumatic pressure-regulating valve b 4213*b* can be set through the second PLC 4216 to control the magnitude of the vertical loads, the second electromagnetic valve 4214 can be controlled by the second PLC 4216 to realize an impact load and a vibration load, the second electrical proportional valve 4215 is set to realize a variable static load, and the form and magnitude of loads are set according to test requirements; the vertical load hydraulic module 4220 is used for applying large vertical loads; the output hydraulic pressure of the second electro-hydraulic proportional speed control valve 4224 is set through the second PLC 4216 to control the magnitude of the vertical loads; and the second hydraulic electromagnetic directional valve 4223 can be controlled by the second PLC controller 4216 to enable the piston rod of the second hydraulic cylinder 4222 to rise or fall.

6. Vertical Load Applying Part

Figure 5A:
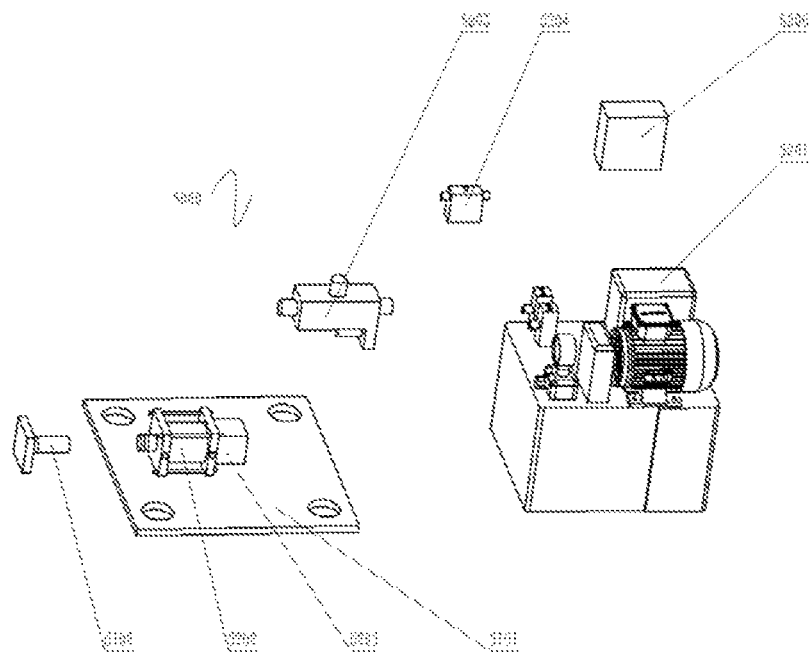
FIG. 5A is a structural diagram of a horizontal load applying part in the present invention.
Figure 5B:
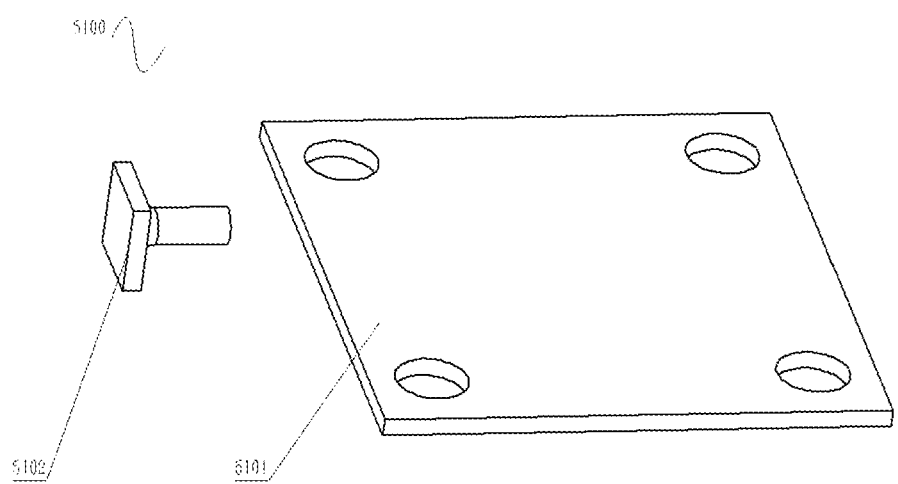
FIG. 5B is a structural diagram of a horizontal load mechanical system.
Figure 5C:
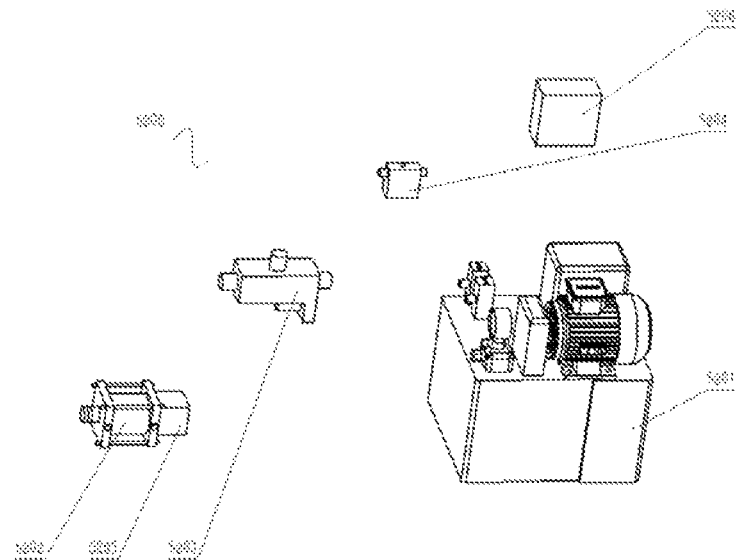
FIG. 5C is a structural diagram of a horizontal load power system.

As shown in FIG. 5A to FIG. 5C, the horizontal load applying part 5000 is composed of a horizontal load mechanical system 5100 and a horizontal load power system 5200, and is used for providing loads in the horizontal direction during the direct-shear test.

6.1. Horizontal Load Mechanical System

As shown in FIG. 5B, the horizontal load mechanical system 5100 is composed of a third hydraulic cylinder fixing plate 5101 and a horizontal load bearing plate 5102, and is used for providing mechanical support and mechanical linkage for the application of horizontal loads.

The third hydraulic cylinder fixing plate 5101 is a rectangular steel plate, with front and rear end each being formed with a circuit hole allowing one vertical support pillar 1101 to penetrate through, is fixed on the vertical support pillars 1101 through nuts, and is located on a right side of the sample box part 2000; a third hydraulic cylinder 5202 is installed on an upper surface of the third hydraulic cylinder fixing plate 5101; and the third hydraulic cylinder fixing plate 5101 is used for fixing the third hydraulic cylinder 5202 and providing a counter-force.

The horizontal load bearing plate 5102 is rigid steel plate and is located on a right side of the lower direct-shear box 2112, a surface of the horizontal load bearing plate 5102 is in contact with a right surface of the lower direct-shear box 2112, a steel round bar is welded to the center of a right surface of the horizontal load bearing plate 5102, a top end of the round bar is connected to one end of a fourth pull pressure sensor 0105, the round bar is used for transferring a load from the third hydraulic cylinder 5202, and the vertical load bearing plate 4105 is used for transferring the load from the third hydraulic cylinder 5202 to the lower direct-shear box 2112.

6.2. Horizontal Load Power System

As shown in FIG. 5C, the horizontal load power system 5200 is composed of a third hydraulic station 5201, the third hydraulic cylinder 5202, a third hydraulic electromagnetic directional valve 5203, a third electro-hydraulic speed control valve 5204, a third hydraulic cylinder stroke sensor 5205 and a third PLC 5206, and is used for providing hydraulic power during the direct-shear test.

The third hydraulic station 5201 is a standard hydraulic station, with an output end being connected to an input end of the third electro-hydraulic proportional speed control valve 5204 and an electromagnetic switch being connected to the third PLC 5206; the third PLC 5206 controls the third hydraulic station 5201 to start or stop; and the third hydraulic station 5201 is used for providing hydraulic power for the third hydraulic cylinder 5202.

The third hydraulic cylinder 5202 is a standard hydraulic cylinder, and is installed on an upper surface of the third hydraulic cylinder fixing plate 5101; a top end of a piston rod of the third hydraulic cylinder 5202 is connected to one end of the fourth pull pressure sensor 0105; the third hydraulic cylinder stroke sensor 5205 matched with the third hydraulic cylinder 5202 is installed in the third hydraulic cylinder 5202; a magnetic ring part of the third hydraulic cylinder stroke sensor 5205 is installed on the piston rod in the third hydraulic cylinder 5202; two oil ports of the third hydraulic cylinder 5202 are connected to two output ends of the third hydraulic electromagnetic directional valve 5203; and the third hydraulic cylinder 5202 is used for applying a large horizontal load to the lower direct-shear box 2112.

The third hydraulic electromagnetic directional valve 5203 is a standard hydraulic electromagnetic directional valve, with an input end being connected to an output end of the third electro-hydraulic proportional speed control valve 5204, an output end having two ports being connected to two ports of the third hydraulic cylinder 5202, and a circuit part being connected to the third PLC 5206; and the third hydraulic electromagnetic directional valve 5203 is used for switching between stretching and retreating of the third hydraulic cylinder 5202.

The third electro-hydraulic proportional speed control valve 5204 is a standard electro-hydraulic proportional speed control valve, with an input end being connected to the output end of the third hydraulic station 5201, an output end being connected to the input end of the third hydraulic electromagnetic directional valve 5203, and a circuit part being connected to the third PLC 5206; and third electro-hydraulic proportional speed control valve 5204 is used for controlling the stretching/retreating speed of the third hydraulic cylinder 5202 to control the shear rate during the direct-shear test.

The third hydraulic cylinder stroke sensor 5205 is a standard stroke sensor disposed in hydraulic cylinders, is matched with the third hydraulic cylinder 5202, has a magnetic ring part being installed in the hydraulic piston rod, moves along with the piston rod of the third hydraulic cylinder 5202 to record the moving distance of the piston rod, and sends out a positional signal through a wire; a signal output end of the third hydraulic cylinder stroke sensor 5205 is connected to an analog input part of the third PLC 5206; the third hydraulic cylinder stroke sensor 5205 is used for acquiring the moving distance of the hydraulic piston rod, and sending the moving distance back to the third PLC 5206.

The third PLC 5206 is a standard PLC, and has the functions of analog input, relay output and transistor output, wherein a relay output part of the third PLC 5206 is connected to the third hydraulic station 5201 and the third hydraulic electromagnetic directional valve 5203, a transistor output part of the third PLC 5206 is connected to the circuit part of the third electro-hydraulic proportional speed control valve 5204, and the analog input part of the third PLC 5206 is connected to the circuit part of third hydraulic cylinder stroke sensor 5205; and the third PLC 5206 is used for controlling the stretching/retreating load, speed and stroke of the third hydraulic cylinder 5202.

Working principle: the horizontal load applying part 5000 is used for providing loads in the horizontal direction to carry out a direct-shear test, and the third PLC 5206 can set the output hydraulic pressure of the third electro-hydraulic proportional speed control valve 5204 and the stretching/retreating speed of the third hydraulic cylinder 5202 to control the shear rate.

7. Lifting Part

Figure 6A:
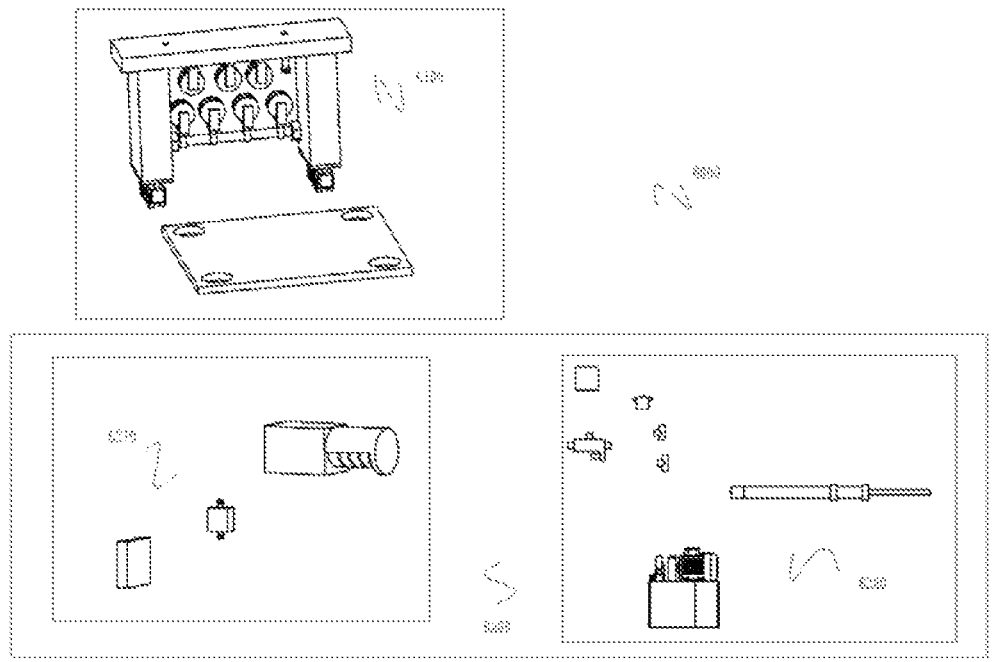
FIG. 6A is a structural diagram of a lifting part in the present invention.
Figure 6B:
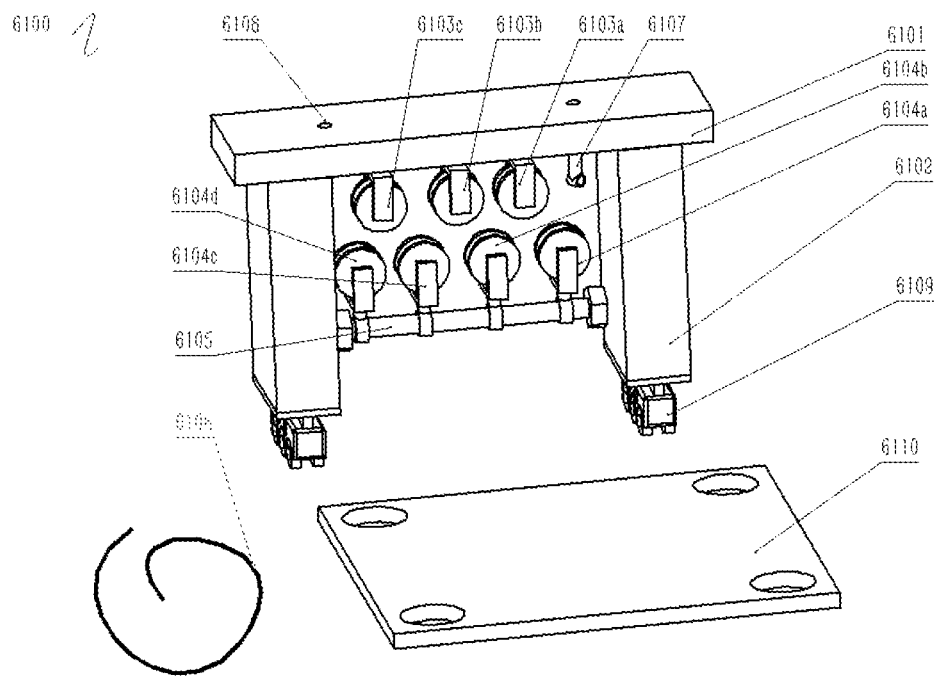
FIG. 6B is a schematic diagram of a lifting mechanical system.
Figure 6C:
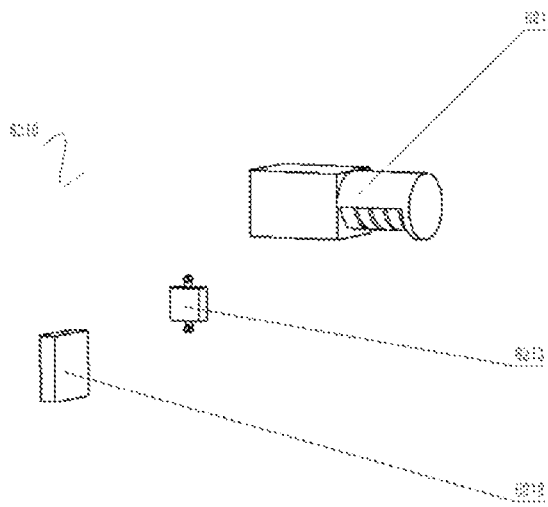
FIG. 6C is a structural diagram of a lifting electrical module.
Figure 6D:
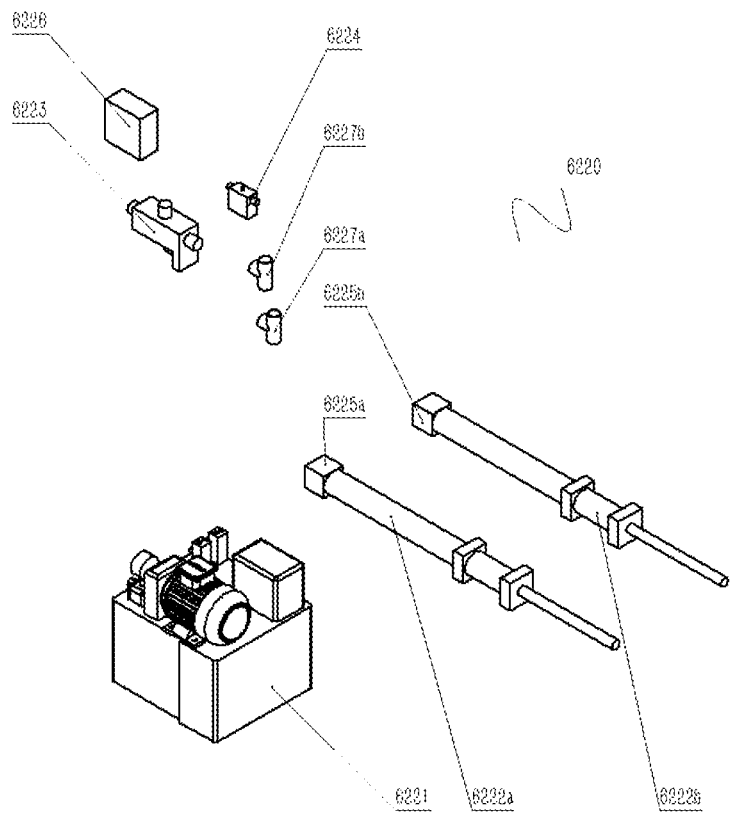
FIG. 6D is a structural diagram of a lifting hydraulic module.
Figure 6E:
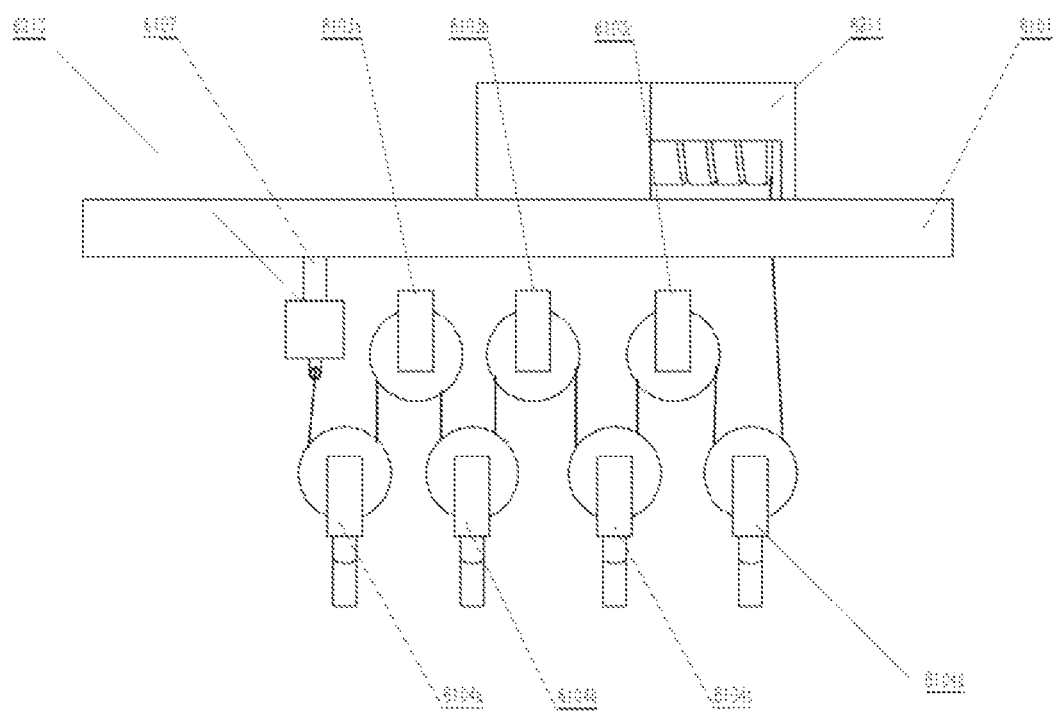
FIG. 6E is an installation diagram of the lifting part.

As shown in FIGS. 6A and 6E, the lifting part 6000 is composed of a lifting mechanical system 6100 and a lifting power system 6200, and is used for lifting and transferring large parts of the test device to reduce the physical labor of test personnel.

7.1. Lifting Mechanical System

As shown in FIG. 6B, the lifting mechanical system 6100 is composed of a lifting beam 6101, lifting pillars 6102, a fixed pulley a 6103a, a fixed pulley b 6103b, a fixed pulley c 6103c, a movable pulley a 6104a, a movable pulley b 6104b, a movable pulley c 6104c, a movable pulley d 6104d, a bearing bar 6105, a steel wire 6106, a steel wire fixing hole 6107, an electrical hoist mounting hole 6108, lifting pulleys 6109 and a fourth hydraulic piston rod fixing plate 6110, and is used for supporting, fixing and transmission during the lifting process.

The lifting beam 6101 is a steel beam, two ends of the lifting beam 6101 are welded to top ends of the lifting pillars 6102, the steel wire fixing hole 6107 and the electrical hoist mounting hole 6108 are disposed on a lower surface of the lifting beam 6101, the fixed pulley a 6103a, the fixed pulley b 6103b and the fixed pulley c 6103c are installed at the center of the lifting beam 6101, an electrical hoist 6211 is installed on an upper surface of the lifting beam 6101, and the lifting beam 6101 is used for fixing and installing the fixed pulley a 6103a, the fixed pulley b 6103b, the fixed pulley c 6103c and the electrical hoist 6211.

The lifting pillars 6102 are two steel pillars, with top ends being welded to the two ends of the lifting beam 6101 and bottom ends being connected to the lifting pulleys 6109; and the lifting pillars 6102 are able to slide horizontally on the upper support slides 1201 with the lifting pulleys 6109, and are used for providing vertical support during the lifting process.

The fixed pulley a 6103a, the fixed pulley b 6103b and the fixed pulley c 6103c are standard fixed pulleys, with fixed ends being installed on the lower surface of the lifting beam 6101 side by side; and the fixed pulley a 6103a, the fixed pulley b 6103b and the fixed pulley c 6103c form a pulley block together with the movable pulley a 6104a, the movable pulley b 6104*b*, the movable pulley c 6104*c* and the movable pulley d 6104*d* to improve the loading capacity of the electrical hoist 6211.

The movable pulley a 6104*a*, the movable pulley b 6104*b*, the movable pulley c 6104*c* and the movable pulley d 6104*d* are standard movable pulleys, and form the pulley block together with the fixed pulley a 6103*a*, the fixed pulley b 6103*b* and the fixed pulley c 6103*c* through the steel wire 6106; steel pull-rings are disposed at lower ends of the movable pulley a 6104*a*, the movable pulley b 6104*b*, the movable pulley c 6104*c* and the movable pulley d 6104*d*; and the bearing bar 6105 penetrates through the four pull-rings to be connected to a weight to be lifted.

The steel wire 6106 is a standard steel wire, and penetrates through the fixed pulley a 6103*a*, the fixed pulley b 6103*b*, the fixed pulley c 6103*c*, the movable pulley a 6104*a*, the movable pulley b 6104*b*, the movable pulley c 6104*c* and the movable pulley d 6104*d*, one end of the steel wire 6106 penetrates through the electrical hoist mounting hole 6108 to be installed on a wheel 3106 of the electrical hoist 6211, and the other end of the steel wire 6106 is connected to a lower end of a digital-display tension meter 6213; and the steel wire 6106 is used for transferring a pulling force from the electrical hoist 6211.

The steel wire fixing hole 6107 is a steel ring and has an upper end welded to the lower surface of the lifting beam 6101, an upper end of the digital-display tension meter 6213 is fixed in the ring, and the steel wire fixing hole 6107 is used for fixing the digital-display tension meter 6213 and one end of the steel wire 6106.

The electrical hoist mounting hole 6108 is a circular through hole, with an inner diameter being greater than an outer diameter of the steel wire 6106; a rope outlet of the electrical hoist 6211 is aligned with the electrical hoist mounting hole 6108; and the steel wire 6106 penetrates through the electrical hoist mounting hole 6108 to be connected to the movable pulley d 6104*d*.

Identical with the sample box pulleys 2202 in structure, the lifting pulleys 6109 are four steel trolleys, three pairs of wheels 3106 are installed at the bottom of each trolley, the trolleys are able to slide in the grooves of the upper support slides 1201, and a rectangular steel plate is welded to upper ends of the lifting pulleys 6109 and is welded to the bottom ends of the lifting pillars 6102; and the lifting pulleys 6109 are used for horizontal movements of the lifting part 6000.

The fourth hydraulic piston rod fixing plate 6110 is a rectangular steel plate, with front and rear ends each being formed with a circular hole allowing one vertical support pillar 1101 to penetrate through, is fixed on the vertical support pillars 1101 through nuts, and is located on the right side of the sample box part 2000; the first hydraulic piston rod 3222 is installed on an upper surface of the fourth hydraulic piston rod fixing plate 6110; and the fourth hydraulic piston rod fixing plate 6110 is used for fixing a fourth hydraulic piston rod a 6222*a* and a fourth hydraulic piston rod b 6222*b* and providing a counter-force.

7.2. Lifting Power System

The lifting power system 6200 is composed of a lifting electrical module 6210 and a lifting hydraulic module 6220, and is used for providing an electrical pulling force and a horizontal hydraulic thrust for lifting.

7.2.1. Lifting Electrical Module

As shown in FIG. 6C, the lifting electrical module 6210 is composed of the electrical hoist 6211, an electrical hoist controller 6212 and the digital-display tension meter 6213, and is used for providing a vertical tension for lifting.

The electrical hoist 6211 is a standard part, and is installed on the upper surface of the lifting beam 6101, a drum of the electrical hoist 6211 is connected to one end of the steel wire 6106, and the electrical hoist 6211 provides an electrical pulling force. The electrical hoist controller 6212 is a controller matched with the electrical hoist 6211, is able to control the drum of the electrical hoist 6211 to rotate forward or reversely so as to control the movable pulley a 6104*a*, the movable pulley b 6104*b*, the movable pulley c 6104*c* and the movable pulley c 6104*c* to rise or fall, and is used for controlling the operation of the electrical hoist 6211.

The digital-display tension meter 6213 is a standard part, with an upper end being installed in the steel wire fixing hole 6107 and a lower end being connected to one end of the steel wire 8106, and is used for displaying the tension of the steel wire 6106 to prevent the tension from exceeding the bearing capacity of the steel wire 6106 or the bearing capacity of the electrical hoist 6211.

7.2.2. Lifting Hydraulic Module

Figure 6F:
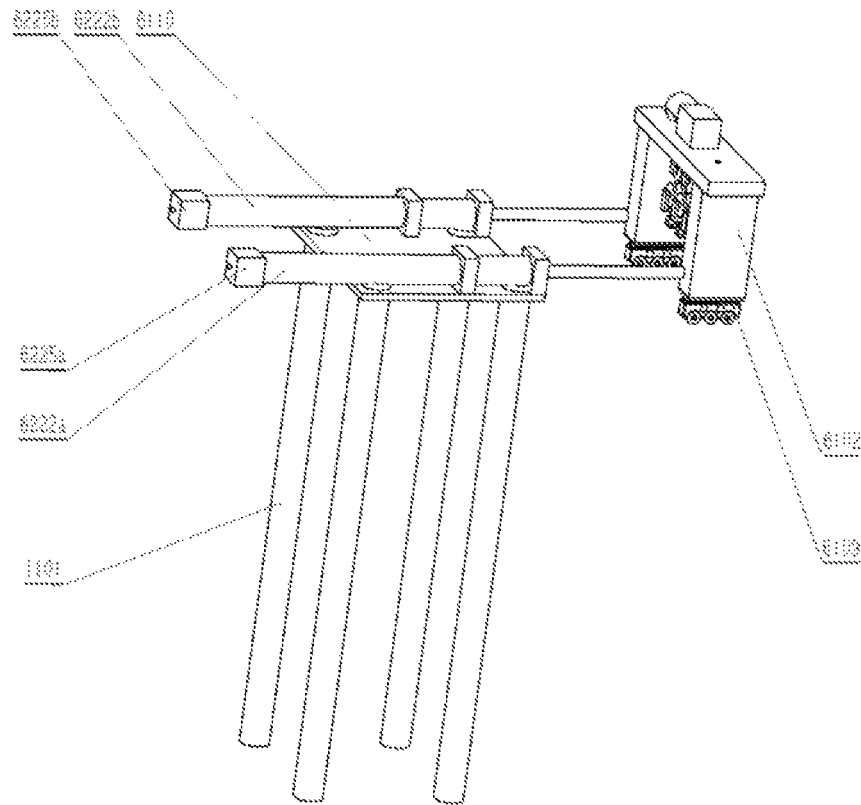
FIG. 6F is an installation diagram of the lifting hydraulic module.
Figure 6G:
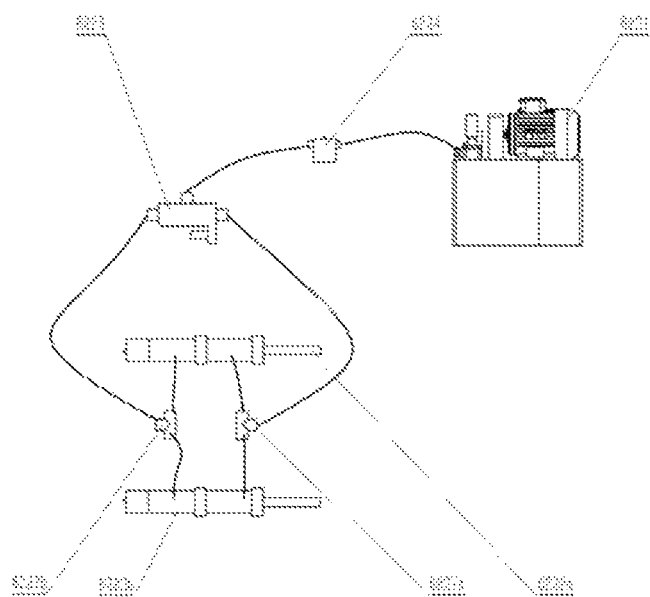
FIG. 6G is a connection diagram of an oil circuit of the lifting part.

As shown in FIGS. 6D and 6F, the lifting hydraulic module 6200 is composed of a fourth hydraulic station 6221, the fourth hydraulic piston rod a 6222*a*, the fourth hydraulic piston rod b 6222*b*, a fourth hydraulic electromagnetic directional valve 6223, a fourth electro-hydraulic proportional speed control valve 6224, a fourth hydraulic cylinder stroke sensor a 6225*a*, a fourth hydraulic cylinder stroke sensor b 6225*b*, a fourth PLC 6226, a hydraulic T-joint a 6227*a* and a hydraulic T-joint b 6227*b*, and is used for providing a horizontal thrust for lifting.

The fourth hydraulic station 6221 is a standard hydraulic station, with an output end being connected to an input end of the fourth electro-hydraulic proportional speed control valve 6224 and an electromagnetic switch being connected to the fourth PLC 6226; the fourth PLC 6226 controls the fourth hydraulic station 6221 to start or stop; and the fourth hydraulic station 6221 is used for providing hydraulic power for the fourth hydraulic piston rod a 6222*a* and the fourth hydraulic piston rod b 6222*b*.

The fourth hydraulic piston rod a 6222*a* and the fourth hydraulic piston rod b 6222*b* are standard parts of long-stroke hydraulic cylinders, and are installed on the upper surface of the fourth hydraulic piston rod fixing plate 6110; the fourth hydraulic cylinder stroke sensor a 6225*a* and the fourth hydraulic cylinder stroke sensor b 6225*b* matched with the fourth hydraulic piston rod a 6222*a* and the fourth hydraulic piston rod b 6222*b* are installed in the fourth hydraulic piston rod a 6222*a* and the fourth hydraulic piston rod b 6222*b* respectively; magnetic ring parts of the fourth hydraulic cylinder stroke sensor a 6225*a* and the fourth hydraulic cylinder stroke sensor b 6225*b* are installed inside the fourth hydraulic piston rod a 6222*a* and the fourth hydraulic piston rod b 6222*b* a respectively; two oil ports of the fourth hydraulic piston rod a 6222*a* are connected to one port of the hydraulic T-joint a 6227*a* and one port of the hydraulic T-joint b 6227*b* respectively; two oil ports of the fourth hydraulic piston rod b 6222*b* are connected to another port of the hydraulic T-joint a 6227*a* and another port of the hydraulic T-joint b 6227*b* respectively; and the fourth hydraulic piston rod a 6222*a* and the fourth hydraulic piston rod b 6222*b* are used for pushing the lifting part 6000 to move horizontally.

The fourth hydraulic electromagnetic directional valve 6223 is a standard hydraulic electromagnetic directional valve, with an input end being connected to an output end of the fourth electro-hydraulic proportional speed control valve 6224, an output end having two ports being connected to one port of the hydraulic T-joint a 6227*a* and one port of the hydraulic T-joint b 6227b respectively, and a circuit part being connected to the fourth PLC 6226; and the fourth hydraulic electromagnetic directional valve 6223 is used for switching between stretching and retreating of the fourth hydraulic piston rod a 6222a and the fourth hydraulic piston rod b 6222b.

The fourth electro-hydraulic proportional speed control valve 6224 is a standard electro-hydraulic proportional speed control valve, with an input end being connected to the output end of the fourth hydraulic station 5221, an output end being connected to the input end of the fourth hydraulic electromagnetic directional valve 6223, and a circuit part being connected to the fourth PLC 6226; and fourth electro-hydraulic proportional speed control valve 6224 is used for controlling the stretching/retreating speed of the fourth hydraulic piston rod a 6222a and the fourth hydraulic piston rod b 6222b.

The fourth hydraulic cylinder stroke sensor a 6225a and the fourth hydraulic cylinder stroke sensor b 6225b are standard stroke sensors disposed in hydraulic cylinders, are matched with the fourth hydraulic piston rod a 6222a and the fourth hydraulic piston rod b 6222b, have magnetic ring parts being installed in the fourth hydraulic piston rod a 6222a and the fourth hydraulic piston rod b 6222b respectively, move along with the piston rods, and record the moving distance of the piston rods, and send out positional signals through wires; signal output ends of the fourth hydraulic cylinder stroke sensors are connected to an analog input part of the fourth PLC 6226; and the fourth hydraulic cylinder stroke sensors are used for acquiring the moving distance of the piston rods and send the moving distance back to the fourth PLC 6226.

The fourth PLC 6226 is a standard PLC, and has the functions of analog input, relay output and transistor output, wherein a relay output part of the fourth PLC 6226 is connected to the fourth hydraulic station 6221 and the fourth hydraulic electromagnetic directional valve 6223, a transistor output part of the fourth PLC 6226 is connected to circuit parts of the fourth electro-hydraulic proportional speed control valve 6224, and the analog input part of the fourth PLC 6226 is connected to a circuit part of the fourth hydraulic cylinder stroke sensor a 6225a and a circuit part of the fourth hydraulic cylinder stroke sensor b 6225b; and the fourth PLC 6226 is used for controlling the stretching/retreating speed and stroke of the hydraulic piston rod a 6222a and the fourth hydraulic piston rod b 6222b.

The hydraulic T-joint a 6227a and the hydraulic T-joint b 6227b are standard hydraulic joints; three ports of the hydraulic T-joint a 6227a are connected to a tail port of the fourth hydraulic piston rod a 6222a, a tail port of the fourth hydraulic piston rod b 6222b and one output port of the fourth hydraulic electromagnetic directional valve 6223 respectively; three ports of the hydraulic T-joint b 6227b are connected to a front port of the fourth hydraulic piston rod a 6222a, a front port of the fourth hydraulic piston rod b 6222b and the other output port of the fourth hydraulic electromagnetic directional valve 6223 respectively; and the hydraulic T-joint a 6227a and the hydraulic T-joint b 6227b are used for separating an oil circuit to allow the fourth hydraulic piston rod a 6222a and the fourth hydraulic piston rod b 6222b to work synchronously.

Working principle: the lifting part 6000 lifts a weight through the electrical hoist 6211, the bearing capacity of the electrical hoist 6211 is improved through the pulley block, the weight is pushed to move horizontally through the fourth hydraulic piston rod a 6222a and the fourth hydraulic piston rod b 6222b, and a load of the lifting part 6000 is detected by means of the digital-display tension meter 6213, such that the weight is prevented from exceeding the bearing capacity of the lifting part 6000.

8. Automatic Sand-Compaction Part

Figure 7A:
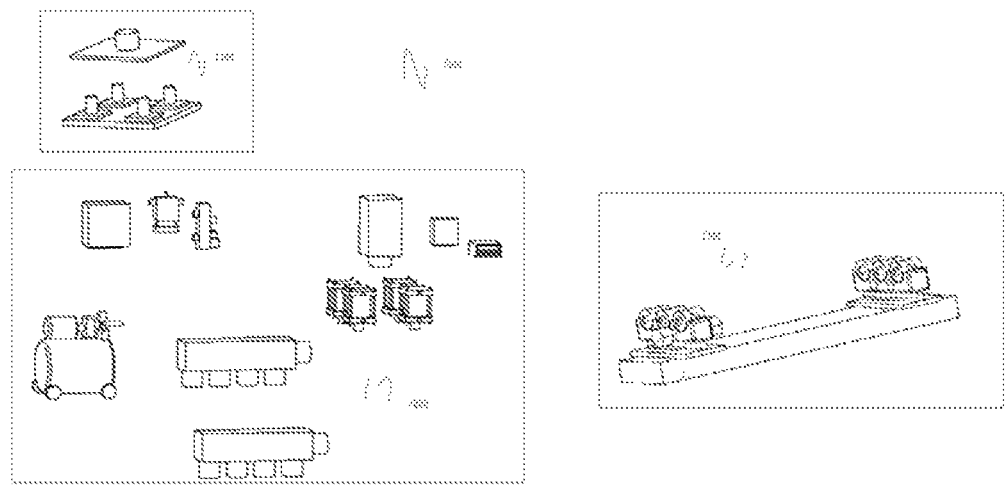
FIG. 7A is a structural diagram of an automatic sand-compaction part in the present invention.
Figure 7B:
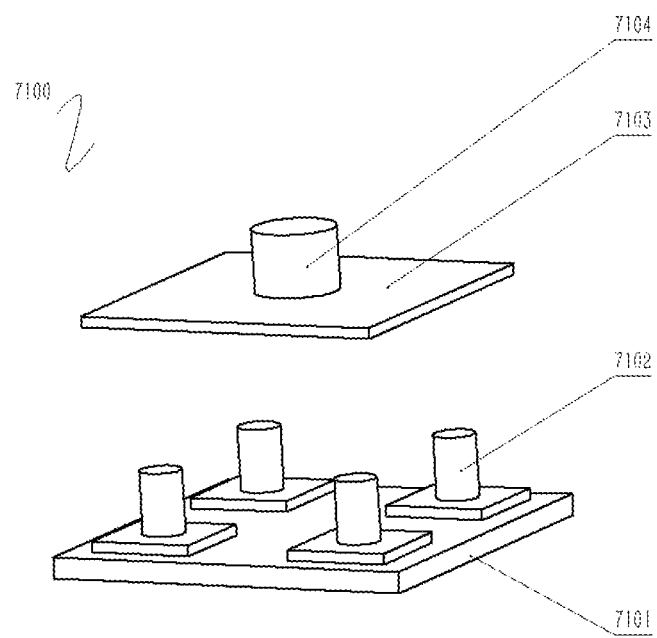
FIG. 7B is a structural diagram of an automatic sand-compaction mechanical system.
Figure 7C:
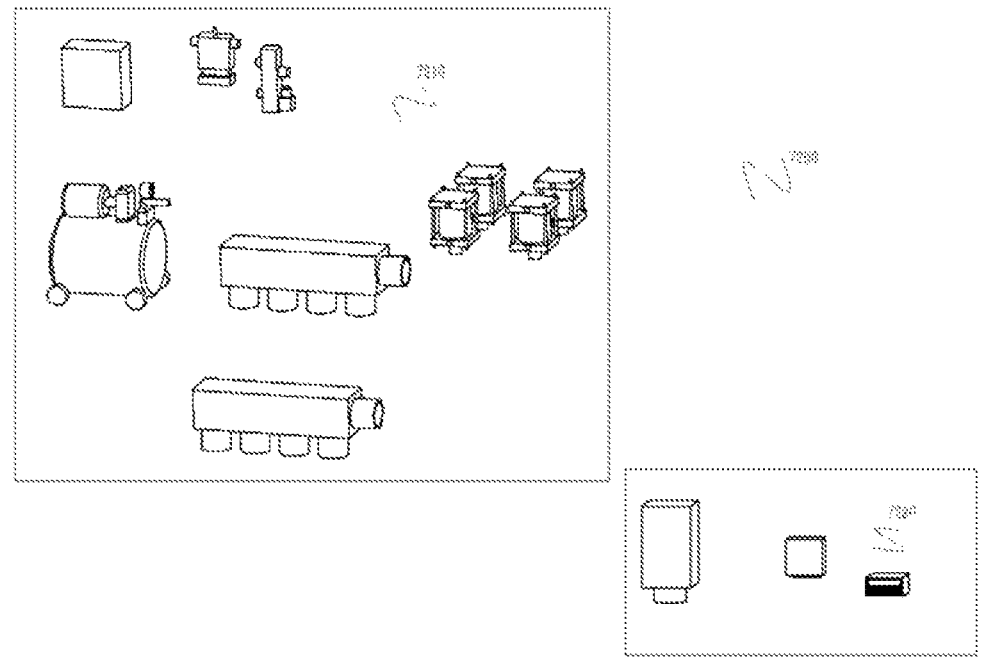
FIG. 7C is a structural diagram of an automatic sand-compaction power system.
Figure 7D:
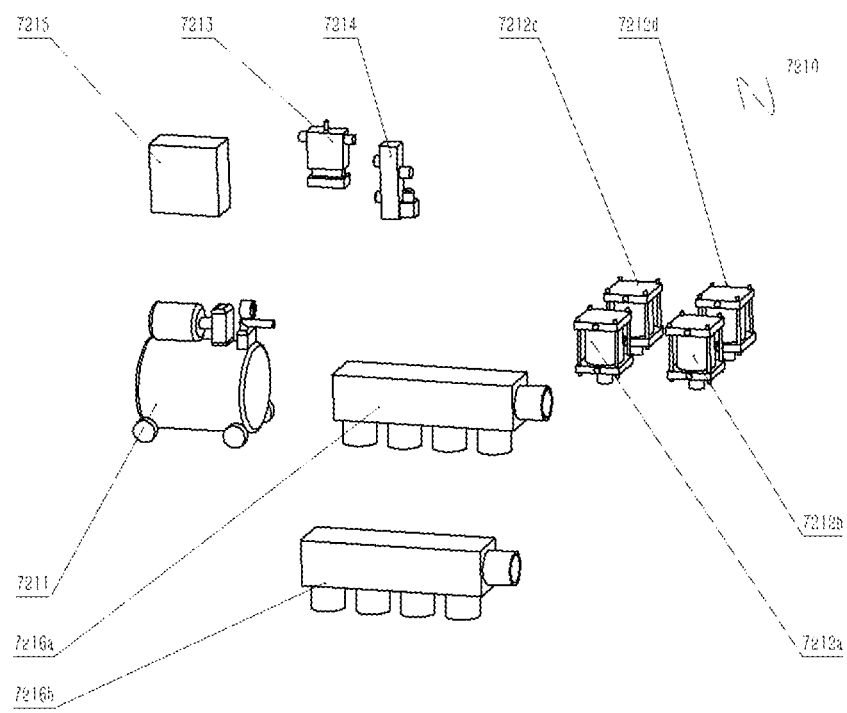
FIG. 7D is a structural diagram of an automatic sand-compaction pneumatic module.
Figure 7E:
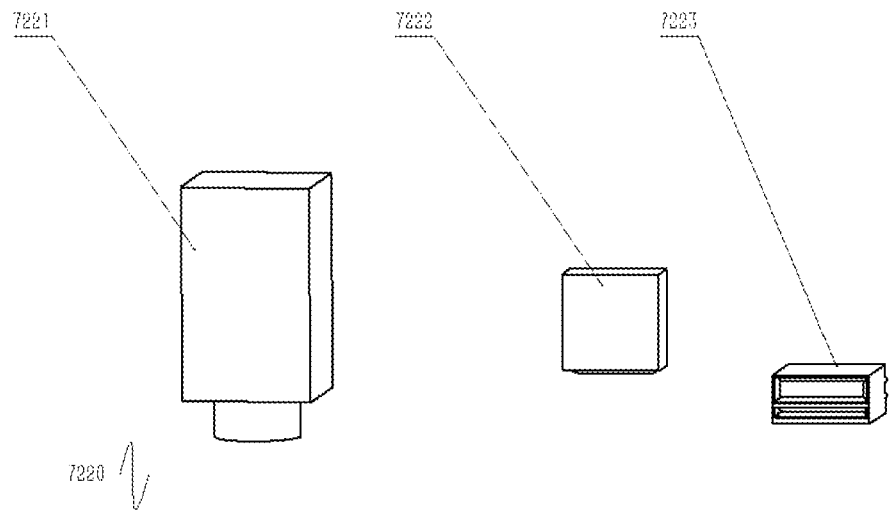
FIG. 7E is a structural diagram of an automatic sand-compaction electrical module.
Figure 7F:
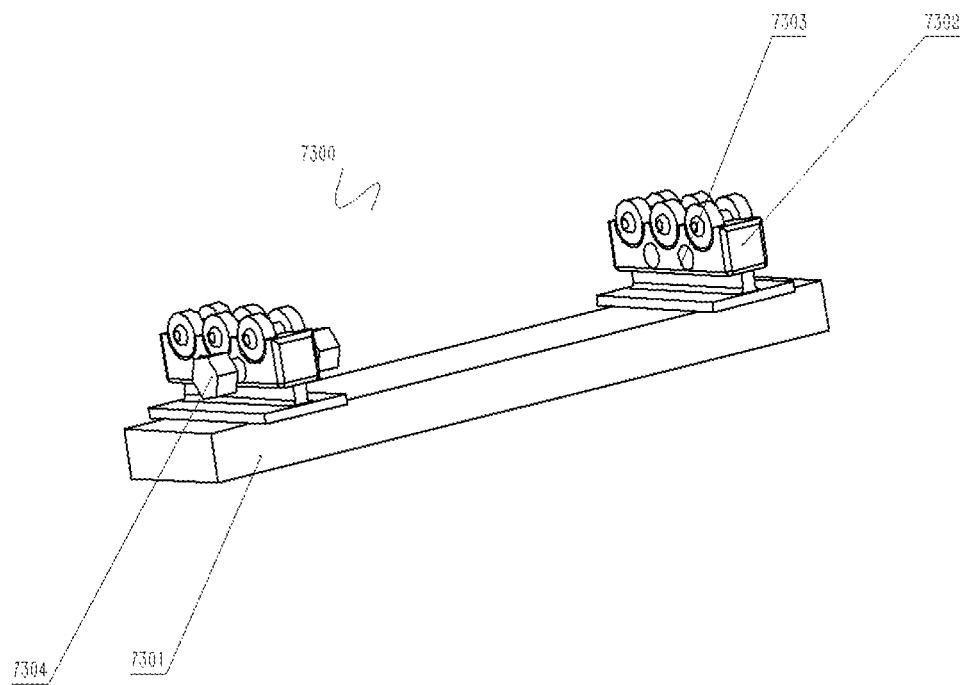
FIG. 7F is a structural diagram of an automatic sand-compaction slide system.
Figure 7G:
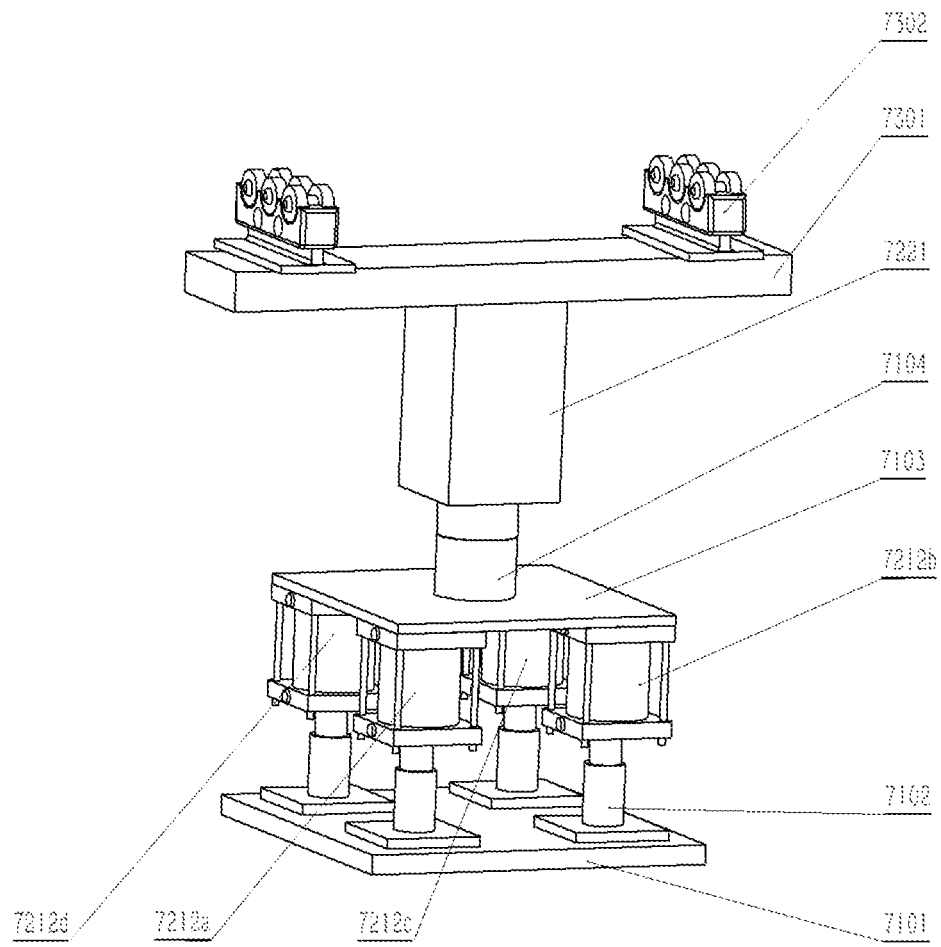
FIG. 7G is an installation diagram of the automatic sand-compaction part.

As shown in FIGS. 7A and 7G, the automatic sand-compaction part 7000 is composed of an automatic sand-compaction mechanical system 7100, an automatic sand-compaction power system 7200 and an automatic sand-compaction slide system 7300, and is used for a soil compaction test.

8.1. Automatic Sand-Compaction Mechanical System

As shown in FIG. 7B, the automatic sand-compaction mechanical system 7100 is composed of a sand-compaction plate 7101, sand-compaction plate fixing rods 7102, a third cylinder mounting plate 7103 and a stepping motor connecting rod 7104, and is used for supporting and connection.

The sand-compaction plate 7101 is a square steel plate, and has a size slightly smaller than that of the sample box system 2100, the sand-compaction plate fixing rods 7102 are welded to four corners of an upper surface of the sand-compaction plate 7101, and the sand-compaction plate 7101 is used for compacting samples.

The sand-compaction plate fixing rods 7102 are four steel columns, with lower ends being welded to the four corners of the sand-compaction plate 7101 and upper ends being connected to piston rods of a third cylinder a 7212a, a third cylinder b 7212b, a third cylinder c 7212c and a third cylinder d 7212d respectively, and are used for connecting the third cylinder a 7212a, the third cylinder b 7212b, the third cylinder c 7212c, the third cylinder d 7212d and the sand-compaction plate 7101, and transferring pressures from the third cylinder a 7212a, the third cylinder b 7212b, the third cylinder c 7212c and the third cylinder d 7212d.

The third cylinder mounting plate 7103 is a square steel plate, the third cylinder a 7212a, the third cylinder b 7212b, the third cylinder c 7212c and the third cylinder d 7212d are welded to four corners of a lower surface of the third cylinder mounting plate 7103, the stepping motor connecting rod 7104 is welded to an upper surface of the third cylinder mounting plate 7103, and the third cylinder mounting plate 7103 is used for fixing the third cylinder a 7212a, the third cylinder b 7212b, the third cylinder c 7212c and the third cylinder d 7212d.

The stepping motor connecting rod 7104 is a steel column, with a lower end being welded to the center of the third cylinder mounting plate 7103 and an upper end being connected to a piston rod of a stepping motor 7221, and is used for connecting the stepping motor 7221 and the third cylinder mounting plate 7103.

8.2. Automatic Sand-Compaction Power System

As shown in FIG. 7C, the automatic sand-compaction power system 7200 is composed of an automatic sand-compaction pneumatic module 7210 and an automatic sand-compaction electrical module 7220, and is used for providing power during the soil compaction test.

8.2.1. Automatic Sand-Compaction Pneumatic Module

As shown in FIG. 7D, the automatic sand-compaction pneumatic module 7210 is composed of a third air compressor 7211, the third cylinder a 7212a, the third cylinder b 7212b, the third cylinder c 7212c, the third cylinder d 7212d, a third pneumatic pressure-regulating valve 7213, a third electromagnetic valve 7214, a fifth PLC 7215, a pneumatic five-way joint a 7216a and a pneumatic five-way joint b 7216b, and is used for providing pneumatic power for the soil compaction test.

The third air compressor 7211 is a standard air compressor, with an output end being connected to an input end of the third pneumatic pressure-regulating valve 7213, and is used for providing an air pressure required by the third cylinder a 7212a, the third cylinder b 7212b, the third cylinder c 7212c and the third cylinder d 7212d.

The third cylinder a 7212a, the third cylinder b 7212b, the third cylinder c 7212c and the third cylinder d 7212d are four standard cylinders of the same model, with bottom ends being fixed to four corners of the third cylinder mounting plate 7103; piston rods of the third cylinder a 7212a, the third cylinder b 7212b, the third cylinder c 7212c and the third cylinder d 7212d are connected to the upper ends of the four sand-compaction plate fixing rods 7102; and the third cylinder a 7212a, the third cylinder b 7212b, the third cylinder c 7212c and the third cylinder d 7212d are used for driving the sand-compaction plate 7101 to impact or vibrate vertically.

The third pneumatic pressure-regulating valve 7213 is a standard pneumatic proportional valve, with an input end being connected to the output end of the third air compressor 7211, an output end being connected to an input end of the third electromagnetic valve 7214, and a circuit part being connected to the fifth PLC 7215; and the third pneumatic pressure-regulating valve 7213 controls the magnitude of an impact load and a vibration load from the third cylinder a 7212a, the third cylinder b 7212b, the third cylinder c 7212c and the third cylinder d 7212d through the fifth PLC 7215.

The third electromagnetic valve 7214 is a standard pneumatic electromagnetic valve, with a gas input end being connected to the output end of the third pneumatic pressure-regulating valve 7213, two output ends being connected to an input end of the pneumatic five-way joint a 7216a and an input end of the pneumatic five-way joint b 7216b respectively, and a circuit part being connected to the fifth PLC 7215; and the third electromagnetic valve 7214 controls the piston rods of the third cylinder a 7212a, the third cylinder b 7212b, the third cylinder c 7212c and the third cylinder d 7212d to stretch or retreat through the fifth PLC 7215, so as to realize the impact load and the vibration load.

The fifth PLC 7215 is a standard PLC, and has the functions of relay output and transistor output, wherein a relay output part of the fifth PLC 7215 is connected to the third electromagnetic valve 7214, a transistor output part of the third electromagnetic valve 7214 is connected to the circuit part of the third pneumatic pressure-regulating valve 7213; and the fifth PLC 7215 is used for controlling the manner and magnitude of loads applied by the third cylinder a 7212a, the third cylinder b 7212b, the third cylinder c 7212c and the third cylinder d 7212d.

The pneumatic five-way joint a 7216a and the pneumatic five-way joint b 7216b are standard pneumatic joints; five ports of the pneumatic five-way joint a 7216a are connected to one output end of the third electromagnetic valve 7214, one gas port of the third cylinder a 7212a, one gas port of the third cylinder b 7212b, one gas port of the third cylinder b 7212b and one gas port of the third cylinder d 7212d respectively; five ports of the pneumatic five-way joint b 7216b are connected to the other output end of the third electromagnetic valve 7214, the other gas port of the third cylinder a 7212a, the other gas port of the third cylinder b 7212b, the other gas port of the third cylinder b 7212b and the other gas port of the third cylinder d 7212d respectively; and the pneumatic five-way joint a 7216a and the pneumatic five-way joint b 7216b are used for separating a gas circuit to allow the third cylinder a 7212a, the third cylinder b 7212b, the third cylinder c 7212c and the third cylinder d 7212d to be in the same working state.

8.2.2. Automatic Sand-Compaction Electrical Module

As shown in FIG. 7E, the automatic sand-compaction electrical module 7220 is composed of a stepping motor 7221, a stepping motor driver 7222 and a stepping motor controller 7223, and is used for providing an electrical thrust during the soil compaction test.

The stepping motor 7221 is a standard stepping motor, with a bottom end being connected to an upper end of the stepping motor connecting rod 7104; and the stepping motor 7221 is fixed on the automatic sand-compaction beam 7301 through a flange plate, and is used for controlling the third cylinder a 7212a, the third cylinder b 7212b, the third cylinder c 7212c and the third cylinder d 7212d to rise or fall, so as to realize layer-by-layer quantitative sand-compaction.

The stepping motor driver 7222 is a standard part matched with the stepping motor 7221, has a circuit part connected between the stepping motor 7221 and the stepping motor controller 7223, and is used for driving the stepping motor 7221.

The stepping motor controller 7223 is a standard part matched with the stepping motor 7221, has a circuit part connected to the stepping motor driver 7222, and is used for controlling the stepping motor 7221 to stretch or retreat.

8.3. Automatic Sand-Compaction Slide System

As shown in FIG. 7F, the automatic sand-compaction slide system 7300 is composed of an automatic sand-compaction beam 7301, automatic sand-compaction pulleys 7302, automatic sand-compaction pulley locating holes 7303 and automatic sand-compaction stop bolts 7304, and is used for horizontal movements of the automatic sand-compaction part 7000.

The automatic sand-compaction beam 7301 is a steel beam, with two ends being connected to a steel plate on the automatic sand-compaction pulleys 7302 through bolts; a circular through hole is formed in the center of the automatic sand-compaction beam 7301 and allows a tail end of the stepping motor 7221 to penetrate through; a lower surface of the automatic sand-compaction beam 7301 is connected to the stepping motor 7221 through a flange plate; and the automatic sand-compaction beam 7301 is used for fixing the stepping motor 7221 and providing a counter-force.

Identical with the sample box pulleys 2202 in structure, the automatic sand-compaction pulleys 7302 are for steel trolleys, three pairs of wheels 3106 are installed at the bottom of each trolley, the trolleys are able to slide in the grooves of the lower support slides 1202, a rectangular steel plate is welded to upper ends of the automatic sand-compaction pulleys 7302 and is connected to the two ends of the automatic sand-compaction beam 7301, and the automatic sand-compaction pulleys 7302 are used for horizontal movements of the automatic sand-compaction part 7000.

Identical with the sample box pulley locating holes 2204 in structure, the automatic sand-compaction pulley locating holes 7303 are two circular through holes, are located in lateral sides of the automatic sand-compaction pulleys 7302, and can fix the automatic sand-compaction pulleys 7302 on the lower support slides 1202 through the automatic sand-compaction stop bolts 7304 to prevent the automatic sand-compaction part 7000 from moving horizontally.

Identical with the sample box stop bolts 2205 in structure, the automatic sand-compaction stop bolts 7304 are standard steel bolts, and can penetrate through the automatic sand-compaction pulley locating holes 7303 and the support slide locating holes 1203 to fix the automatic sand-compaction pulleys 7302 and the lower support slides 1202 together, so as to prevent the automatic sand-compaction part 7000 from moving horizontally.

Working principle: the automatic sand-compaction part 7000 controls the thickness of each layer of samples through rising or falling of the piston rod of the stepping motor 7221, the third cylinder a 7212a, the third cylinder b 7212b, the third cylinder c 7212c and the third cylinder d 7212d drive the sand-compaction plate 7101 to compact the samples, and the fifth PLC 7215 controls the compaction load and frequency.

9. Water-Level Fluctuation Part

Figure 8A:
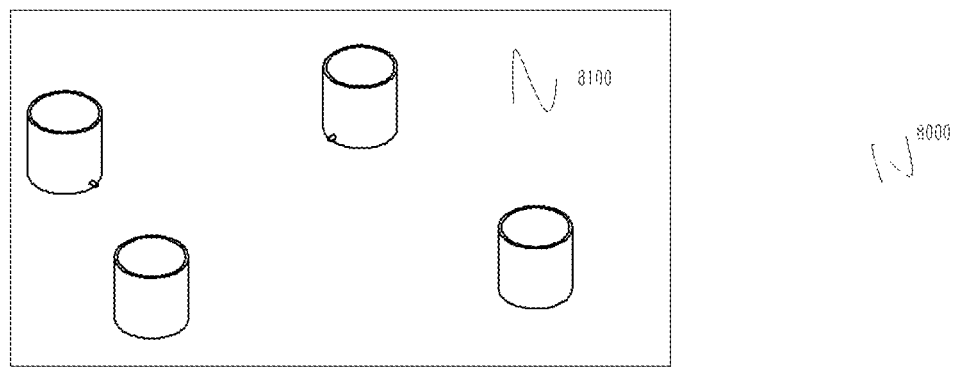
FIG. 8A is a structural diagram of a water-level fluctuation part in the present invention.
Figure 8A:
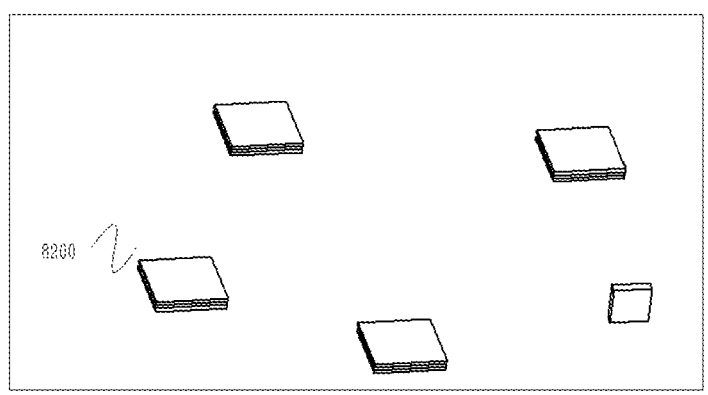

As shown in FIG. 8A, the water-level fluctuation part 8000 is composed of a water-level fluctuation mechanical system 8100 and a water-level fluctuation power system 8200, and is used for controlling the water level in the sample case 2121 to rise or fall to simulate the influence of a tide on the samples.

9.1. Water-Level Fluctuation Mechanical System

Figure 8B:
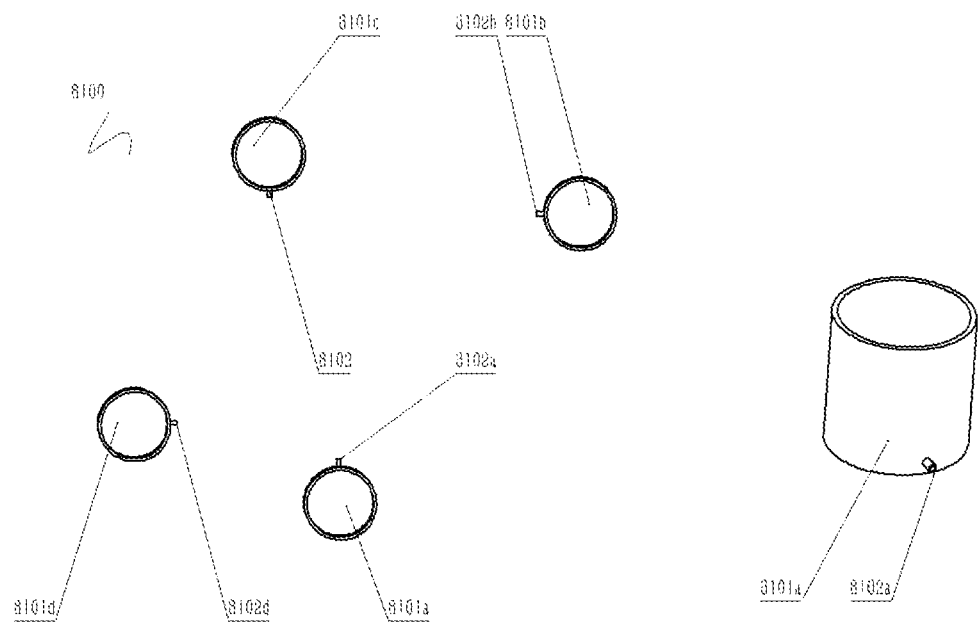
FIG. 8B is a structural diagram of a water-level fluctuation mechanical system.
Figure 8C:
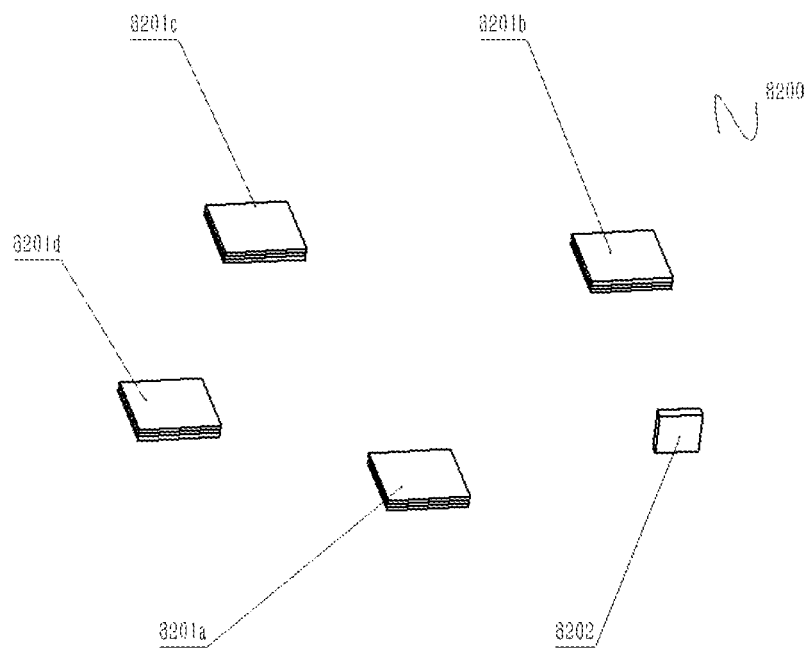
FIG. 8C is a structural diagram of a water-level fluctuation power system.
Figure 8D:
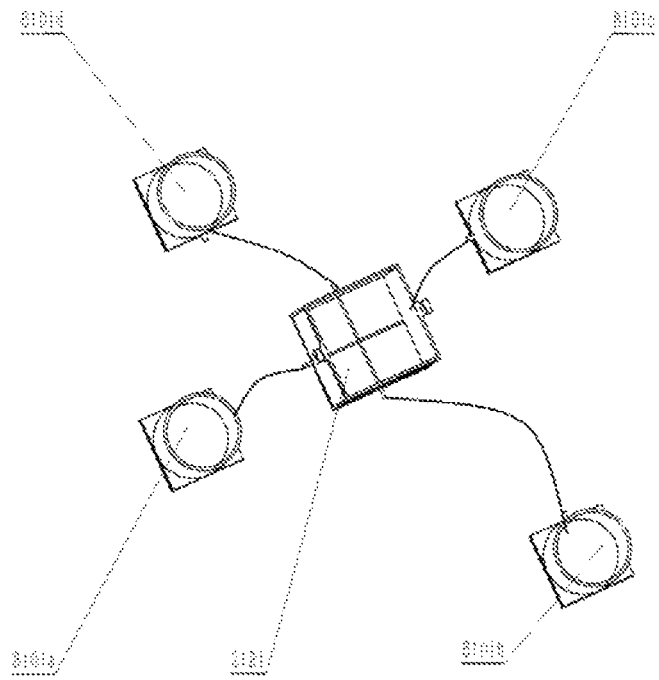
FIG. 8D is an installation diagram of the water-level fluctuation mechanical system.
Figure 8E:
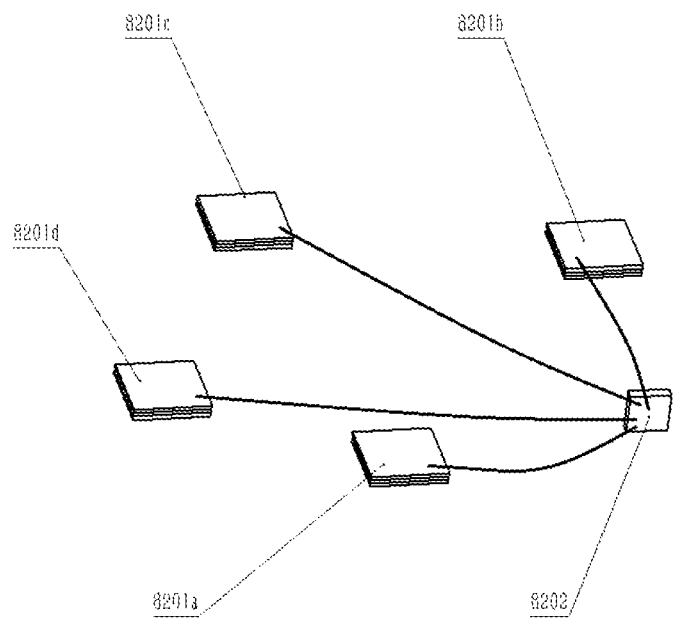
FIG. 8E is a connection diagram of the water-level fluctuation power system.

As shown in FIGS. 8B and 8D, the water-level fluctuation mechanical system 8100 is composed of a first water tank a 8101a, a first water tank b 8101b, a first water tank c 8101c, a first water tank d 8101d, a water outlet a 8102a, a water outlet b 8102b, a water outlet c 8102c and a water outlet d 8102d, and is used for providing water required by a water-level fluctuation test.

The first water tank a 8101a, the first water tank b 8101b, the first water tank c 8101c and the first water tank d 8101d are circular transparent containers; the water outlet a 8102a, the water outlet b 8102b, the water outlet c 8102c and the water outlet d 8102d are formed in the bottom of the first water tank a 8101a, the bottom of the first water tank b 8101b, the bottom of the first water tank c 8101c and the bottom of the first water tank d 8101d respectively; and the first water tank a 8101a, the first water tank b 8101b, the first water tank c 8101c and the first water tank d 8101d are disposed on a hydraulic lifting platform a 8201a, a hydraulic lifting platform b 8201b, a hydraulic lifting platform c 8201c and a hydraulic lifting platform d 8201d respectively, and are used for providing water required by the water-level fluctuation test.

The water outlet a 8102a, the water outlet b 8102b, the water outlet c 8102c and the water outlet d 8102d are small circular tubes; openings of the water outlet a 8102a, the water outlet b 8102b, the water outlet c 8102c and the water outlet d 8102d are connected to the bottom of the first water tank a 8101a, the bottom of the first water tank b 8101b, the bottom of the first water tank c 8101c and the bottom of the first water tank d 8101d respectively; and the other end of the water outlet a 8102a, the other end of the water outlet b 8102b, the other end of the water outlet c 8102c and the other end of the water outlet d 8102d are connected to a water inlet a 2124a, a water inlet b 2124b, a water inlet c 2124c, and a water inlet d 2124d respectively.

9.2. Water-Level Fluctuation Power System

As shown in FIG. 8C, the water-level fluctuation power system 8200 is composed of the hydraulic lifting platform a 8201a, the hydraulic lifting platform b 8201b, the hydraulic lifting platform c 8201c, the hydraulic lifting platform d 8201d and a hydraulic lifting platform controller 8202, and is used for controlling the water level in the sample box part 2000 to rise or fall.

The hydraulic lifting platform a 8201a, the hydraulic lifting platform b 8201b, the hydraulic lifting platform c 8201c and the hydraulic lifting platform d 8201d are standard parts and are controlled by the hydraulic lifting platform controller 8202 to rise or fall; the first water tank a 8101a, the first water tank b 8101b, the first water tank c 8101c and the first water tank d 8101d are disposed on the hydraulic lifting platform a 8201a, the hydraulic lifting platform b 8201b, the hydraulic lifting platform c 8201c and the hydraulic lifting platform d 8201d respectively; and the hydraulic lifting platform a 8201a, the hydraulic lifting platform b 8201b, the hydraulic lifting platform c 8201c and the hydraulic lifting platform d 8201d are used for lifting or lowering the first water tank a 8101a, the first water tank b 8101b, the first water tank c 8101c and the first water tank d 8101d.

The hydraulic lifting platform controller 8202 is a standard part matched with the hydraulic lifting platform a 8201a, the hydraulic lifting platform b 8201b, the hydraulic lifting platform c 8201c and the hydraulic lifting platform d 8201d, and is used for controlling the hydraulic lifting platform a 8201a, the hydraulic lifting platform b 8201b, the hydraulic lifting platform c 8201c and the hydraulic lifting platform d 8201d to rise or fall.

Working principle: the water-level fluctuation part 8000 controls the water level in the first water tank a 8101a, the first water tank b 8101b, the first water tank c 8101c and the first water tank d 8101d by lifting or lowering the hydraulic lifting platform a 8201a, the hydraulic lifting platform b 8201b, the hydraulic lifting platform c 8201c and the hydraulic lifting platform d 8201d, so as to control the water level in the sample box part 2000.

10. Dry-Wet Cycle Part

Figure 9A:
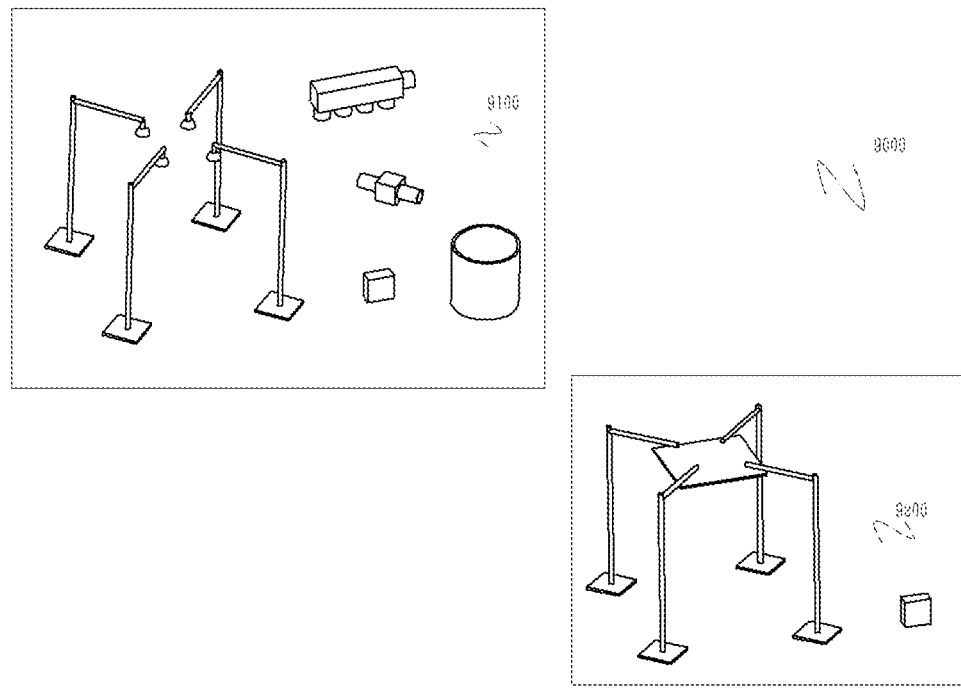
FIG. 9A is a structural diagram of a dry-wet cycle part in the present invention.

As shown in FIG. 9A, the dry-wet cycle part 9000 is composed of a dry-wet cycle water-supply system 9100 and a dry-wet cycle drying system 9200, and is used for simulating a rain and a sunlight to test the influence of a dry-wet cycle on the samples.

10.1. Dry-Wet Cycle Water-Supply System

Figure 9B:
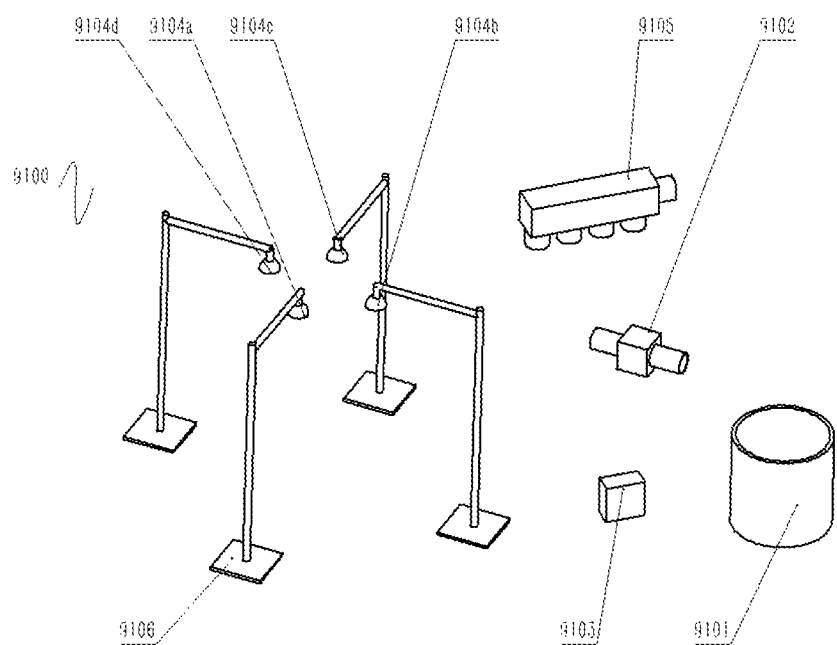
FIG. 9B is a structural diagram of a dry-wet cycle water-supply system.

As shown in FIG. 9B, the dry-wet cycle water-supply system 9100 is composed of a second water tank 9101, a water pump 9102, a water pump controller 9103, a sprayer a 9104a, a sprayer b 9104b, a sprayer c 9104c, a sprayer d 9104d, a five-way joint 9105 and sprayer holders 9106, and is used for simulating a rain.

The second water tank 9101 is a circular container, and is used for providing water required by the dry-wet cycle water-supply system 9100. The water pump 9102 is a standard electrical water pump 9102, with an input end being connected to the bottom of the second water tank 9101 through a water pipe and an output end being connected to one port of the five-way joint 9105; the operating power of the water pump 9102 is controlled by the water pump controller 9103; and the water pump 9102 is used for pumping water out of the second water tank 9101 to generate a water pressure.

The water pump controller 9103 is a standard part matched with the water pump 9102, is connected to the water pump 9102, and is used for controlling the operating power of the water pump 9102.

The sprayer a 9104a, the sprayer b 9104b, the sprayer c 9104c and the sprayer d 9104d are standard parts and are fixed above the sample case 2121 through the sprayer holders 9106; input ends of the sprayer a 9104a, the sprayer b 9104b, the sprayer c 9104c and the sprayer d 9104d are connected to the other four ports of the five-way joint 9106 respectively; and the sprayer a 9104a, the sprayer b 9104b, the sprayer c 9104c and the sprayer d 9104d are used for simulating a rain to supply water to the samples in the sample case 2121.

The five-way joint 9105 is a standard part, with five ports being connected to the output end of the water pump 9102, the input end of the sprayer a 9104a, the input end of the sprayer b 9104b, the input end of the sprayer c 9104c, and the input end of the sprayer d 9104d respectively; and the five-way joint 9105 is used for separating a water circuit to allow the sprayer a 9104*a*, the sprayer b 9104*b*, the sprayer c 9104*c* and the sprayer d 9104*d* to work synchronously.

The sprayer holders 9106 are rigid holders, are disposed around the sample case 2121, and are used for fixing the sprayer a 9104*a*, the sprayer b 9104*b*, the sprayer c 9104*c* and the sprayer d 9104*d*.

10.2. Dry-Wet Cycle Drying System

Figure 9C:
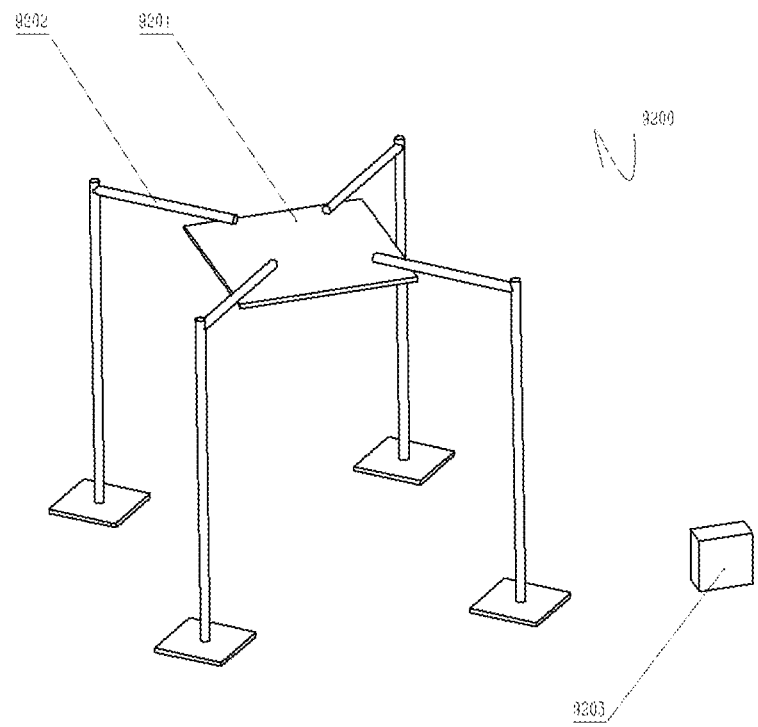
FIG. 9C is a structural diagram of a dry-wet cycle drying system.
Figure 9D:
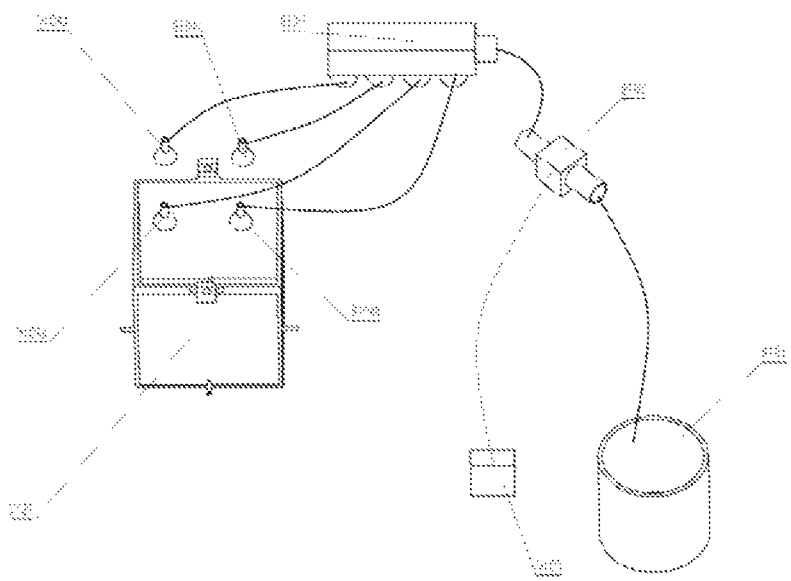
FIG. 9D is a connection diagram of the dry-wet cycle water-supply system.
Figure 9E:
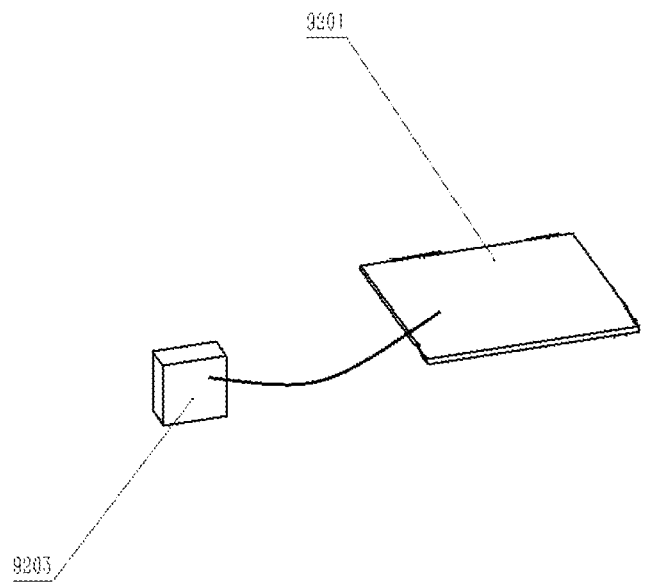
FIG. 9E is a connection diagram of the dry-wet cycle drying system.

As shown in FIG. 9C, the dry-wet cycle drying system 9200 is composed of a heating plate 9201, heating plate supports 9202 and a heating plate controller 9203, and is used for simulating a sunlight to dry the samples.

The heating plate 9201 is a standard electrical heating plate 9201 and is fixed above the sample case 2121 through the heating plate supports 9202, the heating temperature of the heating plate 9201 is controlled by the heating plate controller 9203, and the heating plate 9201 is used for simulating a sunlight to heat the samples.

The heating plate supports 9202 are rigid supports, are disposed around the sample case 2121, and are used for fixing the heating plate 9201. The heating plate controller 9201 is a standard part matched with the heating plate 9201, is connected to the heating plate 9201, and is used for controlling the heating temperature of the heating plate 9201.

Working principle: the dry-wet cycle part 9000 sprays water to the samples through the sprayer a 9104*a*, the sprayer b 9104*b*, the sprayer c 9104*c* and the sprayer d 9104*d* to simulate a rain, and heats the samples through the heating plate 9201 to similar a sunlight, so as to realize a dry-wet cycle.

11. Acquisition Part

Figure 10A:
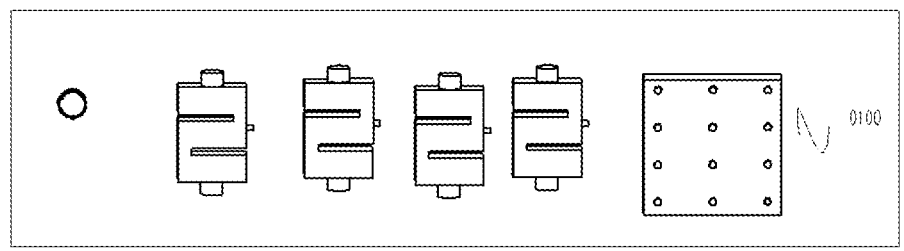
FIG. 10A is a structural diagram of an acquisition part in the present invention.
Figure 10A:
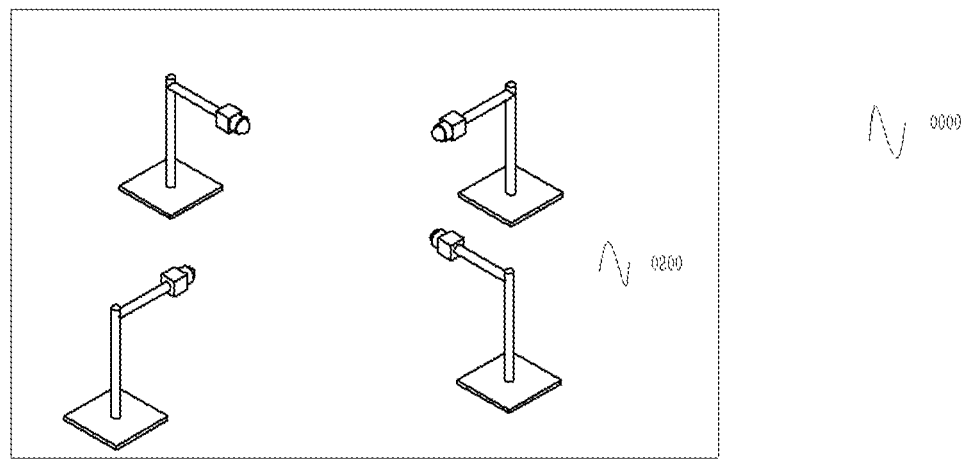

As shown in FIG. 10A, the acquisition part 0000 is composed of a sensor acquisition system 0100 and an image acquisition system 0200, and is used for acquiring data generated during a test.

11.1. Sensor Acquisition System

Figure 10B:
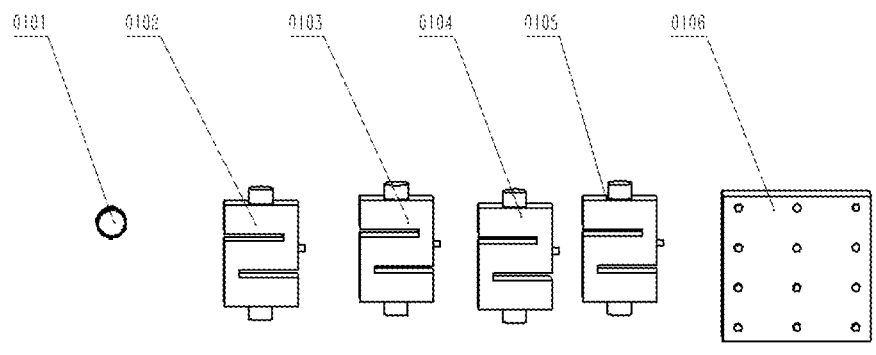
FIG. 10B is a structural diagram of a sensor acquisition system.

As shown in FIG. 10B, the sensor acquisition system 0100 is composed of a soil pressure sensor 0101, the first pull pressure sensor 0102, the second pull pressure sensor 0103, the third pull pressure sensor 0104, the fourth pull pressure sensor 0105 and an acquisition plate 0106, and is used for measuring data generated during a test and transmitting the data to a computer.

The soil pressure sensor 0101 is a standard part and is buried in the samples in the sample case 2121 according to test requirements, a signal output end of the soil pressure sensor 0101 is connected to the acquisition plate 0106, and the soil pressure sensor 0101 is used for acquiring the internal pressure of the samples.

The first pull pressure sensor 0102, the second pull pressure sensor 0103, the third pull pressure sensor 0104 and the fourth pull pressure sensor 0105 are standard pull pressure sensors, the first pull pressure sensor 0102 is connected between the wheel connecting rod 3107 and the piston rod of the first cylinder 3212, the second pull pressure sensor 0103 is connected between the first hydraulic piston rod fixing rod 3104 and the first hydraulic piston rod 3222, the third pull pressure sensor 0104 is connected between the vertical load bearing plate 4105 and the second cylinder 4212 or the second hydraulic cylinder 4222, the fourth pull pressure sensor 0105 is connected between the horizontal load bearing plate 5102 and the third hydraulic cylinder 5202, the signal output ends of the first pull pressure sensor 0102, the second pull pressure sensor 0103, the third pull pressure sensor 0104 and the fourth pull pressure sensor 0105 are connected to the acquisition plate 0106, and the first pull pressure sensor 0102, the second pull pressure sensor 0103, the third pull pressure sensor 0104 and the fourth pull pressure sensor 0105 are used for acquiring the pressure output by the first cylinder 3212, the first hydraulic piston rod 3222, the second cylinder 4212 and the third hydraulic cylinder 5202.

The acquisition plate 0106 is a standard part; a signal input end of the acquisition plate 0106 is connected to the soil pressure sensor 0101, the first pull pressure sensor 0102, the second pull pressure sensor 0103, the third pull pressure sensor 0104 and the fourth pull pressure sensor 0105, and an output end of the acquisition plate 0106 is connected to the computer; and the acquisition plate 0106 is used for acquiring data measured by the sensors.

11.2. Image Acquisition System

Figure 10C:
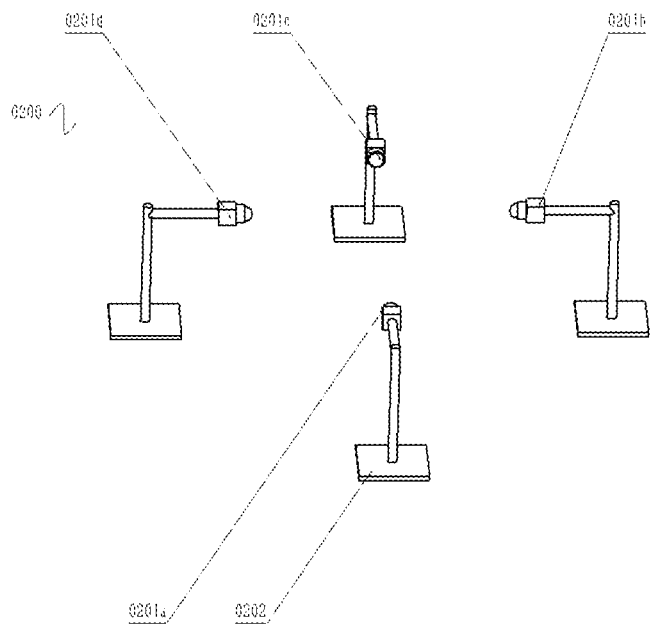
FIG. 10C is a structural diagram of an image acquisition system.
Figure 10D:
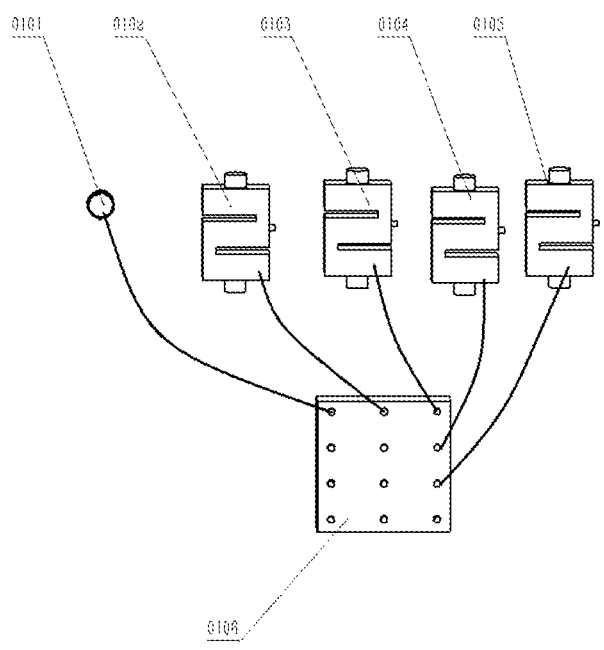
FIG. 10D is a connection diagram of the sensor acquisition system.

As shown in FIG. 10C, the image acquisition system 0200 is composed of a DIC camera a 0201*a*, a DIC camera b 0201*b*, a DIC camera c 0201*c*, a DIC camera d 0201*d* and camera holders 0202, and is used for acquiring variable data of the samples during a test.

The DIC camera a 0201*a*, the DIC camera b 0201*b*, the DIC camera c 0201*c*, and the DIC camera d 0201*d* are standard parts, installed on the camera holders 0202, and placed around the sample box part 2000; signal output parts of the DIC camera a 0201*a*, the DIC camera b 0201*b*, the DIC camera c 0201*c*, and the DIC camera d 0201*d* are connected to the computer; and the DIC camera a 0201*a*, the DIC camera b 0201*b*, the DIC camera c 0201*c*, and the DIC camera d 0201*d* are used for acquiring changes of the samples in the sample box part 2000 and transmitting the changes back to the computer.

The camera holders 0202 are rigid holders, arranged around the sample box part 2000, and used for fixing the DIC camera a 0201*a*, the DIC camera b 0201*b*, the DIC camera c 0201*c*, and the DIC camera d 0201*d*.

Working principle: the acquisition part 0000 records test data through the sensors and the cameras, the soil pressure sensor 0101 measures the internal pressure of the samples, the first pull pressure sensor 0102, the second pull pressure sensor 0103, the third pull pressure sensor 0104 and the fourth pull pressure sensor 0105 measures loads of the parts connected thereto, and the DIC camera a 0201*a*, the DIC camera b 0201*b*, the DIC camera c 0201*c* and the DIC camera d 0201*d* records the changes of the samples.

The specific process of an intelligent test method for traffic load engineering detection of road construction provided by the invention is as follows:

The device provided by the invention can carry out a soil compaction test, a vertical pneumatic load test, a vertical hydraulic load test, a direct-shear test, a road load simulation test, a water-level fluctuation test, and a dry-wet cycle test.

Figure 7H:
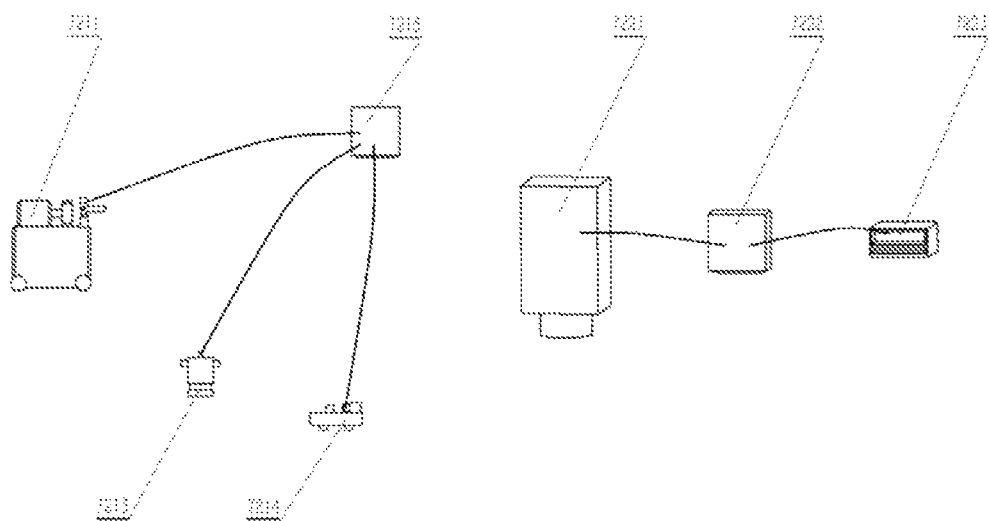
FIG. 7H is a connection diagram of an electrical circuit of the automatic sand-compaction part.
Figure 7I:
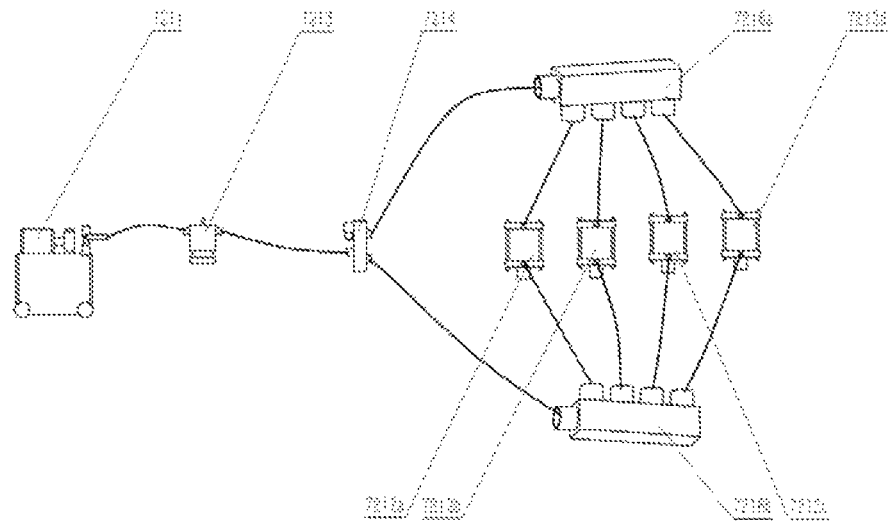
FIG. 7I is a connection diagram of a gas circuit of the automatic sand-compaction part.

Soil Compaction Test 1.1 Installation:

An electrical circuit and a gas circuit are connected according to FIGS. 7H and 7I.

Step 1: the automatic sand-compaction pulleys 7302 are installed at the two ends of the automatic sand-compaction beam 7301, the stepping motor 7221 is installed at the center of the lower surface of the automatic sand-compaction beam 7301, and the stepping motor connecting rod 7104 is installed on the piston rod of the stepping motor 7221.

Step 2: the third cylinder mounting plate 7103 is installed at the bottom end of the stepping motor connecting rod 7104; the third cylinder a 7212*a*, the third cylinder b 7212*b*, the third c7212*c* and the third cylinder d 7212*d* are installed at the four corners of the third cylinder mounting plate 7103; the four sand-compaction plate fixing rods 7102 are installed at the bottom ends of the piston rods of the third cylinder a 7212a, the third cylinder b 7212b, the third c7212c and the third cylinder d 7212d; and the sand-compaction plate 7101 is installed at the bottom ends of the four sand-compaction plate fixing rods 7102.

Step 3: the third air compressor 7211, the third pneumatic pressure-regulating valve 7213 and the third electromagnetic valve 7214 are sequentially connected through an air guide pipe, the two output ends of the third electromagnetic valve 7214 are connected to the input end of the pneumatic five-way joint a 7216a and the input end of the pneumatic five-way joint b 7216b, and the four output ends of the pneumatic five-way joint a 7216a and the four output ends of the pneumatic five-way joint b 7216b are connected to two ports of the third cylinder a 7212a, two ports of the third cylinder b 7212b, two ports of the third cylinder c7212c, and two ports of the third cylinder d 7212d respectively.

Step 4: the circuit parts of the third air compressor 7211, the third pneumatic pressure-regulating valve 7213 and the third electromagnetic valve 7214 are connected to the fifth PLC 7215, and the stepping motor 7221, the stepping motor driver 7222 and the stepping motor controller 7223 are sequentially connected through a wire.

Step 5: the automatic sand-compaction pulleys 7302 are installed in grooves of the lower support slides 1202, and when the automatic sand-compaction pulleys 7302 slide to be exactly located above the sample box part 2000, the automatic sand-compaction stop bolts 7304 penetrate through the automatic sand-compaction pulley locating holes 7303 and the support slide locating holes 1203 to be fixed with nuts.

1.2 Test Process:

The samples in the sand-compaction sample case 2121 will be compacted by way of example.

Step 1: the output air pressure of the third pneumatic pressure-regulating valve 7213 is set through the fifth PLC 7215 to control the magnitude of an impact load during the compaction process, and the operating frequency of the third electromagnetic valve 7214 is set through the fifth PLC 7215 to control the impact frequency during the compaction process.

Step 2: the third air compressor 7211 is started through the fifth PLC 7215 to enable the third cylinder a 7212a, the third cylinder b 7212b, the third cylinder c7212c and the third cylinder d 7212d to stretch out completely; the piston rod of the stepping motor 7221 is controlled by the stepping motor controller 7223 to stretch out; when the sand-compaction plate 7101 is in contact with the bottom surface of the sample case 2121, the stepping motor 7221 is stopped, and the stretching length of the stepping motor 7221 is recorded.

Step 3: the height of a first layer of samples is calculated according to test requirements, the piston rod of the stepping motor 7221 is lifted to this height, the piston rods of the third cylinder a 7212a, the third cylinder b 7212b, the third cylinder c7212c and the third cylinder d 7212d are made to retreat, and the first layer of samples are added into the sample case 2121.

Step 4: the fifth PLC 7215 is turned on according to pre-settings, such that the third cylinder a 7212a, the third cylinder b 7212b, the third cylinder c7212c and the third cylinder d 7212d start to stretch and retreat to drive the sand-compaction plate 7101 to compact the samples; and when the third cylinder a 7212a, the third cylinder b 7212b, the third cylinder c7212c and the third cylinder d 7212d stretch out to enable the lower surface of the sand-compaction plate 7101 to be exactly in contact with the surface of the samples, the compaction of the first layer of samples is completed, and the thickness of the first layer of samples is a height, to which the stepping motor 7221 rises for the first time.

Step 5: the soil pressure sensor 0101 is buried in the first layer of samples according to test requirements for follow-up tests.

Step 6: Step 3, Step 4 and Step 5 are repeated until all layers of samples are compacted.

Step 7: the fifth PLC 7215 is turned off, the automatic sand-compaction stop bolts 7304 are removed, and the automatic sand-compaction part 7000 is moved away, such that follow-up tests can be carried out on the sample case 2121.

2. Vertical Pneumatic Load Test 2.1 Installation: A gas circuit and an electrical circuit are connected according to FIGS. 4F and 4H.

Step 1: the vertical load pulleys 4102 are installed at the two ends of the vertical load beam 4101, the second cylinder fixing rod 4106 is installed at the center of the lower surface of the vertical load beam 4101, and the second cylinder 4212 is installed at the lower end of the second cylinder fixing rod 4106.

Step 2: one end of the third pull pressure sensor 0104 is installed on the piston rod of the second cylinder 4212, and the vertical load bearing plate 4104 is installed at the other end of the third pull pressure sensor 0104.

Step 3: the second air compressor 4211 and the second pneumatic T-joint a 4217a are connected through an air guide pipe, the other two ports of the second pneumatic T-joint a 4217a are connected to the input end of the second pneumatic pressure-regulating valve a 4213a and the input end of the second pneumatic pressure-regulating valve b 4213b, the output end of the second pneumatic pressure-regulating valve a 4213a is connected to the input end of the second electromagnetic valve 4214, one output end of the second electromagnetic valve 4214 is connected to one port of the second pneumatic T-joint b 4217b, the other port of the second electromagnetic valve 4214 is connected to the front port of the second cylinder, the output end of the second pneumatic pressure-regulating valve b 4213b is connected to the input end of the second electrical proportional valve 4215, the output end of the second electrical proportional valve 4215 is connected to another port of the second pneumatic T-joint b 4217b, and the third port of the second pneumatic T-joint b 4217b is connected to the tail port of the second cylinder 4212.

Step 4: the circuit parts of the second air compressor 4211, the second pneumatic pressure-regulating valve a 4213a, the second pneumatic pressure-regulating valve b 4213b, the second electromagnetic valve 4214 and the second electrical proportional valve 4215 are connected to the second PLC 4216.

Step 5: the vertical load pulleys 4102 are installed in the grooves of the lower support slides 1202, and when the vertical load pulleys 4102 slide to be exactly located above the sample box part 2000, the vertical load pulleys 4102 stop bolts penetrate through the vertical load pulley locating holes 4103 and the support slide locating holes 1203 to be fixed with nuts.

2.2 Test Process:

Step 1: samples are placed in the sample case 2121 according to the method for the soil compaction test, and the road model 2123 is placed on the samples by means of the lifting part 6000.

Step 2: the signal output end of the third pull pressure sensor 0104 and the signal output end of the soil pressure sensor 0101 are connected to the acquisition plate 0106, the camera holders 0202 are disposed around the sample case 2121, and the DIC camera a 0201*a*, the DIC camera b 0201*b*, the DIC camera c 0201*c* and the DIC camera d 0201*d* are installed on the camera holders 0202, with the signal output ends being connected to a computer.

Step 3: the output air pressure of the second pneumatic pressure-regulating valve a 4213*a* and the output pressure of the second pneumatic pressure-regulating valve b 4213*b* are set through the second PLC 4216 to control the magnitude of a vertical load, and the second electromagnetic valve 4212 is set through the second PLC 4216 to realize an impact load and a vibration load, and the second electrical proportional valve 4215 is set to realize a variable static load, and the form and magnitude of the loads are set according to test requirements.

Step 4: the test is started, and the second air compressor 4211 is started through the second PLC 4216; when the second electromagnetic valve 4214 works, the second cylinder 4212 starts to stretch and retreat to drive the vertical load bearing plate 4105 to apply an impact load or a vibration load to the road model 2123; when the second electrical proportional valve 4215 works, the second cylinder 4212 applies a static load on the road model through the vertical load bearing plate 4105; the third pull pressure sensor 0104 measures the magnitude of each load, the soil pressure sensor 0101 measures the internal pressure of the samples, and the DIC camera a 0201*a*, the DIC camera b 0201*b*, the DIC camera c 0201*c* and the DIC camera d 0201*d* record changes of the samples.

Step 5: the test is ended, the second PLC 4216 is turned off, the vertical load stop bolts 4104 are removed, and the vertical load applying part 4000 is moved away, such that follow-up tests can be carried out on the samples.

3. Vertical Hydraulic Load Test 3.1 Installation: An electrical circuit and an oil circuit are connected according to FIGS. 4G and 4I.

Step 1: the vertical load pulleys 4102 are installed at the two ends of the vertical load beam 4101, the second hydraulic cylinder fixing rod 4107 is installed at the center of the lower surface of the vertical load beam 4101, and the second hydraulic cylinder 4222 is installed at the lower end of the second hydraulic cylinder fixing rod 4107.

Step 2: one end of the third pull pressure sensor 0104 is installed on the piston rod of the second hydraulic cylinder 4222, and the vertical load bearing plate 4105 is installed at the other end of the third pull pressure sensor 0104.

Step 3: the second hydraulic station 4221, the second electro-hydraulic proportional speed control valve 4224 and the second hydraulic electromagnetic directional valve 4223 are sequentially connected through an oil pipe, and two output ends of the second hydraulic electromagnetic directional valve 4223 are connected to two ports of the second hydraulic cylinder 4222 respectively.

Step 4: the circuit parts of the second hydraulic station 4221, the second electro-hydraulic proportional speed control valve 4224, the second hydraulic electromagnetic directional valve 4223 and the second hydraulic cylinder stroke sensor 4225 are connected to the second PLC 4216.

Step 5: the vertical load pulleys 4102 are installed in the grooves of the lower support slides 1202; when the vertical load pulleys 4102 slide exactly to be located above the sample box part 2000, the vertical load pulleys 4102 stop bolts penetrate through the vertical load pulley locating holes 4103 and the support slide locating holes 1203 to be fixed with nuts.

3.2 Test Process:

Step 1: samples are placed in the sample case 2121 according to the method for the soil compaction test, and the road model 2123 is placed on the samples by means of the lifting part 6000.

Step 2: the signal output end of the third pull pressure sensor 0104 and the signal output end of the soil pressure sensor 0101 are connected to the acquisition plate 0106, the camera holders 0202 are disposed around the sample case 2121, and the DIC camera a 0201*a*, the DIC camera b 0201*b*, the DIC camera c 0201*c* and the DIC camera d 0201*d* are installed on the camera holders 0202, with the signal output ends being connected to a computer.

Step 3: the output hydraulic pressure of the second electro-hydraulic proportional speed control valve 4224 is set through the second PLC 4216 to control the magnitude of a vertical load, and the second hydraulic electromagnetic directional valve 4223 is set through the second PLC 4216 to enable the piston rod of the second hydraulic cylinder 4222 to rise or fall.

Step 4: the test is started, the second hydraulic station 4221 is started through the second PLC 4216, the second hydraulic electromagnetic directional valve 4223 is controlled to enable the piston rod to stretch out, a large vertical load is applied to the samples through the vertical load bearing plate 4105, the third pull pressure sensor 0104 measures the magnitude of the load, the soil pressure sensor 0101 measures the internal pressure of the samples, and the DIC camera a 0201*a*, the DIC camera b 0201*ab*, the DIC camera c 0201*c* and the DIC camera d 0201*d* record changes of the samples.

Step 5: the test is ended, the second PLC 4216 is turned off, the vertical load stop bolts 4104 are removed, and the vertical load applying part 4000 is moved away, such that follow-up tests can be carried out on the samples.

Figure 5D:
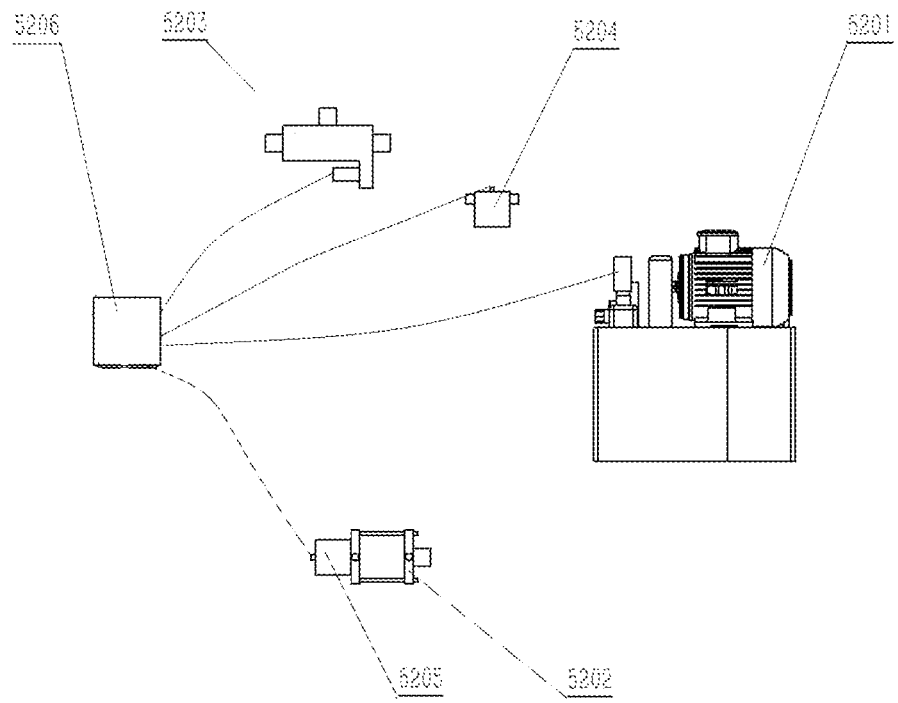
FIG. 5D is a connection diagram of an electrical circuit of the horizontal load power system.
Figure 5E:
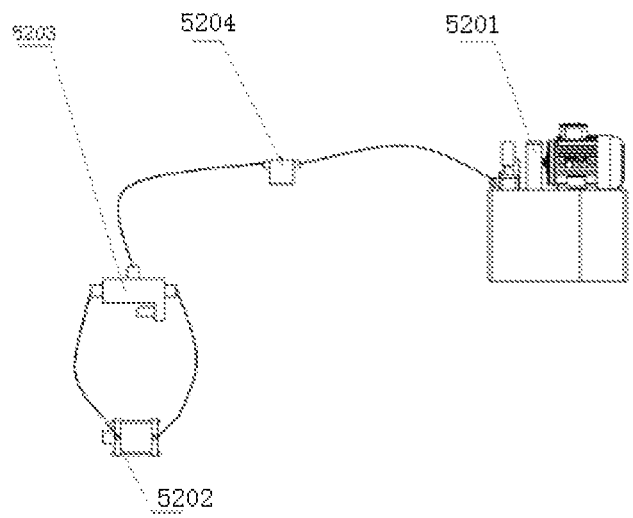
FIG. 5E is a connection diagram of an oil circuit of the horizontal load power system.

4. Direct-Shear Test 4.1 Installation:

An electrical circuit and an oil circuit are connected according to FIGS. 5D and 5E.

Step 1: the sample box slides 2201 are installed on the base plate 1102, the sample box pulleys 2202 are placed in the grooves of the sample box slides 2202, the lower direct-shear box 2212 is lifted by means of the lifting part 6000 to be located above the sample box pulleys 2202, the sample box pulleys 2202 and the lower direct-shear box 2112 are connected through bolts, the lower direct-shear box 2112 is slid to a suitable position, and the sample box stop bolts 2205 penetrate through the sample box slide locating holes 2203 and the sample box pulley locating holes 2204 to be fixed with nuts.

Step 2: the upper direct-shear box 2111 is lifted by means of the lifting part 6000 to be located above the lower direct-shear box 2112, and is placed on the lower direct-shear box 2112, the upper direct-shear box fixing rods 2113 are installed on the base plate 1102, and the upper direct-shear box fixing plate 2114 penetrates through the upper direct-shear box 2111 to be fixed at the upper ends of the upper direct-shear box fixing rods 2113.

Step 3: the third hydraulic cylinder fixing plate 5101 is installed on the vertical support pillars 1101, the third hydraulic cylinder 5202 is installed on the upper surface of the third hydraulic cylinder fixing plate 5101, one end of the fourth pull pressure sensor 0105 is installed on the piston rod of the third hydraulic cylinder 5202, and the horizontal load bearing plate 5102 is installed at the other end of the fourth pull pressure sensor 0105.

Step 4: the third hydraulic station 5201, the third electro-hydraulic proportional speed control valve 5204 and the third hydraulic electromagnetic directional valve 5203 are sequentially connected through an oil pipe, and two output ends of the third hydraulic electromagnetic directional valve 5203 are connected to two ports of the third hydraulic cylinder 5202 respectively.

Step 5: the circuit parts of the third hydraulic station 5201, the third electro-hydraulic proportional speed control valve 5204, the third hydraulic electromagnetic directional valve 5203 and the third hydraulic cylinder stroke sensor 5205 are connected to the third PLC 5206.

4.2 Test Process:

Step 1: samples are placed in the upper direct-shear box 2111 and the lower direct-shear box 2112 according to the method for the soil compaction test, the corresponding soil pressure sensor 0101 is buried in the samples, the signal output end of the soil pressure sensor 0101 and the signal output end of the fourth pull pressure sensor 0105 are connected to the acquisition plate 0106, the camera holders 0202 are disposed around the sample case 2121, and the DIC camera a 0201a, the DIC camera b 0201b, the DIC camera c 0201c and the DIC camera d 0201d are installed on the camera holders 0202, with the signal output ends being connected to a computer.

Step 2: the sample box stop bolts 2205 are removed, and the output hydraulic pressure of the third electro-hydraulic proportional speed control valve 5204 and the stretching/retreating speed of the third hydraulic cylinder 5202 are set through the third PLC 5206.

Step 3: the test is started, a vertical hydraulic load is applied to the samples according to the method for the vertical hydraulic load test, the third hydraulic station 5201 is started through the third PLC 5206, the third hydraulic electromagnetic directional valve 5203 is controlled to enable the piston rod to stretch out, a large horizontal hydraulic load is applied to the lower direct-shear box 2112 through the horizontal load bearing plate 5102 to enable the lower direct-shear box 2112 to move, the third hydraulic cylinder stroke sensor 5205 records the moving distance of the lower direct-shear box 2112, the fourth pull pressure sensor 0105 measures the magnitude of the load, the soil pressure sensor 0101 measures the internal pressure of the samples, and the DIC camera a 0201a, the DIC camera b 0201b, the DIC camera c 0201c and the DIC camera d 0201d record changes of the samples.

Step 4: the test is ended, and the third PLC 5206 is turned off.

5. Road Load Simulation Test 5.1 Installation: An electrical circuit, a gas circuit and an oil circuit are connected according to FIGS. 3I, 3J, and 3K.

Step 1: the simulated road load pulleys 3102 are installed at the two ends of the simulated road load beam 3101, and are disposed in the grooves of the lower support slides 1202, the first cylinder fixing rod 3103 is installed at the center of the lower surface of the simulated road load beam 3101, the first cylinder 3212 is installed at the lower end of the first cylinder fixing rod 3103, the first hydraulic piston rod fixing plate 3105 is installed on the vertical support pillars 1101, the first hydraulic piston rod 3222 is installed on the upper surface of the first hydraulic piston rod fixing plate 3105, one end of the second pull pressure sensor 0103 is installed on the first hydraulic piston rod 3222, the first hydraulic piston rod fixing rod 3103 is installed at the other end of the second pull pressure sensor 0103 and is connected to the lateral side of the first cylinder fixing rod 3103, one end of the first pull pressure sensor 0102 is connected to the piston rod of the first cylinder 3212, the other end of the first pull pressure sensor 0102 is connected to the wheel connecting rod 3107, and the wheel 3106 is installed at the bottom end of the wheel connecting rod 3107.

Step 2: the first air compressor 3211 and the first pneumatic T-joint a 3217a are connected through an air guide pipe, the other two ports of the first pneumatic T-joint a 3217a are connected to the input end of the first pneumatic pressure-regulating valve a 3213a and the input end of the first pneumatic pressure-regulating valve b 3213b, the output end of the first pneumatic pressure-regulating valve a 3213a is connected to the input end of the first electromagnetic valve 3214, one output end of the first electromagnetic valve 3214 is connected to one port of the first pneumatic T-joint b 3217b, the other port of the first electromagnetic valve 3214 is connected to the front port of the cylinder, the output end of the first pneumatic pressure-regulating valve b 3213b is connected to the input end of the first electrical proportional valve 3215, the output end of the first electrical proportional valve 3215 is connected to another port of the first pneumatic T-joint b 3217b, and the third port of the first pneumatic T-joint b 3217b is connected to the tail port of the first cylinder 3212.

Step 3: the first hydraulic station 3221, the first electro-hydraulic directional speed control valve 3224 and the first hydraulic electromagnetic directional valve 3223 are sequentially connected through an oil pipe, and two output ends of the first hydraulic electromagnetic directional valve 3223 are connected to two ports of the first hydraulic piston rod 3222 respectively.

Step 4: the circuit parts of the first air compressor 3211, the first pneumatic pressure-regulating valve a 3213a, the first pneumatic pressure-regulating valve b 3213b, the first electromagnetic valve 3214 and the first electrical proportional valve 3215 are connected to the first PLC 3216, and the circuit parts of the first hydraulic station 3221, the first electro-hydraulic proportional speed control valve 3224, the first hydraulic electromagnetic directional valve 3223 and the first hydraulic cylinder stroke sensor 3225 are connected to the first PLC 3216.

5.2 Test

Step 1: samples are placed in the sample case 2121 according to the method for the soil compaction test, the corresponding soil pressure sensor 0101 is buried in the samples, the road model 2123 is placed on the samples, the signal output end of the soil pressure sensor 0101, the signal output end of the first pull pressure sensor 0102 and the signal output end of the second pull pressure sensor 0103 are connected to the acquisition plate 0106, the camera holders 0202 are disposed around the sample case 2121, and the DIC camera a 0201a, the DIC camera b 0201b, the DIC camera c 0201c and the DIC camera d 0201d are installed on the camera holders 0202, with the signal output ends being connected to a computer.

Step 2: the output air pressure of the first pneumatic pressure-regulating valve a 3213a and the output air pressure of the first pneumatic pressure-regulating valve b 3213b are set through the first PLC 3216 to control the magnitude of a vertical load, the first electromagnetic valve 3214 is set through the first PLC 3216 to realize an impact load and a vibration load, the first electrical proportional valve 3215 is set to realize a variable static load, the form and magnitude of the loads are set according to test requirements, and the first hydraulic electromagnetic directional valve 3223 and the first electro-hydraulic proportional speed control valve 3224 are set through the first PLC 3216 to enable the first hydraulic piston rod 3222 to move in the horizontal direction.

Step 3: the test is started, the first hydraulic station 3221 is started through the first PLC 3216, the first hydraulic electromagnetic directional valve 3223 is controlled to enable the piston rod to stretch out to push the first cylinder fixing rod 3103 to move horizontally, and the first air compressor 3211 is started through the first PLC 3216; when the first electromagnetic valve 3214 works, the first cylinder 3212 starts to stretch and retreat to drive the wheel 3106 to apply an impact load or a vibration load to the road model 2123; when the first electrical proportional valve 3215 works, the first cylinder 3212 applies a static load to the road model through the wheel 3106; the simulated road load pneumatic module 3210 realizes the load in the vertical direction, the simulated road load hydraulic module 3220 realize movements in the horizontal direction, and the two modules cooperate to apply various loads to the road model; the first pull pressure sensor 0102 measures the magnitude of the vertical load, the second pull pressure sensor 0103 measures the magnitude of the horizontal load, the soil pressure sensor 0101 measures the internal pressure of samples, and the DIC camera a 0201a, the DIC camera b 0201b, the DIC camera c 0201c and the DIC camera d 0201d record changes of the samples.

Step 4: the test is ended, and the first PLC 3216 is turned off.

6. Water-Level Fluctuation Test 6.1 Installation: An electrical circuit is connected according to FIG. 8E.

Step 1: the hydraulic lifting platform a 8201a, the hydraulic lifting platform b 8201b, the hydraulic lifting platform c 8201c and the hydraulic lifting platform d 8201d are disposed around the sample case 2121, the first water tank a 8101a, the first water tank b 8101b, the first water tank c 8101c and the first water tank d 8101d are disposed on the hydraulic lifting platform a 8201a, the hydraulic lifting platform b 8201b, the hydraulic lifting platform c 8201c and the hydraulic lifting platform d 8201d respectively, and the hydraulic lifting platform controller 8202 is connected to the hydraulic lifting platform a 8201a, the hydraulic lifting platform b 8201b, the hydraulic lifting platform c 8201c and the hydraulic lifting platform d 8201d.

Step 2: the water outlet a 8102a, the water outlet b 8102b, the water outlet c 8102c and the water outlet d 8102d are connected to the water inlet a 2124a, the water inlet b 2124b, the water inlet c 2124c, and the water inlet d 2124d respectively.

6.2 Fluctuation Process

Step 1: samples are placed in the sample case 2121 according to the method for the soil compaction test, the corresponding soil pressure sensor 0101 is buried in the samples, the hydraulic lifting platform a 8201a, the hydraulic lifting platform b 8201b, the hydraulic lifting platform c 8201c and the hydraulic lifting platform d 8201d are lowered to the maximum extent, and a proper amount of water is added into the first water tank a 8101a, the first water tank b 8101b, the first water tank c 8101c, and the water tank d 8101d.

Step 2: the camera holders 0202 are disposed around the sample case 2121, and the DIC camera a 0201a, the DIC camera b 0201b, the DIC camera c 0201c and the DIC camera d 0201d are installed on the camera holders 0202, with the signal output ends being connected to a computer.

Step 3: the test is started, the hydraulic lifting platform a 8201a, the hydraulic lifting platform b 8201b, the hydraulic lifting platform c 8201c and the hydraulic lifting platform d 8201d are controlled by the hydraulic lifting platform controller 8202 to rise or fall, so as to control the water level in the first water tank a 8101a, the first water tank b 8101b, the first water tank c 8101c and the first water tank d 8101d to rise or fall to increase or decrease the water level in the sample case 2121, and the DIC camera a 0201a, the DIC camera b 0201b, the DIC camera c 0201c and the DIC camera d 0201d record changes of samples.

Step 4: the test is ended, the hydraulic lifting platform a 8201a, the hydraulic lifting platform b 8201b, the hydraulic lifting platform c 8201c and the hydraulic lifting platform d 8201d are lowered to the maximum extent, and water in the first water tank a 8101a, the first water tank b 8101b, the first water tank c 8101c and the water tank d 8101d is taken out.

7. Dry-Wet Cycle Test 7.1 Installation:

Step 1: the second water tank 9101 is placed in the vicinity of the device, the water inlet end of the water pump 9102 is disposed in the second water tank 9101, the water outlet end of the water pump 9102 is connected to one port of the five-way joint 9105, the other four ports of the five-way joint 9105 are connected to the sprayer a 9104a, the sprayer b 9104b, the sprayer c 9104c and the sprayer d 9104d respectively, and the water pump controller 9103 is connected to the water pump 9102.

Step 2: the sprayer holders 9106 are disposed around the sample case 2121, and the sprayer a 9104a, the sprayer b 9104b, the sprayer c 9104c and the sprayer d 9104d are installed on the sprayer holders 9106 and are aligned with the samples in the sample case 2121.

Step 3: the heating plate supports 9202 are disposed around the sample case 2121, the heating plate 9201 is fixed on the heating plate supports 9202, and the heating plate controller 9203 is connected to the heating plate 9201.

7.2 Test:

Step 1: samples are placed in the sample case 2121 according to the method for the soil compaction test, and the corresponding soil pressure sensor 0101 is buried in the samples.

Step 2: the camera holders 0202 are disposed around the sample case 2121, and the DIC camera a 0201a, the DIC camera b 0201b, the DIC camera c 0201c and the DIC camera d 0201d are installed on the camera holders 0202, with the signal output ends being connected to a computer.

Step 3: the test is started, the water pump 9102 is started through the water pump controller 9103, the pumping power is controlled of the water pump 9102 is controlled; the sprayer a 9104a, the sprayer b 9104b, the sprayer c 9104c and the sprayer d 9104d start to spray water to the samples, and the water pump 9102 is stopped when test requirements are met; the heating plate 9201 is started through the heating plate controller 9203, the temperature is controlled, and the heating plate 9201 starts to heat the samples, and is stopped when test requirements are met, such that one dry-wet cycle is completed.

Step 4: Step 3 is repeated until all dry-wet cycles are completed, and the test is ended.

8. Lifting 8.1 Installation: An oil circuit is connected according to FIG. 6G.

Step 1: the lifting beam 6101 is installed at the top ends of the lifting pillars 6102, and the lifting pulleys 6109 are installed at the bottom ends of the lifting pillars 6102, and are disposed in the upper support slides 1201.

Step 2: the electrical hoist 6211 is installed on the upper surface of the lifting beam 6101, the fixed pulley a 6103a, the fixed pulley b 6103b, the fixed pulley c 6103c and the steel wire fixing hole 6107 are installed on the lower surface of the lifting beam 6101, and the digital-display tension meter 6213 is installed at the lower end of the steel wire fixing hole 6107.

Step 3: the steel wire 6101 sequentially penetrates through the movable pulley a 6104*a*, the fixed pulley a 6103*a*, the movable pulley b 6104*b*, the fixed pulley b 6103*b*, the movable pulley c 6104*c*, the fixed pulley c 6103*c*, and the movable pulley d 6104*d* according to FIG. 6-4, one end of the steel wire 6106 is fixed to the lower end of the digital-display tension meter 6213, and the other end of the steel wire 6106 penetrates through the electrical hoist mounting hole 6109 to be fixed on the drum of the electrical hoist 6211.

Step 4: the fourth hydraulic piston rod fixing plate 6110 is installed on the vertical support pillars 1101, the fourth hydraulic piston rod a 6222*a* and the fourth hydraulic piston rod b 6222*b* are installed on the upper surface of the fourth hydraulic piston rod fixing plate 6110, and the fourth hydraulic piston rod a 6222*a* and the fourth hydraulic piston rod b 6222*b* are connected to the lifting beam 6101.

Step 5: the fourth hydraulic station 6221, the fourth electro-hydraulic proportional speed control valve 6224 and the fourth hydraulic electromagnetic directional valve 6223 are sequentially connected through an oil pipe, two output ends of the fourth hydraulic electromagnetic directional valve 6223 are connected to one port of the hydraulic T-joint a 6227*a* and one port of the hydraulic T-joint b 6227*b* respectively, and the other two ports of the hydraulic T-joint a 6227*a* and the other two ports of the hydraulic T-joint b 6227*b* are connected to two ports of the fourth hydraulic piston rod a 6222*a* and two ports of the fourth hydraulic piston rod b 6222*b* respectively.

Step 6: circuit parts of the fourth hydraulic station 6221, the fourth electro-hydraulic proportional speed control valve 6224, the fourth hydraulic electromagnetic directional valve 6223, the fourth hydraulic cylinder stroke sensor a 6225*a* and the fourth hydraulic cylinder stroke sensor b 6225*b* are connected to the fourth PLC 6226.

8.2 Lifting process: The lifting process of the sample case 2121 will be described by way of example.

Step 1: the fourth hydraulic piston rod a 6222*a* is controlled by the fourth PLC 6226 to stretch or retreat, and when the lifting beam 6101 reaches above the sample case 2121, the fourth hydraulic piston rod a 6222*a* and the fourth hydraulic piston rod b 6222*b* stop working.

Step 2: the movable pulley a 6104*a*, the movable pulley b 6104*b*, the movable pulley c 6104*c* and the movable pulley d 6104*d* are lowered through the electrical hoist controller 6212 and are stopped when the movable pulleys reach the sample case lifting holes 2122, and the bearing bar 6105 penetrates through the movable pulley a 6104*a*, the movable pulley b 6104*b*, the movable pulley c 6104*c*, the movable pulley d 6104*d* and the sample box lifting holes 2122, and the two ends of the bearing bar 6105 are fixed with nuts.

Step 3: the movable pulley a 6104*a*, the movable pulley b 6104*b*, the movable pulley c 6104*c* and the movable pulley d 6104*d* are lifted through the electrical hoist 6212, the sample case 2121 is driven by the bearing bar 6105 to be lifted, and a reading of the digital-display tension meter 6213 is observed to determine whether the tension exceeds the bearing capacity.

Step 4: the fourth hydraulic piston rod a 6222*a* and the fourth hydraulic piston rod b 6222*b* are controlled by the fourth PLC 6266 to stretch or retreat to move the lifting beam 6101 to a desired position.

Step 5: the movable pulley a 6104*a*, the movable pulley b 6104*b*, the movable pulley c 6104*c* and the movable pulley d 6104*d* are lowered through the electrical hoist controller 6212, and when the reading of the digital-display tension meter 6213 returns to an initial value, the bearing bar 6105 is dismantled, the movable pulley a 6104*a*, the movable pulley b 6104*b*, the movable pulley c 6104*c* and the movable pulley d 6104*d* are lifted, and lifting is completed.

The test system can simulate natural environments and apply multiple traffic roads, and can predict road deformation, roadbed settlement and internal stress of roads in advance, so that relevant measures can be taken in advance to reduce damage to roads.

The above description is merely used to explain specific embodiments of the invention, and is not intended to limit the protection scope of the invention. All transformations or substitutions obtained by any skilled in the art within the technical scope disclosed by the invention should fall within the scope of the invention.

We claim:

1. An intelligent test system for traffic load engineering detection of road construction, comprising:
   a support part for supporting a whole test device;
   a sample box part located inside the support part and used for containing samples, carrying out a load test in a vertical direction and a direct-shear test in a horizontal direction;
   a simulated road load applying part located at an upper end of the sample box part and used for applying multiple simulated road loads to the samples;
   a vertical load applying part located at the upper end of the sample box part and used for providing multiple loads in the vertical direction for the samples;
   a horizontal load applying part located on a lateral side of the sample box part and used for providing loads in the horizontal direction for the sample box part;
   an automatic sand-compaction part located at the upper end of the sample box part and used for quantitatively compacting the samples layer by layer;
   a water-level fluctuation part located at a bottom end of the sample box part and used for simulating rising and falling of a tide level;
   a dry-wet cycle part located at the upper end of the sample box part and used for simulating a rain and a sunlight; and
   an acquisition part located inside or on surfaces of the sample box part, the simulated road load applying part, the vertical load applying part and the horizontal load applying part, and used for acquiring data generated during the test.

2. The intelligent test system for traffic load engineering detection of road construction according to claim 1, wherein the support part is composed of a support system and a support slide system, and provides a counter-force for the simulated road load applying part and the vertical load applying part;
   the support system is composed of vertical support pillars, a base plate, first horizontal support rods and second horizontal support rods, and is used for supporting the test device vertically;
   the first horizontal support rods and the second horizontal support rods are two pairs of rigid steel rods, with surfaces being formed with circular through holes allowing the vertical support pillars to penetrate through, and are fixed on the vertical support pillars through nuts, the first horizontal support rods are located on front and back sides, the second horizontal support rods are located on left and right sides, and the first horizontal support rods are used for installing the support slide system;

the support slide system comprises upper support slides and lower support slides, and is used for providing slides required for horizontal movements of the simulated road load applying part, the vertical load applying part, the lifting part and the automatic sand-compaction part.

3. The intelligent test system for traffic load engineering detection of road construction according to claim 1, wherein the sample box part comprises a sample box system and a sample box slide system, is a container for containing the samples, and carries out the load test in the vertical direction and the direct-shear test in the horizontal direction;

the sample box system comprises a direct-shear sample box module and a sample case module, and is a container for containing the samples for the load test in the vertical direction and the direct-shear test in the horizontal direction;

the direct-shear sample box module comprises an upper direct-shear box, a lower direct-shear box, upper direct-shear box fixing rods and an upper direct-shear box fixing plate, and is a container for containing the samples for the direct-shear test in the horizontal direction;

the upper direct-shear box fixing rods are four steel screw rods and are installed on four sides the upper direct-shear box and the lower direct-shear box; bottom ends of the upper direct-shear box fixing rods penetrate through the base plate and are fixed on the base plate through nuts, and upper ends of the upper direct-shear box fixing rods penetrate through the upper direct-shear box fixing plate to be fixed through nuts; the upper direct-shear box fixing rods and the upper direct-shear box fixing plate are used for restraining the upper direct-shear box from moving in the horizontal direction during the direct-shear test;

the sample case module comprises a sample case and a road model, and is used for carrying out a road load simulation test;

the sample box slide system comprises sample box slides and sample box pulleys, and is used for reducing horizontal moving resistance of the sample box part and providing a condition for movements of the lower direct-shear box during the direct-shear test.

4. The intelligent test system for traffic load engineering detection of road construction according to claim 3, wherein the horizontal load applying part is composed of a horizontal load mechanical system and a horizontal load power system;

the horizontal load mechanical system is composed of a third hydraulic cylinder fixing plate and a horizontal load bearing plate, and is used for providing mechanical support and mechanical linkage for the application of a horizontal load;

the third hydraulic cylinder fixing plate is a rectangular steel plate, with front and rear ends each being formed with a circular hole allowing one said vertical support pillar to penetrate through, is fixed on the vertical support pillars through nuts, and is located on a right side of the sample box part; a third hydraulic cylinder is installed on an upper surface of the third hydraulic cylinder fixing plate; the third hydraulic cylinder fixing plate is used for fixing the third hydraulic cylinder and providing a counter-force;

the horizontal load bearing plate is a rigid steel plate and is located on a right side of the lower direct-shear box;

a surface of the horizontal load bearing plate is in contact with a right surface of the lower direct-shear box; a steel round bar is welded to a center of a right surface of the horizontal load bearing plate, a top end of the round bar is connected to an end of a fourth pull pressure sensor, and the round bar is used for transferring a load from the third hydraulic cylinder; the horizontal load bearing plate is used for transferring the load from the third hydraulic cylinder to the lower direct-shear box;

the horizontal load power system is composed of a third hydraulic station, the third hydraulic cylinder, a third hydraulic electromagnetic directional valve, a third electro-hydraulic proportional speed control valve, a third hydraulic cylinder stroke sensor and a third PLC, and is used for providing hydraulic power for the direct-shear test;

the third hydraulic cylinder is installed on the upper surface of the third hydraulic cylinder fixing plate, a top end of a piston rod is connected to an end of the fourth pull pressure sensor, the third hydraulic cylinder stroke sensor matched with the third hydraulic cylinder is installed in the third hydraulic cylinder, a magnetic ring part of the third hydraulic cylinder stroke sensor is installed on the piston rod in the third hydraulic cylinder, two oil ports of the third hydraulic cylinder are connected to two output ends of the third hydraulic electromagnetic directional valve, and the third hydraulic cylinder is used for applying a large horizontal load to the lower direct-shear box;

the horizontal load applying part is used for providing the horizontal load to carry out the direct-shear test, and the third PLC is able to set an output hydraulic pressure of the third electro-hydraulic proportional speed control valve and a stretching/retreating speed of the third hydraulic cylinder to control a shear rate.

5. The intelligent test system for traffic load engineering detection of road construction according to claim 1, wherein the simulated road load applying part is composed of a simulated road load mechanical system and a simulated road load power system;

the simulated road load mechanical system is composed of a simulated road load beam, simulated road load pulleys, a first cylinder fixing rod, a first hydraulic piston rod fixing rod, a first hydraulic piston rod fixing plate, a wheel and a wheel connecting rod, and is used for providing mechanical support and mechanical linkage for the application of a simulated road load;

the simulated road load power system is composed of a simulated road load pneumatic module and a simulated road load hydraulic module, and is used for providing pneumatic power and hydraulic power during road load simulation;

the simulated road load beam is a square steel pole, with two ends being connected to a steel plate on the simulated road load pulleys; the first cylinder fixing rod is connected to a center of a lower surface of the simulated road load beam; the simulated road load beam is installed between the two lower support slides through the simulated road load pulleys, and is able move horizontally along the lower support slides and provides a vertical counter-force for the simulated road load;

the simulated road load pneumatic module comprises a first air compressor, a first cylinder, a first pneumatic pressure-regulating valve a, a first pneumatic pressure-regulating valve b, a first electromagnetic valve, a first electrical proportional valve, a first PLC, a first pneumatic T-joint a and a first pneumatic T-joint b, and is used for providing pneumatic power for the road load simulation test and controlling a load applying manner;

the first air compressor is used for providing an air pressure required by the first cylinder, and the first cylinder is used for driving the wheel to apply a load to the road model;

the first electromagnetic valve controls a piston rod of the first cylinder to stretch or retreat through the first PLC to realize an impact load and a vibration load, and the first electrical proportional valve controls the magnitude of a thrust from the first cylinder through the first PLC to realize a variable static load;

the simulated road load hydraulic module is composed of a first hydraulic station, a first hydraulic piston rod, a first hydraulic electromagnetic directional valve, a first electro-hydraulic proportional speed control valve and a first hydraulic cylinder stroke sensor, and is used for pushing the first cylinder fixing rod to move in the horizontal direction, so as to drive the wheel to move to simulate rolling of vehicle wheels;

the simulated road load applying part is used for applying the simulated road load, an output air pressure of the first pneumatic pressure-regulating valve a and an output air pressure of the first pneumatic pressure-regulating valve b are set through the first PLC to control the magnitude of the vertical load, the first electromagnetic valve is set to realize the impact load and the vibration load, the first electrical proportional valve is set to realize the variable static load, loads of different forms and magnitudes are set according to test requirements, and the first hydraulic electromagnetic directional valve and the first electro-hydraulic proportional speed control valve are set through the first PLC to enable the first hydraulic piston rod to move in the horizontal direction; and the simulated road load pneumatic module realizes loads in the vertical direction, the simulated road load hydraulic module realizes movements in the horizontal direction, and the simulated road load pneumatic module and the simulated road load hydraulic module cooperate to apply multiple loads to the road model.

6. The intelligent test system for traffic load engineering detection of road construction according to claim 1, wherein the vertical load applying part is composed of a vertical load mechanical system and a vertical load power system;

the vertical load mechanical system is composed of a vertical load beam, vertical load pulleys, a vertical load bearing plate, a second cylinder fixing rod and a second pneumatic cylinder fixing rod, and is used for providing mechanical support and mechanical linkage for the application of a vertical load;

the vertical load beam is a square steel pole, with two ends being connected to a steel plate on the vertical load pulleys; the second cylinder fixing rod or the second hydraulic cylinder fixing rod is connected to a center of a lower surface of the vertical load beam according to test requirements; the vertical load beam is installed between the two lower support slides through the vertical load pulleys, is able to move horizontally along the lower support slides and provide a vertical counter-force for the vertical load;

the rectangular steel plate is welded to upper ends of the vertical load pulleys and is connected to the two ends of the vertical load beam through nuts, and the vertical load pulleys are used for horizontal movements of the vertical load applying part;

the vertical load bearing plate is a rigid steel plate and has a size smaller than an internal size of the upper direct-shear box and the sample case, a steel round bar is welded to a center of an upper surface of the vertical load bearing plate, an upper end of the round bar is connected to an end of a third pull pressure sensor, the round bar is used for transferring a load from a second cylinder or a second hydraulic cylinder, and the vertical load bearing plate is used for transferring the load from the second cylinder or the second cylinder to the sample box part;

the second cylinder fixing rod is a rigid steel rod, rectangular steel plates are welded to two ends of the second cylinder fixing rod, the rectangular steel plate at an upper end is connected to the vertical load beam, the rectangular steel plate at a lower end is connected to the second cylinder, and the second cylinder fixing rod is used for connecting the vertical load beam and the second cylinder; the second hydraulic cylinder fixing rod is a rigid steel rod, rectangular steel plates are welded two ends of the second hydraulic cylinder fixing rod, the rectangular steel plate at an upper end is connected to the vertical load beam, the rectangular steel plate at a lower end is connected to the second hydraulic cylinder, and the second hydraulic cylinder fixing rod is used for connecting the vertical load beam and the second hydraulic cylinder;

the vertical load power system is composed of a vertical load pneumatic module and a vertical load hydraulic module, and is used for providing pneumatic power and hydraulic power for the load test in the vertical direction.

7. The intelligent test system for traffic load engineering detection of road construction according to claim 1, further comprising:

a lifting part located at an upper end of the support part, capable of sliding horizontally along the support part, and used for lifting and transferring large parts of the test device, wherein:

the lifting part is composed of a lifting mechanical system and a lifting power system;

the lifting mechanical system comprises a lifting beam, lifting pillars, fixed pulleys, movable pulleys, a bearing bar, a steel wire, lifting pulleys and a fourth hydraulic piston rod fixing plate, and is used for supporting, fixing and transmission during a lifting process;

the lifting power system is composed of a lifting electrical module and a lifting hydraulic module, and is used for providing an electrical pulling force and a horizontal hydraulic thrust for lifting.

8. The intelligent test system for traffic load engineering detection of road construction according to claim 1, wherein the automatic sand-compaction part is composed of an automatic sand-compaction mechanical system, an automatic sand-compaction power system and an automatic sand-compaction slide system;

the automatic sand-compaction mechanical system is composed of a sand-compaction plate, sand-compaction plate fixing rods, a third cylinder mounting plate and a stepping motor connecting rod;

the sand-compaction plate is a square steel plate and has a size smaller than that of the sample box system, the sand-compaction plate fixing rods are welded to four corners of an upper surface of the sand-compaction plate, and the sand-compaction plate is used for compacting the samples;

the sand-compaction plate fixing rods are four steel columns, with lower ends being welded to the four corners of the sand-compaction plate and upper ends being connected to piston rods of four third cylinders respectively, and are used for transferring pressures from the four third cylinders;

the third cylinder mounting plate is a square steel plate, the four third cylinders are installed at four corners of a lower surface of the third cylinder mounting plate, the stepping motor connecting rod is welded to an upper surface of the third cylinder mounting plate, and the third cylinder mounting plate is used for fixing the four third cylinders;

the stepping motor connecting rod is a steel column, with a lower end being welded to a center of the third cylinder mounting plate and an upper end being connected to a piston rod of a stepping motor, and is used for connecting the stepping motor and the third cylinder mounting plate;

the automatic sand-compaction power system is composed of an automatic sand-compaction pneumatic module and an automatic sand-compaction electrical module, and is used for providing power for a soil compaction test;

the automatic sand-compaction pneumatic module is composed of a third air compressor, the multiple third cylinders, a third pneumatic pressure-regulating valve, a third electromagnetic valve, a fifth PLC, a pneumatic five-way joint a and a pneumatic five-way joint b, and is used for providing pneumatic power for the soil compaction test;

bottom ends of the four third cylinders are fixed at the four corners of the third cylinder mounting plate, the piston rods of the four third cylinders are connected to the upper ends of the four sand-compaction plate fixing rods, and the four third cylinders are used for driving the sand-compaction plate to impact or vibrate vertically;

the third electromagnetic valve controls the piston rods of the four third cylinders to stretch or retreat through the fifth PLC to realize an impact load and a vibration load, and the fifth PLC is used for controlling a manner and magnitude of the loads applied by the four third cylinders;

the automatic sand-compaction slide system is composed of an automatic sand-compaction beam, automatic sand-compaction pulleys, automatic sand-compaction pulley locating holes and automatic sand-compaction stop bolts, and is used for horizontal movements of the automatic sand-compaction part;

the automatic sand-compaction beam is a steel beam, with two ends being connected to a steel plate on the automatic sand-compaction pulleys through bolts; a circular through hole is formed in a center of the automatic sand-compaction beam and allows a tail end of the stepping motor to penetrate through; a lower surface of the automatic sand-compaction beam is connected to the stepping motor through a flange plate; the automatic sand-compaction beam is used for fixing the stepping motor and providing a counter-force;

the automatic sand-compaction part controls a thickness of each layer of samples through rising and falling of the piston rod of the stepping motor, the sand-compaction plate is driven by the multiple third cylinders to compact the samples, and a compaction load and frequency are controlled by the fifth PLC.

9. The intelligent test system for traffic load engineering detection of road construction according to claim 1, wherein the water-level fluctuation part is composed of a water-level fluctuation mechanical system and a water-level fluctuation power system;

the water-level fluctuation mechanical system comprises multiple first water tanks provided with water outlets, and is used for providing water required by a water-level fluctuation test;

the water-level fluctuation power system comprises multiple hydraulic lifting platforms and a hydraulic lifting platform controller, and is used for controlling a water level in the sample box part to rise or fall;

the dry-wet cycle part is composed of a dry-wet cycle water-supply system and a dry-wet cycle drying system;

the dry-wet cycle water-supply system comprises multiple second water tanks, a water pump, a water pump controller, sprayers, a five-way joint and sprayer holders, and is used for simulating a rain;

the dry-wet cycle drying system is composed of a heating plate, heating plate supports and a heating plate controller, and is used for simulating a sunlight to dry the samples.

10. A test method of the intelligent test system for traffic load engineering detection of road construction according to any one of claim 1, comprising:

S1: compacting samples in the sample box part by means of the automatic sand-compaction part:

S11: setting an output air pressure of the third pneumatic pressure-regulating valve through the fifth PLC to control the magnitude of an impact load during the compaction process, and setting an operating frequency of the third electromagnetic valve through the fifth PLC to control an impact frequency during the compaction process;

S12: starting the third air compressor through the fifth PLC to enable the piston rods of the multiple third cylinders to stretch out completely; controlling, by the stepping motor controller, the piston rod of the stepping motor to stretch out; when the sand-compaction plate is in contact with the bottom surface of the sample case, stopping the stepping motor, and recording a stretching length of the stepping motor;

S13: calculating a height of a first layer of samples according to test requirements, lifting the piston rod of the stepping motor to this height, enabling the piston rods of the third cylinders to retreat, and adding the first layer of samples into the sample case;

S14: turning on the fifth PLC according to pre-settings, such that the third cylinders start to stretch and retreat to drive the sand-compaction plate to compact the samples, and when the third cylinders stretch out to enable the lower surface of the sand-compaction plate to be exactly in contact with a surface of the samples, the compaction of the first layer of samples is completed, and a thickness of the first layer of samples is a height, to which the stepping motor rises for the first time;

S15: burying the soil pressure sensor in the first layer of samples according to test requirements for follow-up tests;

S16: repeating Step 13, Step 14 and Step 15 until all layers of samples are compacted;

S2: carrying out a vertical load test by means of the vertical load applying part 4000:

S21: placing the samples in the sample case according to the method for the soil compaction test, and placing the road model on the samples by means of the lifting part;

S22: connecting a signal output end of the third pull pressure sensor and a signal output end of a soil pressure sensor to an acquisition plate, disposing camera holders around the sample case, and installing multiple DIC cameras on the camera holders, with signal output ends being connected to a computer;

S23: controlling the magnitude of the vertical load;

S24: starting the test, and controlling the vertical load bearing plate to apply the vertical load, an impact load, a vibration load or a static load to the road model; measuring the magnitude of each load by the third pull pressure sensor, measuring an internal pressure of the samples by the soil pressure sensor, and recording changes of the samples by the DIC cameras;

S25: ending the test, turning off a second PLC, removing vertical load stop bolts, and moving the vertical load applying part away, such that follow-up tests can be carried out on the samples;

S3: carrying out a direct-shear test by means of the horizontal load applying part;

S31: placing the samples in the upper direct-shear box and the lower direct-shear box according to the method for the soil compaction test, burying the corresponding soil pressure sensor in the samples, connecting the signal output end of the soil pressure sensor and a signal output end of the fourth pull pressure sensor to the acquisition plate, disposing the camera holders around the sample case, and installing the multiple DIC cameras on the camera holders, with the signal output ends being connected to the computer;

S32: removing sample box stop bolts, and setting an output hydraulic pressure of the third electro-hydraulic proportional speed control valve and a stretching/retreating speed of the third hydraulic cylinder through the third PLC;

S33: starting the test, applying a vertical hydraulic load to the samples according to the method for the vertical hydraulic load test, starting the third hydraulic station through the third PLC, controlling the third hydraulic electromagnetic directional valve to enable the piston rod to stretch out, applying a large horizontal hydraulic load to the lower direct-shear box through the horizontal load bearing plate to enable the lower direct-shear box to move, recording a moving distance of the lower direct-shear box by the third hydraulic cylinder stroke sensor, measuring the magnitude of the load by the fourth pull pressure sensor, measuring an internal pressure of the samples by the soil pressure sensor, and recording changes of the samples by the DIC cameras;

S4: carrying out a road load simulation test by means of the simulated road load applying part:

S41: placing the samples in the sample case according to the method for the soil compaction test, burying the corresponding soil pressure sensor in the samples, placing the road model on the samples, connecting the signal output end of the soil pressure sensor, a signal output end of a first pull pressure sensor and a signal output end of a second pull pressure sensor to the acquisition plate, disposing the camera holders around the sample case, and installing the multiple DIC cameras on the camera holders, with the signal output ends being connected to the computer;

S42: setting an output air pressure of the first pneumatic pressure-regulating valve a and an output air pressure of the first pneumatic pressure-regulating valve b through the first PLC to control the magnitude of the vertical load, setting the first electromagnetic valve through the first PLC to realize an impact load and a vibration load, setting the first electrical proportional valve to realize a variable static load, setting the form and magnitude of the loads are according to test requirements, and setting the first hydraulic electromagnetic directional valve and the first electro-hydraulic proportional speed control valve through the first PLC to enable the first hydraulic piston rod to move in the horizontal direction;

S43: starting the test, starting the first hydraulic station through the first PLC, controlling the first hydraulic electromagnetic directional valve to enable the piston rod to stretch out to push the first cylinder fixing rod to move horizontally, and starting the first air compressor through the first PLC; when the first electromagnetic valve works, enabling the first cylinder to stretch and retreat to drive the wheel to apply an impact load or a vibration load to the road model; when the first electrical proportional valve works, applying a static load to the road model by the first cylinder through the wheel, wherein the simulated road load pneumatic module realizes the load in the vertical direction, the simulated road load hydraulic module realize movements in the horizontal direction, and the simulated road load pneumatic module and the simulated road load hydraulic module cooperate to apply multiple loads to the road model; measuring the magnitude of the vertical load by the first pull pressure sensor, measuring the magnitude of the horizontal load by the second pull pressure sensor, measuring an internal pressure of the samples by the soil pressure sensor, and recording changes of the samples by the DIC cameras;

S5: carrying out a water-level fluctuation test by means of the water-level fluctuation part:

S51: placing the samples in the sample case according to the method for the soil compaction test, burying the corresponding soil pressure sensor in the samples, lowering multiple hydraulic lifting platforms to the maximum extent, and adding a proper amount of water in first water tanks corresponding the hydraulic lifting platforms;

S52: disposing the camera holders around the sample case, and installing the multiple DIC cameras on the camera holders, with the signal output ends being connected to the computer;

S53: starting the test, controlling the hydraulic lifting platforms to rise or fall by means of a hydraulic lifting platform controller to control a water level in the first water tanks so as to increase or decrease a water level in the sample case, and recording changes of the samples by the DIC cameras;

S6: carrying out a dry-wet cycle test by means of the dry-wet cycle part:

S61: placing the samples in the sample case according to the method for the soil compaction test, and burying the corresponding soil pressure sensor in the samples;

S62: disposing the camera holders around the sample case, and installing the multiple DIC cameras on the camera holders, with the signal output ends being connected to the computer S63: starting the test, starting the water pump through the water pump controller, controlling pumping power of the water pump, spraying water to the samples by multiple sprayers, and when test requirements are met, stopping the water pump; starting the heating plate through the heating plate controller and controlling the temperature, heating the samples by the heating plate, and stopping the heating plate when test requirements are met, such that one dry-wet cycle is completed S64: repeating Step 63 until all dry-wet cycles are completed, and ending the test; and S7: carrying out lifting by means of the lifting part.

\* \* \* \* \*